(12) United States Patent
Schaefer et al.

(10) Patent No.: US 8,099,758 B2
(45) Date of Patent: Jan. 17, 2012

(54) POLICY BASED COMPOSITE FILE SYSTEM AND METHOD

(75) Inventors: Stuart Schaefer, Marblehead, MA (US); Yonah Schmeidler, Cambridge, MA (US); Ilya Levin, Wayland, MA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 11/264,747

(22) Filed: Oct. 31, 2005

(65) Prior Publication Data

US 2006/0259949 A1  Nov. 16, 2006

Related U.S. Application Data

(63) Continuation-in-part of application No. 10/894,671, filed on Jul. 20, 2004, now abandoned, and a continuation-in-part of application No. 09/310,294, filed on May 12, 1999, now Pat. No. 7,017,188.

(51) Int. Cl.
  *G06F 17/00* (2006.01)
  *H04L 29/06* (2006.01)

(52) U.S. Cl. ............................................. 726/1

(58) Field of Classification Search .................. 726/1
  See application file for complete search history.

(56) References Cited

U.S. PATENT DOCUMENTS

| | | |
|---|---|---|
| 5,155,825 A | 10/1992 | Moughanni et al. |
| 5,222,134 A | 6/1993 | Waite et al. |
| 5,388,242 A | 2/1995 | Jewett |
| 5,414,455 A | 5/1995 | Hooper et al. |
| 5,442,390 A | 8/1995 | Hooper et al. |
| 5,530,754 A | 6/1996 | Garfinkle |
| 5,548,645 A | 8/1996 | Ananda |
| 5,557,724 A | 9/1996 | Sampat et al. |
| 5,572,643 A | 11/1996 | Judson |
| 5,600,364 A | 2/1997 | Hendricks et al. |
| 5,634,849 A | 6/1997 | Abecassis |
| 5,642,417 A | 6/1997 | Stringer |
| 5,644,718 A | 7/1997 | Belove et al. |

(Continued)

FOREIGN PATENT DOCUMENTS

EP   0778512   6/1997

(Continued)

OTHER PUBLICATIONS

"Helpers and Plug-In's" Yale University, Jan. 10, 1997.

(Continued)

*Primary Examiner* — Kambiz Zand
*Assistant Examiner* — Aubrey Wyszynski
(74) *Attorney, Agent, or Firm* — Woodcock Washburn LLP

(57) ABSTRACT

A policy configurable file system includes a computer system upon which the policy configurable file system operates, a policy source for providing the configuration policies, and one or more file servers. The computer system includes software for enforcing one or more configuration policies. The policy source is typically either a policy server such that the policy is derived from the policy server, or a policy configurable file system, such that the policy is embedded in the policy configurable file system. The one or more file servers each uses a protocol, wherein the protocols of the one or more file servers are not all the same. In one case, the one or more of the configurable policies are separable from the policy configurable file system. In another case, the one or more configurable policies are downloadable to the computer system.

26 Claims, 24 Drawing Sheets

U.S. PATENT DOCUMENTS

| | | |
|---|---|---|
| 5,671,412 A | 9/1997 | Christiano |
| 5,673,316 A | 9/1997 | Auerbach et al. |
| 5,708,709 A | 1/1998 | Rose |
| 5,708,832 A | 1/1998 | Inniss et al. |
| 5,727,065 A | 3/1998 | Dillon |
| 5,737,619 A | 4/1998 | Judson |
| 5,745,678 A | 4/1998 | Herzberg et al. |
| 5,752,005 A | 5/1998 | Jones |
| 5,757,908 A | 5/1998 | Cooper et al. |
| 5,758,074 A | 5/1998 | Marlin et al. |
| 5,764,887 A | 6/1998 | Kells et al. |
| 5,765,152 A | 6/1998 | Erickson |
| 5,765,205 A | 6/1998 | Breslau et al. |
| 5,781,758 A | 7/1998 | Morley |
| 5,790,753 A | 8/1998 | Krishnamoorthy et al. |
| 5,793,966 A | 8/1998 | Amstein et al. |
| 5,805,804 A | 9/1998 | Laursen et al. |
| 5,809,145 A | 9/1998 | Slik et al. |
| 5,812,776 A | 9/1998 | Gifford |
| 5,826,014 A | 10/1998 | Coley et al. |
| 5,832,483 A | 11/1998 | Barker |
| 5,838,910 A | 11/1998 | Domenikos et al. |
| 5,850,352 A | 12/1998 | Moezzi et al. |
| 5,857,187 A | 1/1999 | Uenoyama et al. |
| 5,867,651 A | 2/1999 | Dan et al. |
| 5,867,667 A | 2/1999 | Butman et al. |
| 5,875,247 A | 2/1999 | Nakashima et al. |
| 5,889,860 A | 3/1999 | Eller et al. |
| 5,892,900 A | 4/1999 | Ginter et al. |
| 5,892,914 A | 4/1999 | Pitts |
| 5,892,954 A | 4/1999 | Tomas et al. |
| 5,900,871 A | 5/1999 | Atkin et al. |
| 5,915,119 A | 6/1999 | Cone |
| 5,919,247 A | 7/1999 | Van Hoff et al. |
| 5,920,864 A | 7/1999 | Zhao |
| 5,925,100 A | 7/1999 | Drewry et al. |
| 5,928,330 A | 7/1999 | Goetz |
| 5,930,792 A | 7/1999 | Polcyn |
| 5,931,901 A | 8/1999 | Wolfe et al. |
| 5,937,164 A | 8/1999 | Mages et al. |
| 5,940,840 A | 8/1999 | Eshel et al. |
| 5,941,908 A | 8/1999 | Goldsteen et al. |
| 5,941,954 A | 8/1999 | Kalajan |
| 5,941,959 A | 8/1999 | Fishler et al. |
| 5,944,789 A | 8/1999 | Tzelnic et al. |
| 5,948,062 A | 9/1999 | Tzelnic et al. |
| 5,953,005 A | 9/1999 | Liu |
| 5,956,483 A | 9/1999 | Grate et al. |
| 5,971,277 A | 10/1999 | Cragun et al. |
| 5,978,828 A | 11/1999 | Greer et al. |
| 5,987,523 A | 11/1999 | Hind et al. |
| 5,991,399 A | 11/1999 | Graunke et al. |
| 5,991,402 A | 11/1999 | Jia et al. |
| 6,002,853 A | 12/1999 | De Hond |
| 6,002,872 A | 12/1999 | Alexander, III et al. |
| 6,006,251 A | 12/1999 | Toyouchi et al. |
| 6,006,252 A | 12/1999 | Wolfe |
| 6,006,328 A | 12/1999 | Drake |
| 6,009,543 A | 12/1999 | Shavit |
| 6,012,090 A | 1/2000 | Chung et al. |
| 6,038,601 A | 3/2000 | Lambert et al. |
| 6,044,471 A | 3/2000 | Colvin |
| 6,052,780 A | 4/2000 | Glover |
| 6,055,572 A | 4/2000 | Saksena |
| 6,061,349 A | 5/2000 | Coile et al. |
| 6,065,043 A | 5/2000 | Domenikos et al. |
| 6,065,117 A | 5/2000 | White |
| 6,067,585 A | 5/2000 | Hoang |
| 6,067,622 A | 5/2000 | Moore |
| 6,070,009 A | 5/2000 | Dean et al. |
| 6,076,115 A | 6/2000 | Sambamurthy et al. |
| 6,078,951 A | 6/2000 | Pashupathy et al. |
| 6,085,185 A | 7/2000 | Matsuzawa et al. |
| 6,088,718 A | 7/2000 | Altschuler et al. |
| 6,088,796 A | 7/2000 | Cianfrocsa et al. |
| 6,098,056 A | 8/2000 | Rusnak et al. |
| 6,098,067 A | 8/2000 | Erickson |
| 6,101,549 A | 8/2000 | Baugher et al. |
| 6,108,420 A | 8/2000 | Larose et al. |
| 6,108,703 A | 8/2000 | Leighton et al. |
| 6,112,239 A | 8/2000 | Kenner et al. |
| 6,115,741 A | 9/2000 | Domenikos et al. |
| 6,119,108 A | 9/2000 | Holmes et al. |
| 6,119,165 A | 9/2000 | Li et al. |
| 6,125,352 A | 9/2000 | Franklin et al. |
| 6,138,158 A | 10/2000 | Boyle et al. |
| 6,138,162 A | 10/2000 | Pistriotto et al. |
| 6,141,684 A | 10/2000 | McDonald et al. |
| 6,151,643 A | 11/2000 | Cheng et al. |
| 6,154,878 A | 11/2000 | Saboff |
| 6,158,010 A * | 12/2000 | Moriconi et al. ............ 726/1 |
| 6,163,806 A | 12/2000 | Viswanathan et al. |
| 6,167,567 A | 12/2000 | Chiles et al. |
| 6,169,805 B1 | 1/2001 | Dunn |
| 6,169,976 B1 | 1/2001 | Colosso |
| 6,199,048 B1 | 3/2001 | Hudetz et al. |
| 6,199,113 B1 | 3/2001 | Alegre et al. |
| 6,202,056 B1 | 3/2001 | Nuttal |
| 6,212,560 B1 | 4/2001 | Fairchild |
| 6,212,564 B1 | 4/2001 | Harter et al. |
| 6,216,173 B1 | 4/2001 | Jones et al. |
| 6,226,618 B1 | 5/2001 | Downs et al. |
| 6,226,680 B1 | 5/2001 | Boucher et al. |
| 6,240,401 B1 | 5/2001 | Oren et al. |
| 6,240,442 B1 | 5/2001 | Domenikos et al. |
| 6,247,013 B1 | 6/2001 | Morimoto |
| 6,249,528 B1 | 6/2001 | Kothary |
| 6,260,066 B1 | 7/2001 | Bittinger et al. |
| 6,272,673 B1 | 8/2001 | Dale et al. |
| 6,279,001 B1 | 8/2001 | DeBettencourt et al. |
| 6,282,573 B1 | 8/2001 | Darago et al. |
| 6,292,833 B1 | 9/2001 | Liao et al. |
| 6,295,639 B1 | 9/2001 | Van Der Meer |
| 6,324,578 B1 | 11/2001 | Cox et al. |
| 6,327,658 B1 | 12/2001 | Susaki et al. |
| 6,334,189 B1 | 12/2001 | Granger et al. |
| 6,335,138 B1 | 1/2002 | Kurose et al. |
| 6,356,863 B1 | 3/2002 | Sayle |
| 6,360,366 B1 | 3/2002 | Heath et al. |
| 6,367,012 B1 | 4/2002 | Atkinson et al. |
| 6,374,402 B1 | 4/2002 | Schmeidler et al. |
| 6,385,596 B1 | 5/2002 | Wiser et al. |
| 6,389,462 B1 | 5/2002 | Cohen et al. |
| 6,405,111 B2 | 6/2002 | Rogers et al. |
| 6,412,009 B1 | 6/2002 | Erickson et al. |
| 6,421,726 B1 | 7/2002 | Kenner et al. |
| 6,421,781 B1 | 7/2002 | Fox et al. |
| 6,434,620 B1 | 8/2002 | Boucher et al. |
| 6,442,538 B1 | 8/2002 | Nojima |
| 6,453,334 B1 | 9/2002 | Vinson et al. |
| 6,453,353 B1 | 9/2002 | Win et al. |
| 6,471,068 B1 | 10/2002 | Kido et al. |
| 6,502,137 B1 | 12/2002 | Peterson et al. |
| 6,546,554 B1 | 4/2003 | Schmidt et al. |
| 6,572,661 B1 | 6/2003 | Stern |
| 6,578,199 B1 | 6/2003 | Tsou et al. |
| 6,643,775 B1 | 11/2003 | Granger et al. |
| 6,668,325 B1 | 12/2003 | Collberg et al. |
| 6,711,622 B1 | 3/2004 | Fuller et al. |
| 6,732,106 B2 | 5/2004 | Okamoto et al. |
| 6,763,370 B1 | 7/2004 | Schmeidler et al. |
| 6,771,290 B1 | 8/2004 | Hoyle |
| 6,782,478 B1 | 8/2004 | Probert |
| 6,816,544 B1 | 11/2004 | Bailey et al. |
| 6,868,495 B1 | 3/2005 | Glover |
| 6,938,096 B1 | 8/2005 | Greschler et al. |
| 6,967,012 B2 | 11/2005 | Atkinson et al. |
| 7,010,697 B2 | 3/2006 | Byrne et al. |
| 7,017,188 B1 | 3/2006 | Schmeidler et al. |
| 7,100,192 B1 | 8/2006 | Igawa et al. |
| 7,185,073 B1 * | 2/2007 | Gai et al. ............ 709/221 |
| 7,200,632 B1 | 4/2007 | Greschler et al. |
| 7,225,264 B2 | 5/2007 | Croman et al. |
| 7,370,071 B2 | 5/2008 | Greschler et al. |
| 7,778,999 B1 * | 8/2010 | Boisjolie et al. ............ 707/722 |
| 2001/0043215 A1 | 11/2001 | Middleton et al. |
| 2002/0156911 A1 * | 10/2002 | Croman et al. ............ 709/235 |

| | | | |
|---|---|---|---|
| 2003/0115218 | A1* | 6/2003 | Bobbitt et al. ................ 707/200 |
| 2005/0010670 | A1 | 1/2005 | Greschler et al. |
| 2005/0021613 | A1* | 1/2005 | Schmeidler et al. .......... 709/203 |
| 2005/0055578 | A1* | 3/2005 | Wright et al. ................ 713/201 |
| 2006/0129496 | A1* | 6/2006 | Chow et al. ..................... 705/59 |
| 2006/0271596 | A1* | 11/2006 | Sabsevitz et al. ............ 707/200 |
| 2006/0272023 | A1 | 11/2006 | Schmeidler et al. |
| 2007/0094489 | A1* | 4/2007 | Ota et al. .......................... 713/2 |
| 2008/0189361 | A1 | 8/2008 | Greschler et al. |

FOREIGN PATENT DOCUMENTS

| | | |
|---|---|---|
| EP | 0866591 A1 | 9/1998 |
| WO | WO 97/14251 | 4/1997 |
| WO | WO 97/42762 | 11/1997 |
| WO | WO 99/27460 | 6/1999 |
| WO | WO 99/45491 | 9/1999 |
| WO | WO 0046685 | 8/2000 |
| WO | WO 01/79971 | 10/2001 |
| WO | WO 98/07085 | 2/2008 |

OTHER PUBLICATIONS

Chandra Krintz et al., "Reducing Transfer Delay Using Java Class File Splitting and Prefetching, Proceedings of 14th SIPLAN conference on Object-oriented programming, systems, languages, and applications," Nov. 1999, 276-290.

Domel, P., "Mobile Telescript Agents and the Web," Digest of Papers of the Computer Society Computer Conference Compcon, US, Los Alamitos, *IEEE Computer Society Press*, Feb. 25, 1996, *Conf.* 41, 52-57.

Edwards, Mark Joseph, "Network Client and Workstation Concerns", http://windowsitlibrary.com/Content/121/08/4.html., Dec. 1997, 1-2.

Evans, E. et al., "Using Java Applets and Corba for Multi-User Distributed Applications," *IEEE Internet Computing*, May, 1997-Jun. 1997, 1(3), 43-55.

Harn, L. et al., "A Software Authentification System for Information Integrity," *Computers & Security*, Dec. 1992, 11, 747-752.

Hauptmann, S. et al., "On-line Maintenance with On-the-fly Software Replacement," *IEEE*, Aug. 1996, 70-71-80.

Hewlett Packard 82153A "Mini Chess" (heep://www.hpmuseum.org/software/41td/barcode/mchsil.pdf) Undated.

Higaki, H., "Extended Group Communication Algorithm for Updating Distributed Programs." *IEEE*, Jun. 1996, 386-393.

IBM & NEC to Cooperate in Establishing Common Standard to Prevent Illegal Copying of Digital Video Discs. Business Wire, Jul. 15, 1998.

IBM Announces Ground-Breaking Rights Management and Secure Payment Technology to Bring Leading Commercial Content Online, *Business Wire*, Oct. 31, 1995.

International Search report, Jul. 6, 2000, PCT/US99/27113.

James G. et al., "Automatic Prefetching in WAN," *In IEEE Workshop on Advances in Parellel and Distributed Systems*, Oct. 1993, 8-12.

Miller, G., "Firms Agree on Digital Anti-Piracy Technology," *L.A. Times*, Feb. 19, 1998, 117,p. A1.

New Anti Digital Copying Techniques Being Developed. Telecomworldwide, Sep. 5, 1997.

Rubin, D. Aviel; "Secure Distribution of Electronic Documents in a Hostile Environment", *Computer Communications*, NL, Elsevier Science Publishers BV, Amsterdam, Jun. 1, 1995, 18(6), 429-434.

Zhong-Ren Peng, Ph. D., "An Assessment of the Development of Internet GIS," *URISA*, 1997.

* cited by examiner

POLICY BASED COMPOSITE FILE SYSTEM AND METHOD

CROSS REFERENCE TO RELATED APPLICATIONS

This application claims benefit of the following Patent Applications, which are hereby incorporated by reference in their entirety:

This application is a continuation in part of U.S. patent application Ser. No. 10/894,671, entitled PORT PROXY AND SYSTEM FOR SERVER AND CLIENT COMPUTERS, filed Jul. 20, 2004.

This application is a continuation in part of U.S. patent application Ser. No. 09/310,294, entitled METHOD AND APPARATUS FOR SECURE CONTENT DELIVERY OVER BROADBAND ACCESS NETWORKS, filed May 12, 1999.

BACKGROUND OF THE INVENTION

The present invention relates to computer systems, and more particularly, to techniques for controlling and distributing files within a computer system.

A file system is a subsystem that an operating system or program uses to organize and keep track of files. File systems may be organized in different ways. For example, a hierarchical file system is one that uses directories to organize files into a tree structure. File systems provide the ability to search for one or more files stored within the file system. Often this is performed using a "directory" scan or search. In some operating systems, the search can include file versions, file names, and/or file extensions.

Although the operating system provides its own file management system, third party file systems may be developed. These systems can interact smoothly with the operating system but provide more features, such as encryption, compression, file versioning, improved backup procedures, and stricter file protection. The determination as to which file system to use is performed within the operating system at the virtual file system (VFS) layer. The VFS layer provides an abstraction through which all operating system or application requests to file systems are passed. The VFS layer examines the request, and routes it to the appropriate file system for fulfillment. In some versions of Microsoft Windows, the VFS is called the "redirector".

Some file systems are implemented over networks. Two common systems include the Network File System (NFS) and the Server Message Block (SMB, now CFIS) system. A file system implemented over a network takes a request from the operating system, converts the request into a network packet, transmits the packet to a remote server, and then processes the response. Other file systems are implemented as downloadable file systems, where the file system is packaged and delivered as a unit to the user. Examples of downloadable file systems include files for the well known application WinZip.

File systems share an abstracted interface upon which the user may perform operations. These operations include, but are not limited to:

Mount/Unmount
Directory scan
Open(Create)/Close
Read/Write
Status

The steps of associating a file system with an operating system (e.g. making the Virtual Layer binding of the file system to the operating system) are collectively called "mounting". In common usage, a newly mounted file system is associated with a specific location in a hierarchical file tree. All requests to that portion of the file tree are passed to the mounted file system. Different operating systems impose restrictions on the number and how deeply nested file system mounts can be. Un-mounting is the converse of mounting: a file system is disassociated from the operating system.

Once a file has been located, the user can request that the file be opened. This establishes a file in the file system, and updates the directories and attributes accordingly. It often returns a "handle" or "file number" to the caller for use in later I/O calls to the file system. Close is the converse of open, and releases the resources associated with the previously open file.

Read and write are self-explanatory. They are the basic I/O calls to a file in a file system.

Status returns the status of a file or a file system. It is used by applications that directly manipulate the files in a file system.

A journaled file system is one in which the hard disk maintains data integrity in the event of a system crash or if the system is otherwise halted abnormally. A journaled file system maintains a log, or journal, of what activity has taken place in the main data areas of the disk. If a crash occurs, any lost data can be recreated because updates to the metadata in directories and bit maps have been written to a serial log. A journaled file system not only returns the data to the pre-crash configuration but also recovers unsaved data and stores it in the location in which it would have been stored if the system had not been unexpectedly interrupted.

Some file system technologies, such as those provided with Digital Equipment Corporation's VMS operating system, provide the capability to track differing versions of files, often assigning them different version numbers. Higher-level concepts such as configuration management baselines and releases are constructed on top of files, but historically are not managed within the file system.

The above technologies are useful but are generally provided independently and without mechanism for centralized control. Those controls that are present are generally access control list (ACL) based and mediate basic access mechanisms like read and write. They do not govern more finely grained concepts such as journaling, file versioning, and the isolation of users.

In the past, applications stored on a file system were self-contained. An application software title (generally) consisted of one or more files that could be used only by the application software title. These files included data files, configuration files, and the application executable(s). Applications software titles would generally not interfere with each other.

The Windows operating environment takes advantage of a capability called dynamic linking to allow application software titles' code modules to be shared between different application software titles. The most important demonstration of the use of this capability is the common operating system, Microsoft Windows—the code modules that contain the functions that make Windows work (the Windows API), are shared by all Windows applications. A code module that can be shared in this way is commonly called a dynamic link library and normally has the extension .DLL. Other names and formats of shared libraries were also used, .VBX, .OCX, and numerous others. Use of shared modules is also supported by other common operating systems, such as Unix and Linux, as well as internally by many programming languages such as Perl or development environments such as Forte or the Rational RUP.

DLLs are sometimes installed in a directory with an application. At other times they are installed in "shared" directories. The search order for DLLs and shared libraries is controlled externally from the application using the PATH environment variable. Changing the PATH often changes the way an application executes.

It is not unusual for users to reinstall software, either during a system upgrade or to change configurations. In many cases users install software that included an older version of a DLL i.e. COMMDLG.DLL on a system that already contained a newer version. This causes the more recently installed version to replace the newer version. As soon as the user attempts to run the program that required the newer version, problems occur ranging from operational difficulties to application failures. Changes made to an application by one user may effect the operation of the application by a different user. Support and development personnel can literally spend hours trying to figure out what is wrong with a customer's machine, and why their applications will no longer run.

The component-solution framework for programming has made this problem worse. Instead of a few DLLs that are shared by several applications, there are hundreds of DLLs, VBXs and OCXs that may be shared by literally thousands of applications. All it takes is a single DLL, VBX or OCX to be missing, or present in an older version (or even an incompatible newer version), for an application to fail. A poorly designed installation program, user error, registration error or change in the user's PATH environment variable are a few of the ways in which this problem can occur.

In the same vein, applications that are uninstalled cannot determine if "shared" DLL's are required by other applications, and either remove the DLL's (causing other applications to stop working), or leave them to clutter the system and cause confusion and conflicts with later software installs.

Microsoft named this problem "DLL hell", and revised their DLL naming and binding schemes, and incorporated these changes into their NET version of Windows to address these types of problems. The NET solutions do not isolate the changes made by one user from those from those seen by a different user, and for backward compatibility reasons, many of the old issues remain. Issues related to "DLL hell" is also present with managing the information that is shared between applications, including application and user configuration information, shared data files, and user-specific data files.

A particular problem exists with the management of data for users of applications that were originally designed for use by a single user, but are installed on a PC that supports more than one user, either simultaneously or sequentially. When this type of software is installed and used, they must first share installation information that may contain user specific information, such as the user's name and company, as well as personal preferences such as screen layout and the last window context that the user was in. Additionally, the user's information may be stored in files that are managed by the application. Such information may be sensitive in nature, such as personal information, such as that stored by a financial application such as TurboTax.

When a user installs and uses an application such as TurboTax, they provide personal information, including name, social security number, wage, and deduction information to the application to be stored in data files on the local file system. If a second user then tries to install and use TurboTax, the program files, configuration files, and data files of the first user are presented to the second user, who may not be related or permitted to view the first user's information. What is needed is a mechanism to separate the program, data, and configuration information of each user, without complex multi-user programming by each commercial software vendor.

A need exists to provide a system of on-demand delivery of content that permits users and processes to download and use application software titles in a self-contained manner that, automatically provides configuration management capabilities for these application software titles, and provides distributable policy-based controls over the downloading, use of the applications, contents, and structure of the application software titles. A further need is for these policies and downloadable content to be usable on the host PC without additional installation steps beyond the determination to download and run the application.

It is additionally desirable for the system to track changes made by users and processed, and to optionally isolate users and processes from each other under policy control.

It is further desirable that the name spaces between local, mounted, and downloadable file systems be integrated, either statically, or using by using centralized or distributed control methods. Name space integration provides a seamless view of the file system to the user.

It will be appreciated that improvements in the art described in the present disclosure that satisfy the above requirements will find use in many applications.

SUMMARY OF THE INVENTION

In one aspect, a policy configurable file system includes a computer system upon which the policy configurable file system operates, a policy source and one or more file servers. The computer system includes software for enforcing one or more configuration policies, and the policy source provides the configuration policies. The policy source is either a policy server such that the policy is derived from the policy server, or the policy configurable file system, such that the policy is embedded in the policy configurable file system. The one or more file servers each uses a protocol, and the protocols of the one or more file servers are not all the same.

In one embodiment, the one or more configurable policies are separable from the policy configurable file system. In another embodiment, the one or more configurable policies are downloadable to the computer system. The policy configurable file system may consist of two or more parts, where at least one of the parts is independently downloadable to the computer system. In another embodiment, the policy configurable file system consists of two or more parts that are independently managed. The two or more parts may be stored independent of one another.

In one embodiment, the policy source includes a distributed set of servers. In another embodiment, the policy source is distributed over a plurality of locations. The configuration policies are provided by one of or a combination of the plurality of locations. In one embodiment, the plurality of locations may include a local host PC, a downloadable BRIQ package, a server, and a dedicated policy server.

In another aspect, a composite file system having a plurality of independent deliverable parts includes one or more servers, each hosting one to N independent deliverable parts. Each independent deliverable part includes a downloadable file system. The composite file system also includes one or more rules for composition. Each one of the one or more rules for composition defines an aspect of how the independent deliverable parts combine with one another. The composite file system further includes a computer system for receiving and running the independent deliverable parts. The computer system includes software code for executing the one or more rules for composition.

In one embodiment, the independent deliverable parts include at least one read-only part and at least one read-write part. In another embodiment, the independent deliverable parts include at least one downloadable part and at least one part that is locally resident on the computer system. In one embodiment, the independent deliverable parts include at least one part that is uniquely associated with a user or a group of users. In another embodiment, the independent deliverable parts include at least one part that is not pre-defined as a BRIQ part.

In one embodiment, the combining of independent deliverable parts with one another according to the one or more rules for composition is transparent to a user of the composite file system. In another embodiment, the independent deliverable parts include at least one downloadable part and at least one persistent part that is not part of a cache.

In one embodiment, at least one of the independent deliverable parts is defined by a policy. In some embodiments, the policy may be downloaded from the one or more servers to the computer system, or the policy may be downloaded from one of or a combination of a plurality of locations.

In another aspect, a composite file system with an integrated volume name space includes a computer system upon which the composite file system operates, one or more file servers, and software code for integrating name spaces of the one or more independent deliverable volume parts. The one or more servers each hosts one or more independent deliverable volume parts. The software code includes code for receiving a local file name from the computer system and translating the local file name to a global file name. The software code further includes code for receiving the global file name and identifying one or more volume part locations that contain an object corresponding to the global file name. The software code further includes code for mapping the object contained in the one or more volume part locations to the local computer system.

One embodiment further includes code for compositing, at the local computer system, partial objects from two or more volume part locations. In one embodiment, the software code for integrating name spaces is controlled by a policy, which may be downloaded from the one or more servers to the computer system.

In one embodiment, the software code for integrating name spaces is at least partially provided via a simlink. In another embodiment, the software code for integrating name spaces integrates the name spaces across two or more if the independently deliverable volume parts. In one embodiment, the software code for integrating name spaces integrates the name spaces between one of the independently deliverable volume parts and an external file system. In another embodiment, the software code for integrating name spaces integrates the name spaces between a one of the independently deliverable volume parts and an individual file.

BRIEF DESCRIPTION OF DRAWINGS

The disclosed apparatus, system, and methods are described in detail with reference to the accompanying figures. Each of the figures is a schematic diagram more fully described below.

DESCRIPTION OF THE PREFERRED EMBODIMENTS

Figure 1:
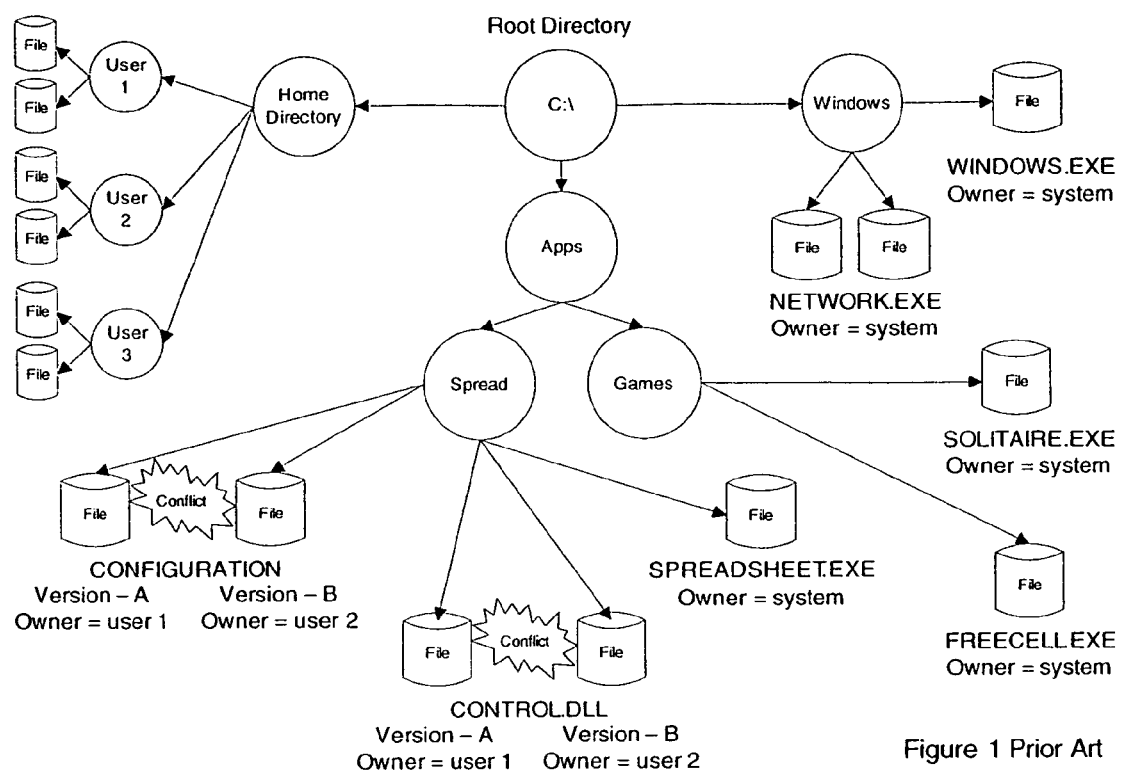
FIG. 1 depicts a legacy hierarchical file system, in which user files and various application "shared" files are intermingled in a single common file system.

The described embodiments of a file system constructed and arranged according to the present invention have several purposes. They provide an optimal, and optionally background, transport for just-in-time-delivery of application software titles between a server and host PC 100. Additionally, they provide a user-transparent mechanism for managing user specific data and preference information. They further provide a secure, robust mechanism for managing software in a service-based context.

The described embodiments support application software titles provided as a service and provide multiple methods for delivering and controlling such application software titles. A user is able to use an application software title and not have to worry about which server it came from, if it was upgraded last night, if it was delivered with one technology as opposed to another, or if another user on their system has changed the version of the software they use. Application software title delivery and use is "just in time," tailored to fit a user's needs, and transparent to the end user. A system administrator or IT staff has the ability to choose the applications software they would like to license, define policies for how the application software title will be deployed and used, and the application software title will be automatically deployed and used in the specified manner. There is no need for massive migration or upgrade plans. IT staff is thus able to concentrate on supporting its user base, not installing software and managing servers all day.

The described embodiments support application software title delivery and management on multiple operating systems, for applications written in various languages and on top of other technology platforms. In this fashion, the system provides an Enterprise Integration Platform that integrates applications into a single seamless interface for end users and system managers alike. It will be appreciated that this system provides an integrated architecture for delivering and executing software in real-time, while providing multiple avenues for implementation for different marketplaces.

With the described embodiments, application software titles run on the host PC, but the application software title may not be downloaded, in its entirety, onto the host PC. A title is formatted into one or more electronic package(s) that contain the title's files, optionally in a compressed and encrypted form, referred to hereafter as a BRIQ or volume part. The BRIQ is actually a portable, self-contained file system, generally containing all of the files necessary to run a particular title. A BRIQ may be combined with additional information, other file system specifications (e.g. another BRIQ), and meta-data to produce a downloadable image. The downloadable image is sometimes called a BRIQ package. BRIQ packages are stored on a network server, sometimes referred to as a RAFT server, accessible across a network. As described herein, BRIQs may be stored on servers other than RAFT servers, and may be provided to the host PC using RAFT or alternative protocols. Without respect to how a BRIQ or policy is delivered to the host PC, the client software of the described embodiments treats each BRIQ as a local file system on the host PC. When using a software application title, the operating system, e.g., Windows, makes read and write requests to this local file system. A Windows-based illustrative embodiment may include a Windows Virtual Device Driver (VxD) or other file system interface or service component, services these requests by retrieving blocks of BRIQ data from a server. After retrieving the requested block of data, one or more of the described embodiments decompresses and decrypts the BRIQ data, and pass the decompressed and decrypted data onto the operating system on the host PC. Preferably, the BRIQ package may be in an industry standard package format, and may additionally use industry standard package description mechanisms such as OSD. The system may additionally use alternative protocols such as RTP, RSTP, and HTTP to obtain the electronic package and policies.

One embodiment describes an abstraction layer to integrating modules in order to insulate operating system dependencies as well as provide basic modularity and expandability. The following abstraction layers are described in detail below:

The Stream CODEC is responsible for managing the delivery of applications software to the end user file system and managing the state associated with each piece of applications software. The Stream CODEC provides a common methodology for content management, load-balancing, and infrastructure management.

The File System Core is responsible for making an application software title and data files appear as a local file system to the user using it, regardless of the actual location of the application and data files. For example, if a user wishes to use a Microsoft Word® document on his system, the Microsoft Word® application software and the document needs to be sent across the network to the user's host PC. The File System Core is responsible for managing a local data store that, in the preferred embodiment, may be sparsely or densely populated, and may consist of both persistent and non-persistent data. Information from this data store is presented to the local system using a traditional file system interface, with an integrated namespace so that the individual volume parts are indistinguishable to the user, and may be managed upon a policy-defined granularity at policy-defined level, such as the system, a group, or user-by-user basis.

File system information may be generally categorized into four primary categories, although these categorization is for discussion and categorization is not limited to these categories:

1. Application Data
2. Application Configuration
3. User Data
4. User Configuration information.

Each category of data can be managed as local data or as remote data, based upon policy specifications. The file system core provides methods for storing and integrating this data, irrespective of location, with original streamed data, and presenting the data to the operating system as a seamless file system.

Application Data encompasses those files that are responsible for the application running including the executable itself, shared libraries and certain internal data files. In general, these files are read-only and will only change as versions, patches, or upgrades of the application occur.

Application Configuration files cover all those internal data files that account for global, application level configuration information. Most enterprise applications contain gross customizations made for the particular enterprise stored in various files. Also, many office productivity applications allow application level customizations to be done such as style sheets or dot files in Microsoft Office. In preferred embodiments, these files are stored in common, enterprise accessible file access points, or are replicated to each user.

User Configuration files complement those application level customization files and often combine or override global customizations. User preference information is stored in many fashions. The file system core uses policies to define a preferred method of storage and provides for a transparent redirection component for information stored in other ways. This feature is used to store registry or Windows level customizations within the file system, localized to the particular application.

User Data files present the most basic and important challenge. Using the virtualization features of the file system of the described embodiments, a user is able to run an application, create a file, and retrieve that file, transparently, regardless of its location. Within a server based environment, a user will run an application on the server, but may store the results of that session in a policy defined location, for example, on her client machine, on a network drive, or within a stored user profile.

Other categories of information are managed independently, as the dictated by the needs of the application.

Each category of information may be considered as one or more streams of related information, associated as one or more files in the file system of the described embodiments. Multiple information streams may be associated with a specific application file, each file may have its own stream, or a single stream of information may comprise a plurality of files. Furthermore, the streams may be mapped in part based upon policy-specified conditions, such as the ID of the user, group membership, or other operating system aspect. Some of these streams may be defined when the file is initially created. Others may be added during initialization or configuration and are merged seamlessly with the application file, or are created by the application itself. These streams are transparently instantiated by the file system of the present invention as needed to provide the file system services to the user.

It should be noted that the various volume parts that make up the composite file system may be integrated using user-specific volume parts as defined by policy, and that each user may have individually distinct volume parts integrated by the present with one or more common BRIQ packages. The file system of the described embodiments integrates the name spaces of these volume parts to provide a seamless volume name space.

The Network Transport Agent module of the described embodiments implements the client to server communications protocols.

The File System Interface is responsible for providing platform virtualization services to the present invention. This module encapsulates these system specific services into a cross-platform API for use by the rest of the present invention. An example of this type of service is the file system interface. In one exemplary embodiment using Microsoft Windows NT/2000, the preferred file system interface is the I/O Manager API. Another example of OEM services is the storage of configuration information. For example, in a Windows-based embodiment, an application may store its configuration information in configuration files or the Registry, while in a UNIX-based embodiment, an application will store the same information somewhere in the file system.

These logical modules may be deployed as described or may be combined or further split into different module configurations without affecting the functionality of the present invention.

The described embodiments include a system and method for managing application software titles as logical file systems using policies that comprise definitions for one or more attributes of the file system.
 Portability
 Interoperability
 Security
 Internationalization
 Zero-footprint
 Configurable
 Version management
 File system gating of use and accesses
 User write-back
 Replication, caching, and disconnected usage
 Predictive look-ahead and caching to minimize network accesses The system and methods of the described embodiments can be implemented for a broad range of target platforms and throughput without modification. Enterprise-wide operation of the present invention is defined using policies, which in turn define how the file system operates, e.g., with which servers it communicates, and many other useful configuration elements. Platform specific configuration elements are also configured using policies, which may be combined with the file system on the target platform and may be operating environment sensitive. The ability to support a broad range of target platforms is a significant advantage when deploying software across multiple types of systems, such as when an enterprise has some of its workstations deployed as Windows 2000 and others deployed using Windows XP.

Figure 3:
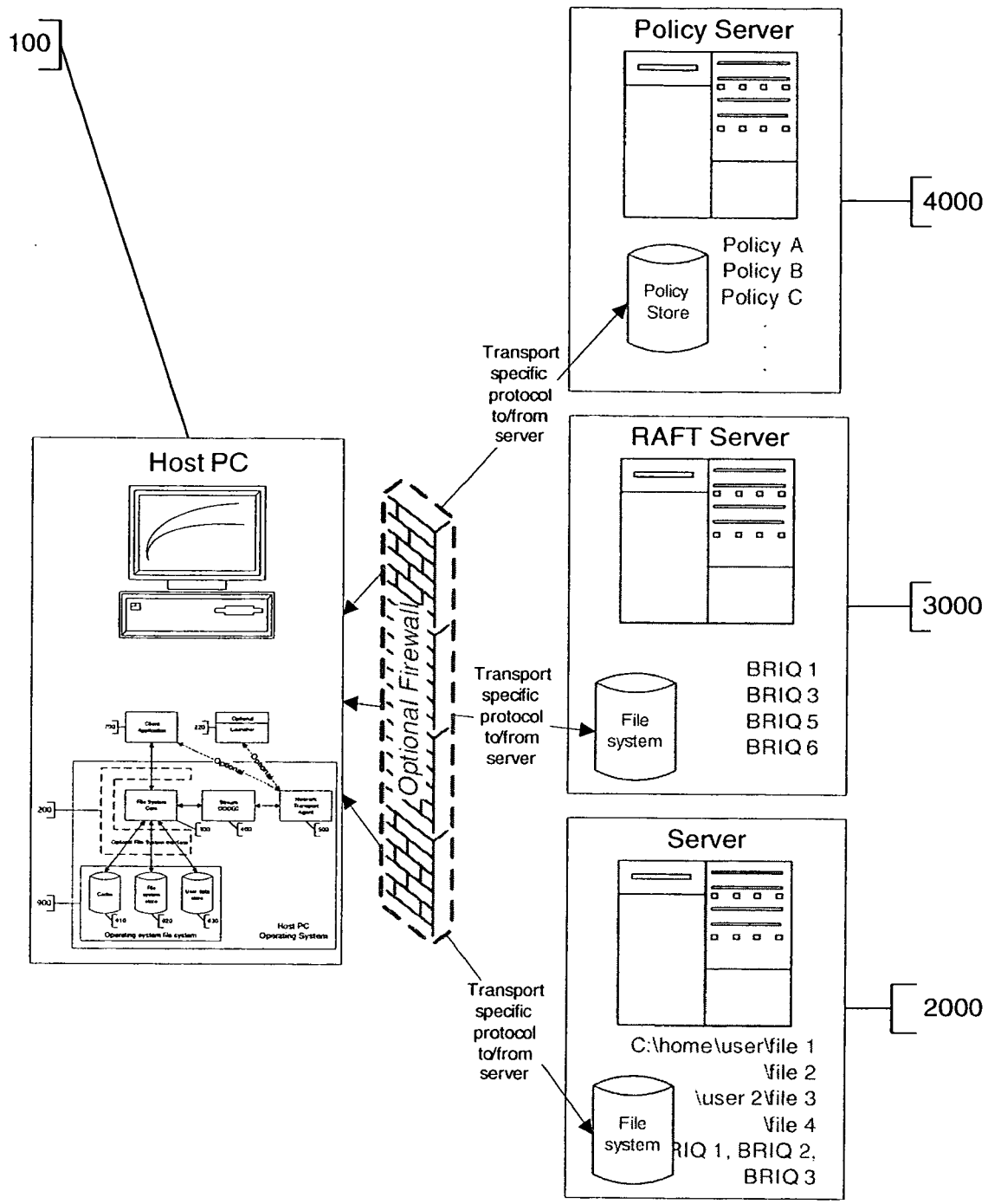
FIG. 3 depicts an exemplary deployment of the system of the present invention, in which a host PC communicates with a plurality of servers to obtain various application software titles and policies.

Application software titles, particularly within the Windows operating system, have application dependencies scattered throughout the operating system. In addition, application customization and preference selections are often written to configuration files stored with the application software itself. For application software to be installable as a service, these changes to application files should be tracked and localized for each user on a file-by-file basis, and in a preferred embodiment, should be tracked and localized by the file system layer itself without knowledge or cooperation by the application software titles. User changes and configurations, upon completion of use, may be discarded, cached for later use on the same host PC, written back to a central repository for backup or sharing, or may be otherwise managed independently of the application software title provided as a software service. The present invention provides methods for managing these local changes and provides policy-based mechanisms for managing when and how local file system changes are permitted and handled. As shown in FIG. 3, the present invention may manage these "user changes" by storing them within the file system of the host PC, and by optionally copying the user changes to a network file server such as a Windows 2003 file server.

Parts of BRIQ packages and individual files (collectively components) may be assembled as specified by policies and reference and dependency specifications within the BRIQ packages themselves into a virtual volume. The file system core manages a virtual volume. Virtual volumes may comprise a plurality of components, including individual files, structure definitions (directories, headers, meta-data), policies, other virtual volumes, and any other items that may be contained within a BRIQ package or other packaging mechanism. A plurality of individual files, structure definitions, policy definitions, symlinks, and other items that may be contained within a BRIQ package may be managed as a single unit called a volume part. Volume part contents are specified by policy, and may be expressly specified, or specified based upon the type of information, or by meta-data associated with the information.

Virtual volumes may be assembled using "symlinks", which link a point in the volume structure definition with another BRIQ package or data file. Note that a symlink is similar to a UNIX symbolic link, however it is not restricted in its use to be mapping from folder to folder or file to file. Symlinks also may be used to associate a previously stored file, volume part, or BRIQ package containing updates to a "master" BRIQ with its location within a virtual volume, where it in effect replaces the original file or volume parts in the virtual volume. Symlinks may be used in the name space mapping approaches, and assist with integrating the name spaces of various volume parts into a unified name space provided to the user.

Virtual volumes are assembled from their component parts by the assemble volume operation of the file system 300, and are disassembled back into their component parts by the disassemble volume operation. A volume part that is stored externally from its original BRIQ package is preferably stored as a second BRIQ package, and is called a volume package or volume part.

BRIQ packages may be also "chained" using the reference mechanisms contained within the BRIQ header. Thus, a user may have a "private" volume package that contains their user-defined information such as configuration settings, which specifies and chains in a group-wide volume package that defines specific application settings, which in turn specifies and chain in a downloadable BRIQ package containing the application title itself.

During the assembly operation, a policy may define whether a symlink to an external file or volume package may be created or the original file or volume part may be referenced from within the original BRIQ package. If the controlling policy defines that a file or volume part should be maintained independently, then a symlink to a user's private volume package is created.

Policies determine the manner in which BRIQ and volume packages are integrated during the construction of a virtual volume. For example, a policy may specify that the BRIQ files are to be used, unless there is an overriding group configuration file in a second volume part, unless there is a specific user configuration file in the user's private volume package.

A user's private volume package may be created or added to when a file is first opened, or at the time of the first write, or is created by a post-close merge operation. Depending upon the write-through and write-back algorithms specified by the appropriate policy, the contents of a user's private volume package may be created and written to while the file system is open, or it may be created as part of a post-use processing step.

The file system of the described embodiments may assemble its file system information from a plurality of servers. In an example of using the present invention in a highly distributed exampled, as shown in FIG. 3, a first instance of applications software might be provided from a first server, and a second instance of a same or different application software title might be provided from a second server. In this example, multiple servers may provide some or all the same application software title in order to improve the availability of the application software title. These servers may be managed by the same or different business entities, and may be provided by the provider of the application software title, or a third party. Similarly, the policies governing that application software title, its use, deployment, and configurations may be provided by a variety of policy sources (e.g., a plurality of servers), which may or may not be the same servers described above that provided the original applications. Continuing with the distributed deployment example described above, the policies governing applications software titles may be made available on the second server, and alternatively upon a third server. Policies may be independently obtained from these servers by the present invention operating upon a host PC, or may be delivered with the application software title, or may be delivered with user specific information related to the application software title.

The system of the present invention supports a broad range of communications approaches for communicating between a computer system (in the described embodiment, a host PC system) and the plurality of server(s) as shown in FIG. 3. It will be appreciated that the file system component described herein itself is independent of the communications approach utilized to access and optionally move (i.e., download) file system data and policies between the host PC and a plurality of servers as described above and as shown in FIG. 3, and that the described embodiment accrues the benefits of these communications mechanisms in perceived performance, ease of configuration, and deployment capabilities. The file system of the described embodiments provides application transparent access to the file services, without regard to the policies defined for application virtualization, user virtualization, and specific user deployments.

In one embodiment, the client software uses a file system access protocol, such as the Random Access File Transport (RAFT) protocol, RTP, RSTP, HTTP, or other network protocols, to retrieve BRIQ data across a network. Preferably, the network used is a broadband network. The RAFT protocol provides client software with read-only access to files and directories stored as BRIQ packages on RAFT servers. Alternative networking protocols such as RTP, RSTP, and HTTP may be used to access servers to obtain copies of BRIQs using these alternative protocols. With these alternative protocols, the client software may be provided read-only, read-write, or split read-write access to BRIQ, policy, and user-instance information. The BRIQ, without regard to the access protocol or method, is treated like a local file system by the host PC, and is managed in accordance with policies that define how the BRIQ and its contents may be used.

One described embodiment quickly initiates execution of a delivered BRIQ package of application software in order to maximize the client perception of performance. The overall perceived performance of the system is preferably as close to local disk access times as possible. This performance perspective motivates a number of aspects of the described embodiments, including optimizations that directly affect the speed with which application execution begins. The presentation of an embodiment optimized for perceived performance does not preclude other embodiments where the optimizations are performed for other purposes. The system is configurable as to how application parts and policies are delivered. In some cases, the application parts and applicable policies may be locally stored, or they may be delivered just in time, relying upon a high-speed network and server infrastructure. In others, applicable policies and the application software title (or its parts) may be downloaded and fully cached to the local hard disk and instantiated when needed. Alternatively, some application parts may be partially provided on CD-ROM or other media, and integrated at run time with downloaded updates, configurations, and user-specific data.

In one embodiment, the software title is never "installed" on the target system. The client software creates an installation abstraction, maintaining the illusion for the operating system that the application software title currently executing is installed on the host PC. Thus, when execution of the application software title is terminated, there may be no remaining evidence the application software title ran on the system. The quantity and type of files remaining on the host PC's hard drive is determined based upon policy specification, and may range from nothing to a complete virtual installation. For example, a complete, virtual installation may be retained in which user-localized application-specific files are retained on the host PC. In an alternative example, the user-localized application specific files are synchronized to a network file server, and are made available to later executions. In a third example, no files associated with the title are left on the host PC's hard-drive, and no operating system state information e.g., registry variables associated with the application software title, remains. Users of application software titles also may have the option of saving certain state information, hereinafter "instance information," that would be desirable to maintain across application title uses (e.g., the "level" achieved in a game, application configurations, etc.). Such instance information may be saved in write-through files, in local cached copies of application configuration files, or in user-specific instances of application configuration files, as described below.

The file system management mechanism of the described embodiments is inherently a cache. As BRIQ (file system) data is read from a server, it is cached within the host PC's local file system up to a policy-defined physical limit. When that limit is reached, the cached data expires in accordance with a policy-defined expiration methodology. In one embodiment, this policy may specify least often/recently used semantics, or may define alternative operating semantics. These policies allow data on an entire application basis to be given either preference for storage within the cache, or they may specifically lock this data in cache or other storage location. If an application has been fully streamed into cache and the contents of the server have not changed, the file system may serve the application entirely from its local copy, improving the perceived performance.

As mentioned above, once an application has been locally replicated within the file system of the described embodiments, it may be served entirely from the local copy. In this way, a user can run an application while disconnected from the network. The system supplies a replication utility for populating the file system for purposeful disconnection at a later time.

It is important to note there are several functions that are built into the system to support all of the features of the general system while disconnected. If a user edits data that would normally be saved on a server, it may be written to that server immediately, or the data may be initially stored locally and changes replicated to a server when reconnected. The server to which the changes are replicated may be the server that initially provided the BRIQ, or it may be a different server provided for this purpose. The server(s) to use for storing user information are also defined by policies. In addition, security policies are defined and enforced to ensure accurate authorization and billing, as well as reconciliation on reconnect.

Each capability of the system is configurable on an application-by-application and host PC basis. For example, applications may be configured to operate on some host PCs with complete user isolation and zero-footprint attributes, while on others the application may interoperate and expose changes in configurations to all authorized users.

Different stakeholders have differing requirements. For this reason, a policy controlling an application software title may be defined by one or more stakeholders, and be aggregated and delivered to the host PC as needed. Some examples of policies defined by different stakeholders might include policies that define the following business rules:

A corporation's data must not traverse networks in the clear.

A publisher's application must be protected from copyright violation and theft.

Each requirement demonstrates an understanding the implications of security with this technology. In one embodiment, the system is designed to support these types of capabilities, and provide policy configurable capabilities, for example, for protection for integrity (e.g., signing), protection for privacy (e.g., encryption), protection from unauthorized use (e.g., access control lists), protection from loss of service (e.g., zero-footprint, caching), and other capabilities as may be defined by policy for the specific deployment.

The system may also be required to adhere to import/export laws regarding the strength of cryptographic keys, and the use of particular technologies. It is desirable that the use of all regulated cryptographic algorithms and protocols obey the key standards currently supported, including the use of external technologies such as SSL/TLS. For cryptographic algorithms not covered directly by law, the system utilizes open standards methods that have an understood key strength as compared to known standards like DES.

One or more described embodiments support deployment in multiple languages, as well as determining and deploying the applications in the desired target languages. Both the system, and the deployed applications, should use common internationalization mechanisms such as Unicode strings to implement this requirement.

The system provides for application version management, both within the applications themselves, and within their data and configuration files. Users receive the approved versions of application software titles as specified by applicable policy. This capability permits an administrator to provision multiple instances of different versions of the same application. For example, an administrator may provision a user who needs the newest version of Microsoft Word with that specific software, while the majority of users are provisioned with an older, more stable, version.

In an alterative illustrative example, the administrator may configure a group of users to receive customizations to a Microsoft Word configuration in which an alternate document template specific to their needs is deployed along with the Word application while other users receive the "stock" document template shipped with the Word application. If the customized template is changed on the deployment server, all instances of the Word application using the customized template will obtain the changed document template automatically and deploy the updated template to the users.

FIG. 1 illustrates an example of legacy hierarchical file system on a host PC in which multiple versions of a spreadsheet application have been installed. In this illustrative example, the spreadsheet program has been installed to the directory c:\Appl\spread, and comprises a program executable, SPREADSHEET.EXE, a shared library, CONTROL.DLL, and a configuration file, CONFIGURATION. In the example, a second version has also been installed that uses a different shared library named CONTROL.DLL, and introduces the "DLL Hell" issues described above. In this example, multiple users use the host PC, and the first user has configuration preferences that they create and store in the CONFIGURATION file stored with the spreadsheet application in the file system. The second user has different preferences, and when they put their preferences into the CONFIGURATION file stored with the spreadsheet application, the second user's preferences conflict with the preferences of the first user, and most often will overwrite and destroy the preferences of the first user. These conflicts are represented in FIG. 1 by the irregular polygons labeled "conflict".

Figure 2:
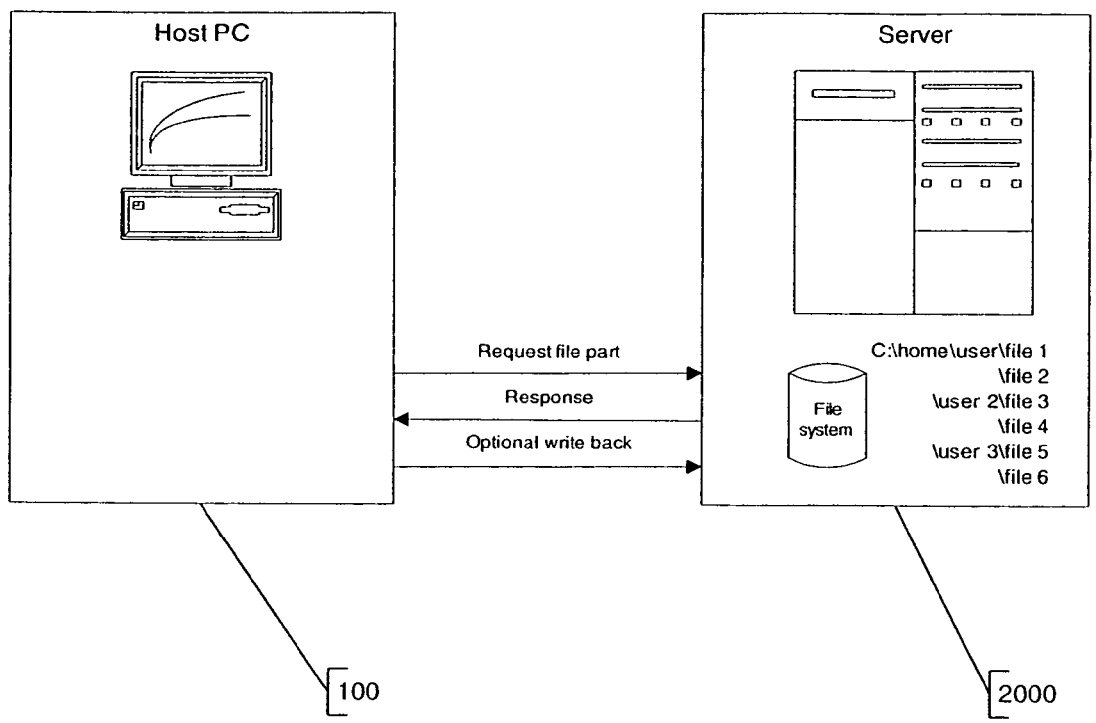
FIG. 2 depicts a legacy network file system and associated data flows in which a host PC accesses a file system present on a server over a network.

FIG. 2 illustrates a network version of a file system used between a host PC 100 and a server 2000, in which the host PC passed a file system request over the network to a file server, receives a response containing the part(s) of the requested file, and optionally, the host PC writes any changes to the file back to the server's version of the file system by sending a packet containing the changed file blocks over the network: The Host PC 100 of FIG. 2 illustrates a common computer system such as a Sun SparcStation 5 workstation, commercially available from Sun Microsystems of Palo Alto, Calif., or an IBM RS/6000 workstation or IBM Aptiva PC, both commercially available from International Business Machines Corp. of Armonk, N.Y., on which the invention may be implemented. The server 2000 in the illustration is a common file server application, such as a HP blade server running Windows Server 2003 or Unix, or a Dell file server network appliance. The file sharing protocol represented in FIG. 2 by the arrows between host PC 100 and the server 2000 represents a common file sharing protocol such as NFS or CIFS. The exemplary computer systems and architecture of FIG. 2 are for descriptive purposes only. Although the description may refer to terms commonly used in describing particular computer systems, the description and concepts equally apply to other systems, including systems having architectures dissimilar to FIG. 2.

FIG. 3 illustrates a host PC 100 including the a described embodiment operably connected to network comprising a plurality of servers operably connected, including a server 2000 such as the one described above in FIG. 2, a RAFT server 3000, and a policy server 4000. Host PC 1000 and servers 2000, 3000, and 4000 may be operably connected to the network backbone and each other using a plurality of network protocols including (for the purposes of this illustrative embodiment, without intent of being limiting) RAFT, HTTP, RTP, RSTP. In the illustrative embodiment, the Server 1000, RAFT Server 2000, and Policy Server 3000 may be implemented as an application executable on a POSIX.1 (IEEE Std 1003.1, 1998) compatible platform, such as the Sun Solaris® operating system commercially available from Sun Microsystems, Palo Alto, Calif., or the Linux operating system commercially available from Red Hat Software.

As illustrated in FIG. 3, the present invention is preferably installed as a component within the operating system of host PC 100. Operation of host PC 100 is generally controlled and coordinated by operating system software, such Windows 95, Windows NT/2000, or Windows XP, commercially available from Microsoft Corp., Redmond, Wash. The operating system controls allocation of system resources and performs tasks such as processing scheduling, memory management, networking, and I/O services, among things. In particular, an operating system resident in system memory and running on the CPU of host PC 100 coordinates the operation of the other elements of host PC 100. The present invention may be implemented with any number of commercially available operating systems including OS/2®, UNIX®, Linux and Solaris®, among others.

Server 2000, in this example, is shown storing BRIQ packages identified as "1", "2", and "3". Server 3000 in this example is shown storing BRIQ packages "1", "3", "5", and "6", and policy server 4000 is shown storing policies "A", "B", and "C". The specific policies and BRIQ packages stored on each server is provided here solely as an illustrative example, and does not limit the types of information that may be stored upon each type of server. Continuing with FIG. 3, the communication between Host PC 100 and servers 2000, 3000, and 4000 may be obstructed by one or more firewalls.

The SMB protocol has been in use on corporate LAN's (local area networks) for nearly twenty years. In that time, it has become a popular vehicle for enabling simple networking. It is at the heart of Microsoft Networking and also in IBM's OS/2. For historical, practical, and security reasons, it has remained a LAN based, however. Microsoft has renamed the SMB protocol as CFIS.

Microsoft networking utilizes the SMB (now CFIS) protocol to communicate between PC clients and servers to provide file sharing, print sharing, and basic network authentication. Most commonly this is wrapped in the NetBIOS protocol to enable plug and play networking for small, medium and large LANs. The NetBIOS protocol provides for auto-discovery of networks, machine addressing abstraction, and decentralized management of networks. For ease of use reasons, NetBIOS has grown to be a common standard on corporate LAN's. However, this also presents a significant security risk. A hacker who has broken into or is seeking to break into a corporation's LAN can either wait and "sniff" to find addresses of machines on the LAN, or a smart hacker can broadcast spurious NetBIOS packets and discover the formation of the LAN automatically.

In addition, early implementations of SMB transmitted usernames and passwords without encryption or other security across the LAN. This has since, however, been discovered and patched.

As a result of these two situations, most corporations block traffic to and from the Internet that uses the NetBIOS protocol. This is typically accomplished at the firewall because the frames identify the port from which they originated. The firewall stops frames based upon their port origination.

According to request for comments (RFC) 1001/1002, TCP and UDP ports 137, 138 and 139 are used for enabling a NetBIOS-based service. Microsoft Networking is such a service, wrapping the SMB protocol with NetBIOS for name resolution and other services. Therefore, all Microsoft Networks behind firewalls or proxies most commonly block these ports to guard their LANs from intrusion. In addition, many ISP's today block this traffic as well, to protect their users from malicious Internet hackers.

In addition, most corporations have by default blocked all traffic to and from the Internet with only minor exceptions like HTTP, FTP, SMTP and POP3, protocols, which have become a staple in job performance. Therefore, it can be expected that to guarantee provision of any service across corporate firewalls, the use of HTTP as a carrier is the only choice. Though there are many other options, such as SOCKS proxies, or HTTP tunneling, use of standard HTTP over port 80 is preferred.

Figure 4:
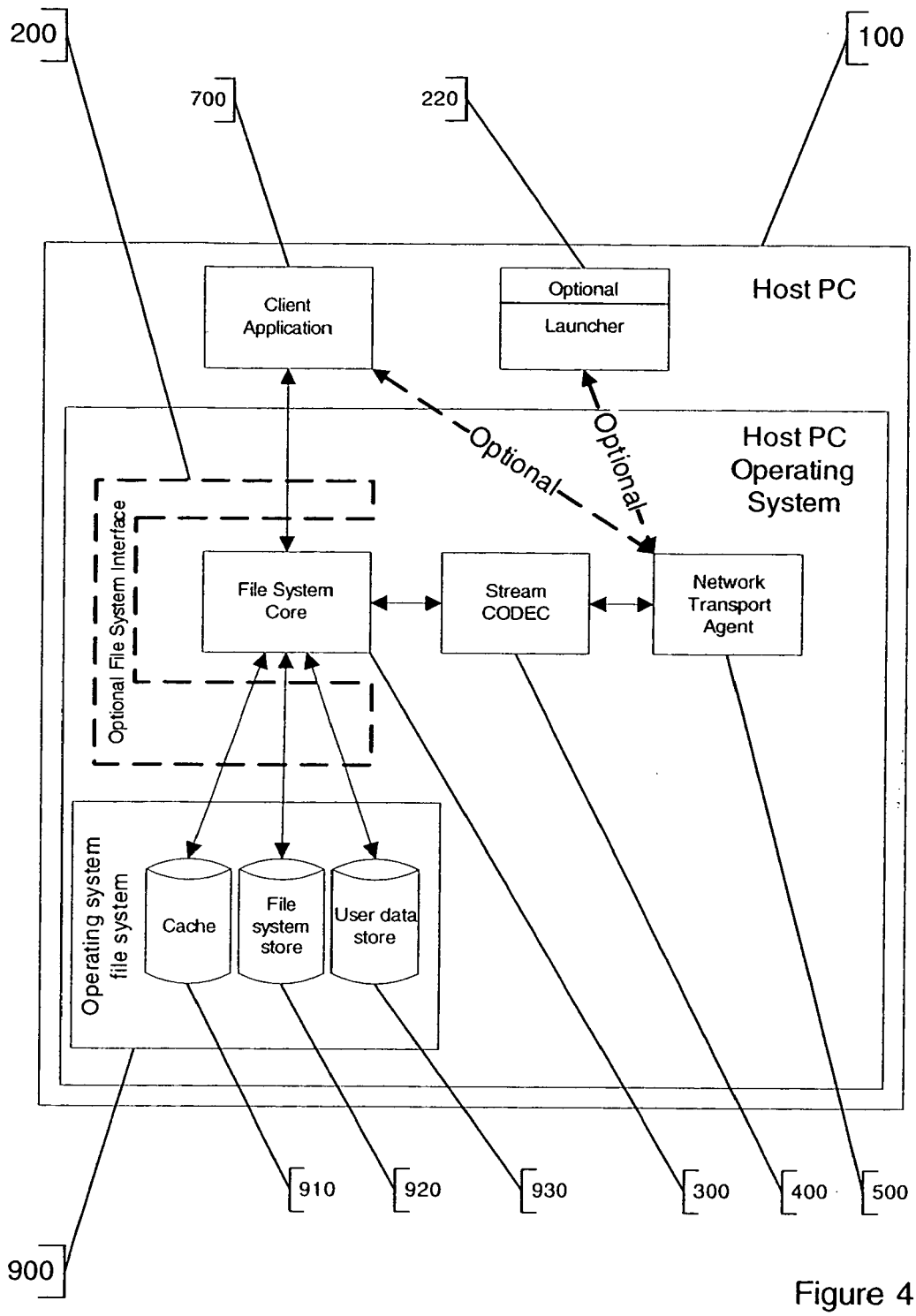
FIG. 4 is a detailed schematic diagram of the present invention showing a preferred embodiment within the Windows operating system.

One embodiment, shown in FIG. 4, has a plurality of software components that interoperate to provide capabilities for policy control over the download, use, and write-back of content to downloadable file systems. These components are preferably integrated with the host PC 100's operating system 800's so as to provide a seamless operating interface to each instance of client application 700 operating on host PC 100. Each instance of client application 700 may be delivered as part of the local file system of the present invention, it may be downloaded as part of a BRIQ package, it may be delivered and installed independently, or it may be run from an independent network file system. Those skilled in the art will recognize the importance of the flexibility this mechanism provides.

Generally, multiple instances of client application 700 may communicate with a single instance of the File System Core 300 component of the present invention. Each instance of client application 700 may be a copy of a single application, or each instance may be a different application program. In some circumstances, such as clusters or multi-processor environments, multiple instances of each of the components of the described embodiments may be present.

In some cases, an application may be associated with a specific mounted BRIQ package, and the application program is then accessed using the present invention through the file system mechanism provided using the BRIQ package and one or more of the embodiments described herein. In this case, a specific BRIQ package may be associated with a specific location in operating system's file system 800. The point of association between the BRIQ package and the host PC's operating system is called a mount point.

It may be desirable, however, for the requirements of each client application 700, that a separate mount point in the file system 900 may or may not be visible. In the general case, application software titles may be mounted as separate directories on the same base drive letter for Windows, or under the same root device for a UNIX like system. As some Windows applications require their own drive, or require a CD-ROM like file system, a file system of the present invention can be mounted at a separate mount point or drive letter.

As shown in the high level system schematic shown in FIG. 4, an instance of a client application 700 typically accesses a file system of the present invention by calling the host PC's operating system, which in turn calls File System Core 300 optionally using the host PC operating system 800's file system interface 200. For systems that offer a well-defined virtual file system (VFS) interface, the interface between host PC 100's operating system 800 and File System Core 300 is the VFS interface. On host PC operating system 800's that do not provide a VFS interface, an optional file system interface 200 component provides this interface. Alternative wasy to call the file system core 300 may be provided in alternative embodiments, such as an API, DLL, RPC, or other mechanism by which an instance of a client application 700 may call an embodiment. In another embodiment, host PC 100 may include a component called a Launcher 220 that recognizes RAFF URLs or BRIQ packages and establishes a BRIQ package/file system relationship using a direct connection to a server via a connection managed through the Network Transport Agent 500. After the Launcher 220 establishes the association between the BRIQ package and a local file system mount point, Launcher 220 starts client application 700 using traditional file system calls.

In one embodiment, the client application 700 makes operating system 800 file system calls to open, close, seek position, read and write to files within a file system. The requests are passed through the file system VFS layer and allocated to a specific file system instance. File system instances are associated with specific BRIQ packages at run time, and if necessary, a connection to a server is established and at least part of a BRIQ package is downloaded and mounted as a file system. Information streams may also be associated with the file system representation defined by a BRIQ package. Unlike specific file instances where the content is predefined, an information stream's content may not be defined until the information is provided to the present invention for use. The association between specific BRIQ packages and mount points may be specified using a policy associated with user, host PC, BRIQ package, or other meta-data associated with a user, host PC, or BRIQ, or other execution environment parameters such as network type or network address as described later. The policy defines how the file system instances are associated with BRIQs and streams.

File system requests are presented to the File System Core 300. In a preferred embodiment, a standard Windows NT/2000/XP interface such as the Windows IFS Manager is used. Embodiments for alternate host PC operating systems 800, such as Windows 98, may contain an additional layer of translation provided by the file system interface 200 for presenting a common interface to the file system core 300.

To facilitate additional communication between parts of the file system core 300, the host PC operating system 800, and the Network Transport Agent 500, a dedicated file system interface 200 component may be added to the configuration in order to create a well defined interface between the file system core 300 and the operating system 800. In some embodiments, this component additionally serves the additional purpose of dispatching requests across user-mode/kernel-mode boundaries. On Windows 98 and NT, for example, the file system interface 200 is used to facilitate kernel-mode to user-mode component communication.

The File System Core 300 is responsible for mediating policy against file system requests and managing the local file system store 920, the cache 910, and user data store 930, all present in an embodiment on the operating system's local file system 900 in accordance with policy directives. In some embodiments, as directed by policy, some or all of the cache 910, file system store 920, and user data store 930 may actually be network file systems or other mounted file systems such as those provided by the described embodiments. The File System Core 300 is also responsible for interacting with the host PC operating system 800 at the VFS interface to provide a virtual operational file system consisting of cached, network accessible, and user-specific content. The File System Interface 200, if used, is operably connected to the File System Core 300 between the operating system 800 and file system core 300, and again between file system core 300 and the operating system's local file system 900.

The file system core 300 component obtains and uses policies to configure its operation. In an illustrative embodiment, the file system core may obtain policies from a plurality of locations, including the local host PC 100, embedded within a downloaded BRIQ package, from a server 1000, or from a dedicated policy server 4000. Policies may be associated with users, host PC 100's, specific BRIQs, or with meta-data associated with a specific user or group of users, host PC's, specific BRIQs or alternate identifiable parameters such as environmental configuration.

Policies enforced by the file system core 300 include access and time of use policies common in traditional file systems, as well as policies that define the operation of the file system core 300 when associated with a specific user or group of users, host PC, or BRIQ. Examples of these types of policies include cache management, including without limiting scope the amount of caching to be performed, cache algorithm, look-ahead algorithms, stream transport protocol to use, stream transport bandwidth limitations (throttling), capability for write-back, write-back location, and additional actions to take for various file system operations (e.g., action to take when un-mounting a BRIQ package). Policies are described in more detail below.

To support seamless storage of each type of information, the file system core 300 provides for symbolic link points within its storage hierarchy to point to data (e.g. policies, volume parts) stored externally. Additionally, the file system is able to virtualize data stored on an external server as being part of the local file system and to integrate the name spaces of the volume parts. Thus, the link may point to either an internal, external or remote file, stored within an initially downloaded BRIQ or stored within another volume part. From a user's viewpoint, each file, regardless of when and where it was created and is currently stored, appears to be part of his local file system as it covers the use of the application or the particular data file.

File system core 300 includes capabilities to manage the write-back behavior of the present invention. It is desirable to have multiple, selectable types of write-back behavior supported by the present invention with write-back behavior specifiable in a plurality of granularities, including on a data file by data file, stream by stream, file-type by file-type, user-by-user, or file system basis. In the simplest form, write-back behavior is disallowed when the file system is read-only.

Alternatively, a policy may define a write-back behavior that mimics the existing write-back behaviors of current art network file systems. In yet another embodiment, a policy may define the write-back behavior of the file system core 300 to provide user-isolated write-back, in which any writes for a particular user are managed independently of writes for a different user. In this case, file system core 300 is configured with the location of the write-back storage subsystem as part of the policy that defines the write-back policy, and writes all user-specific writes to that location. File system core associates a symbolic link between the original file in the BRIQ package and the file that was written for the specific user. Further access attempts to the modified file follow the symbolic link and obtain the user-specific changes to the file instead of the original file data.

The Stream CODEC 400 serves as an intermediary between the File System Core 300 and the Network Transport Agent 500. The Stream CODEC 400 serves as a translator for the format of data sent across the network, to that used by the File System Core 300, including compression and decompression, and encryption and decryption operations. Additionally, it serves as the file stream manager, translating base file system requests into appropriate network requests, including pre-fetch, stacking, and other operations. The Stream CODEC 400 is, in part controlled by policy as described above for the File system core 300.

The Network Transport Agent 500 and the Stream CODEC 400, serve to manage the network connections to servers that may provide applications, file systems, and policies. A application may be associated with one or more Network Transport Agent 500 sessions accessing a plurality of servers. On a multi-tasking or multi-user host PC, more than one user application, or multiple instances of a single user application may multiplex the same Network Transport Agent 500 session to a specific server if the application(s) are communicating with the same server. The Network Transport Agent 500 manages the session negotiation and multiplexing operations, presenting a single session interface to the Stream CODEC. The Network Transport Agent 500 also handles auto-reconnect with a disconnected server.

The Network Transport Agent 500 is responsible for negotiating and managing network sessions with servers that provide file system components, policies, and user information. The Network Transport Agent 500 provides the interface between the servers and client's application file system components by establishing/maintaining network connections for streaming file system containers and container components.

One embodiment includes two or more Direct Streaming Transport 550 sections that implement the individual protocols used by the system to deliver software components across the network to the present invention. In an example embodiment of the present invention, the Direct Streaming Transport 550 is an implementation of the Real-time Transport Protocol (RTP). In an example embodiment, after opening a network connection using Windows sockets, the Direct Streaming Transport 550 streams a file system from the server using the Real-time Transport Protocol (RTP). The incoming datagrams are reassembled and passed to the Stream CODEC 400 for delivery to the cache and subsequent use by the file system core 300 for presentation to the application.

Figure 5:
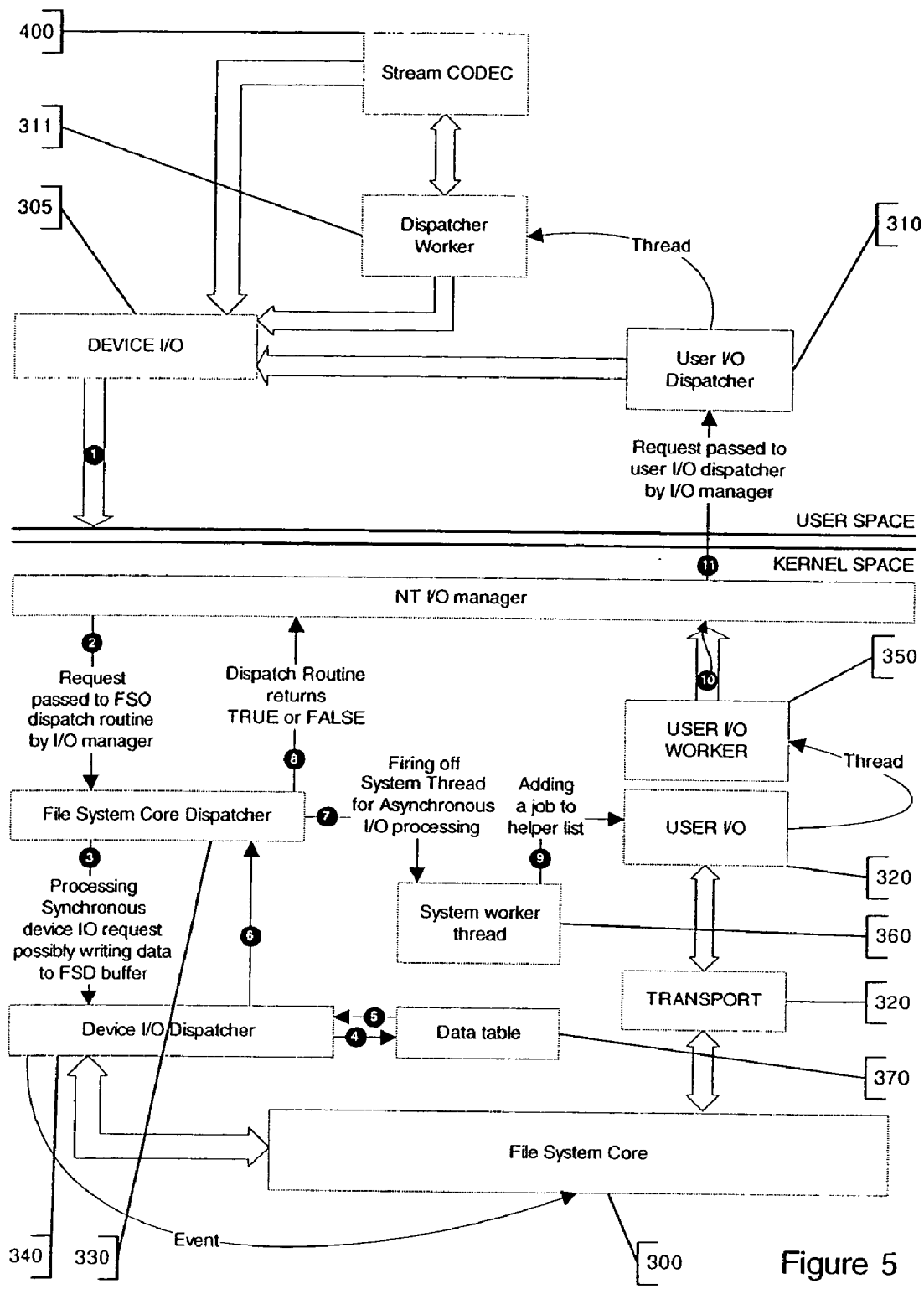
FIG. 5 is a block diagram of one embodiment of the invention.

FIG. 5 illustrates an example Windows NT embodiment of the present invention, in which the file system core 300 is implemented as a operating system driver, and the stream CODEC 400 and Network Transport Agent 500 components are implemented as applications running in user space. The example Windows NT embodiment further utilizes the optional file system interface 200 component described above to standardize the Windows NT file system interface and provide optional hooks for file systems on other Windows-based operating systems such as Windows/98.

The exemplary Windows NT embodiment further enables the file system core to call back into user space to access directly the application. The File System Interface 200, is used as a bridge between the file system core implemented in kernel space and any other part of the system it interfaces with, including the Stream CODEC 400 and Network Transport Agent 500.

The example Windows NT embodiment illustrated in FIG. 5 supports the optional direct client communication path by implementing a Helper Interface to the User IO Dispatcher 310 module in user space and User IO 320 module in Kernel Space respectively. The User IO Dispatcher 310 and User IO Worker 311 modules are considered part of the file system interface 200. The Device IO 305 and Helper Interface are primarily responsible for implementing the optional direct two-way communication with file system core. This alternative implementation introduces a two-way dependency, where an application can not run without the file system core and file system core can not run without a application. Even though tight integration of file system core and application may have its drawbacks, one of the advantages is that it offers is its ability to call components implemented in user space from kernel space, which would be hard to implement otherwise. For example, a Stream CODEC 400 or Network Transport Agent 500 implemented in the user space can be called from file system core 300 to access BRIQ data or policies on a server such as Server 2000, 3000, or 4000 described in FIG. 4.

During the startup of the file system core 300, the NT Service Manager, or the boot sequence on Windows 9x, calls the file system core 300 initialization routine. The initialization module verifies that file system core driver has started, loads the file system core with configuration information in the form of policies, sets up the Helper Interface, and does other specific initialization tasks. The Helper Interface creates a number of queued worker threads as defined by policy during initialization.

The Device IO 305 module enables the Client or Network Transport Agent 500 to request data from the file system core via direct synchronous or asynchronous calls. Some requests may take a long time to return therefore they will be implemented via the asynchronous Device IO model. The Device IO module implements a defined set of IOCTL calls where each IOCTL is associated with a specific data structure.

Synchronous Device IO calls are blocking calls, where the client has to wait for the underlying driver to process the request and return the result. This I/O model may be used to configure the file system core, load it with requests that do not require extensive processing, or when we read data stored in the file system core.

Asynchronous Device IO calls are used for IO requests that require a long processing time. A good example of where asynchronous Device IO calls are used is the helper interface. When a Device IO Dispatcher in the file system core receives a Helper Job call, it stores it internally and uses it later to generate a request to user space. Once a client process executes an asynchronous Device IO call, a client has to wait on specified event object until it is signaled. This signal can come from a directly returned asynchronous IO request, or from a request that is part of the Helper Interface that its request is completed. Once a client process is notified that the IO request is completed, it can get the data buffer via the OS overlapped interface and analyze its content to plan its further action.

The User IO Dispatcher 310 module is a collection of threads, the number of which is configurable and set during the initialization stage. Each thread on startup makes a Helper Job request to the file system core via the asynchronous Device IO module. It waits for return from the file system core, which may be a relatively long time (See Device IO/Asynchronous for more information). When it returns from the file system core, it creates a User IO Worker thread and feeds it with the request it received from the file system core. It then immediately makes another Helper Job request to the file system core via asynchronous Device IO module. This thread has infinite life span—it exits only when it is notified about process shutdown via global event object.

User IO Workers 311 are threads created by the User IO Dispatcher 310 module. They are responsible for processing file system core requests and sending the result back to file system core via the synchronous Device IO module. Multiple threads are preferred to shorten processing time when a new request is received.

The file system interface components within the file system driver comprise of several modules such as the Device IO Dispatcher 340, Data IO Table 370, Transport 380, file system core, and the Helper Interface, which is represented by User IO and User IO Workers modules. Of these modules, the Device IO Dispatcher 340 and Helper Interface are responsible for direct two-way communication with the file system core.

The Device IO Dispatcher 340 module is responsible for processing the requests received from the user space via Device IO 305 module. Some requests are processed immediately therefore they are implemented in synchronous fashion. Other requests may take a long time to process and are preferably are handled asynchronously. In the asynchronous model, the Device IO Dispatcher 340 creates an internal thread to handle the request, and then returns the execution to application with status PENDING. The application is notified about the completion of the work via an event object. This model is supported by the Windows IO Manager interface. The Device IO Dispatcher 340 module is also responsible for writing and reading of data to and from the Data IO 370 Table. When data in the table is modified, it sets a corresponding event object thereby notifying all components waiting for this event object.

The Data IO 370 Table is a container abstraction that manages the storage all the data used by the file system components. The Data IO 370 table manages I/O requests and redirection to the cache 910, file system store 920, and user data store 930.

The User IO 320 Module maintains a link list of "Helper Jobs." These jobs represent outstanding asynchronous IO request which are still pending. This list is incremented through the Device IO Dispatcher 340 module, when it receives a special Helper Request from the user space via the Device IO 305 module. This list is decremented whenever it is necessary to issue a request to the user space. Whenever the User IO 320 module is called upon to make a request to user space, it fires off a User IO Worker 350 thread that does the actual work. A User IO Worker 350 is a thread created by the User IO 320 module that does the actual processing of the request received from the file system core.

Transport 380 Module is a file system interface abstraction that allows the file system core to make requests to user space via the helper interface mentioned previously. It may be required to call VxD driver on Win 98 instead of calling the User Space transport module via the Helper Interface.

The flow of control for read/write calls through the exemplary Windows NT embodiment is detailed below and shown in FIG. 5. An explanation for each step shown in FIG. 5 is provided below. Note that the arrows in FIG. 5 represent flow of control.

1. An application issues a synchronous or asynchronous call to file system core. As part of the request, the client or application creates a data buffer, which is filled with data describing the request. If operation completes successfully, it returns TRUE, in case of failure it returns FALSE. On return from file system core, on Success, data buffer is filled with data supplied by file system core, describing the reply of request.
2. This request is processed by NT I/O Manager and passed on to the file system core Dispatcher 330. Note that steps 3 through 6 and 8 are part of synchronous processing. Steps 7 through 11 are part of asynchronous processing.
3. File system core dispatcher 300 redirects the request according to its functional code to a proper routine for the final execution. The routine could be writing or reading data from or to the internal file system core Data Table through an interface implemented by Device IO 340 module.
4. Device IO 340 module is processing the request to write data to Data Table.
5. Device IO 340 module is processing the request to read data from Data Table.
6. Device IO 340 module returns the result of operation to Device IO Dispatcher 330 routine.
7. The file system core dispatcher 330 creates a system thread for asynchronous processing of the lengthy requests. Immediately after creating the thread, the dispatch routine returns to the caller through the NT I/O Manager. The NT I/O manager is part of operating system 800. The caller (client or application) is notified about the completion through the event object that is set accordingly by NT I/O Manager.
8. The system returns the result to the application through the NT I/O Manager. It returns TRUE on success, FALSE otherwise.
9. The System Worker Thread created in context of the dispatcher routine processes requests according their functional identifier. A request described by IOCTL_SWCLNT_HELPER functional identifier is a Helper Job. Instead of processing it right away it is added to the file system core link list of helper jobs.
10. Some time later User IO Worker thread 350 receives a request from file system core to retrieve data from the User Space. It can be as a result of Core file system core calling Network Transport Agent 500. User IO Worker 350 removes a Helper Job from its link list, fills the data buffer supplied by the caller (see step 1) with information describing the file system core reply, and notifies the NT I/O Manager about completion of the asynchronous request.
11. NT I/O manager sets the event object, thereby notifying the User IO Dispatcher 310. User IO Dispatcher 310 receives the data buffer modified by file system core, analyzes file system core request, and processes it in accordance with policy.

Figure 6:
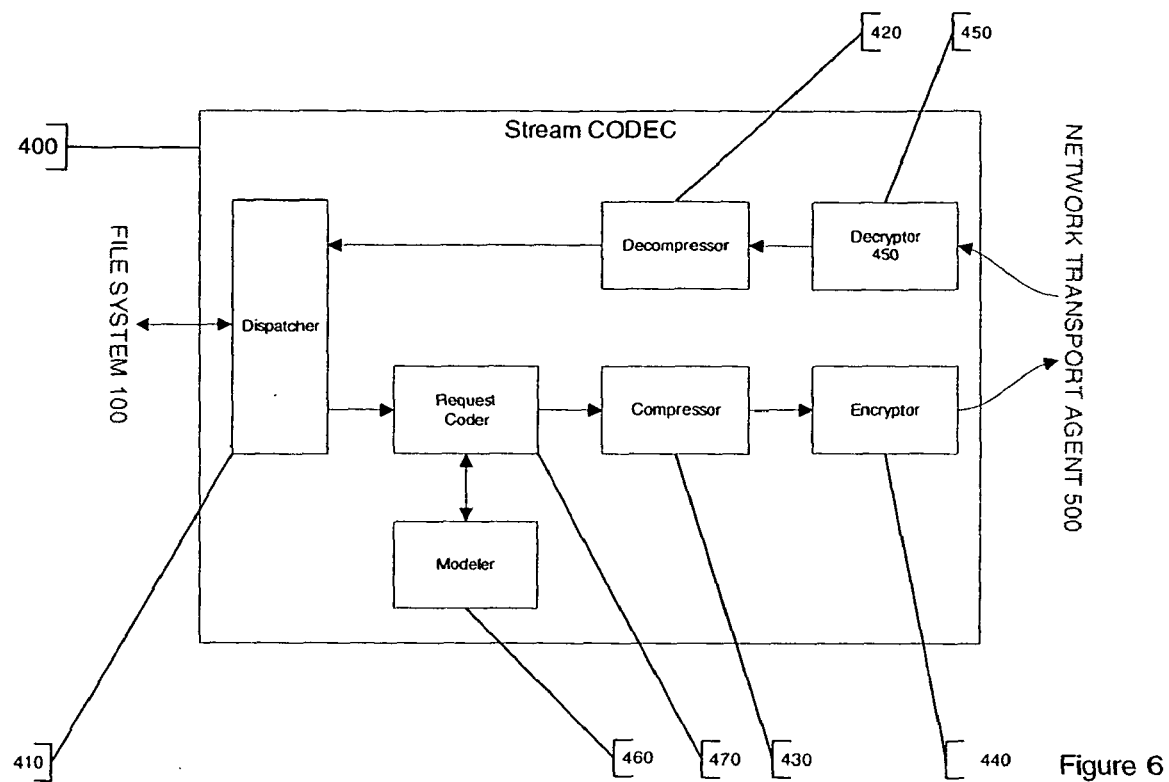
FIG. 6 is a block diagram of the stream CODEC component of the described embodiment.

Stream CODEC 400—FIG. 6 illustrates a schematic block diagram of the Stream CODEC 400 component of one embodiment. The Stream CODEC 400 serves as an interface between the File System Core 300 and the Network Transport Agent 500. As such, the Stream CODEC 400 provides a translation from file system requests into the requests used by streaming protocols. This entails understanding the stream and its basic format, the current and future needs of the file system, and the timing of interactions of the file system with the stream. The Stream CODEC 400 seeks to minimize the use of the network, and minimizes the response time for both the application and file system requests.

Stream CODEC 400 serves is a translation layer between the requests that the file system core presents and the use of available networking protocols, as implemented by the Network Transport Agent 500 and specific instances of Direct Streaming Transport 550, for example, specific implementations of Direct Streaming Transport 550 that implement HTTP, RTSP/RTP, RAFT, or standard file system protocols such as CIFS or NFS. In this sense, traditional network file system requests to retrieve data or other information from the network are sent to the Stream CODEC 400 and handled using the assistance of the Network Transport Agent 500.

One embodiment creates an application session using of RTSP. Stream CODEC 400 co-operates with the Network Transport Agent 500 and an RSTP version of Direct Streaming Transport 500 to establish a link to a server 2000 using the RSTP protocol. In this embodiment, as an application is started, the BRIQ is identified and mounted as a file system for the application software title in question. This file system mount request is translated to a series of RTSP calls for OPTIONS, DESCRIBE, GET_PARAMETER, and SETUP to create the session. The OPTIONS call generally goes first, and is used to ensure the server has the capabilities required to deliver the application during the session. The DESCRIBE call is then initiated to retrieve the network parameters and file system operational parameters for the session. A series of GET_PARAMETER calls can then be used to retrieve additional needed information for the session that is not accommodated by the RTP response to the DESCRIBE call. Finally a SETUP call is made that completes authentication and authorization for the session, returns a valid session handle to the Network Transport Agent 500, and allocates resources for the session.

In this embodiment, once the SETUP has completed, the system waits until notified by the file system core to begin the streaming process. This will be most likely as a result of a request from the client to the file system to read a block. Optionally, the Stream CODEC 400 can be configured using a policy to initiate the next sequence automatically without additional commands from the file system. The next step in this embodiment is to ask the Network Transport Agent 500 to connect an RTP session using the session information supplied by the DESCRIBE request earlier, and then generate an RTSP PLAY request. At this point, the application is streaming from the server to the host PC 100, and is being cached in cache 910. To end the streaming process, a request will come from the application through the file system that will be interpreted by the Stream CODEC 400 and the Network Transport Agent 500 to create a TEARDOWN request to end the session and deallocate resources. The BRIQ package will be unmounted and an policy specified unmount steps are followed. These steps may include actions such as purging copies of the BRIQ from the cache, purging user changes, copying user changes to an alternate storage location.

During the startup phase, the Stream CODEC 400 cooperates with the file system to understand the application and how it will be streamed. If the BRIQ has been streamed before and has not changed, there will be no reason for retrieving directory information from the server. If much of the BRIQ remains in cache, there is no need to reduplicate streaming of materials already in cache. If all or part of the BRIQ has changed on the server, it is important to update those changes within the file system directory and obtain the new files. The Stream CODEC 400 will identify these changes, invalidate portions of the local cache 910, and re-stream the updated portions of the BRIQ.

While the example session is running, and an application is streaming, the Stream CODEC 400 is responsible for servicing read requests that come from the file system. Its primary goal is to utilize the available network capacity to its policy defined limits during the times when it needs to service requests, minimize network use when no requests are pending, and look ahead to service upcoming requests so requested parts of the BRIQ are already present in cache when required. Though these are somewhat competing goals, an overriding principle is to provide maximal responsiveness to the application.

Additionally, the Stream CODEC 400 provides basic compression and decompression services for in and outbound requests in a manner similar to a normal audio or video CODEC. The Stream CODEC 400 component also provides an optional internal layer for encryption and decryption of inline data to be transmitted and received. If TLS is not being used, an outgoing packet can be internally encrypted, and received packets can be decrypted by the Stream CODEC 400. The Stream CODEC is responsible for providing a basic CODEC interface for encoding and decoding data blocks as they are sent and received from the network. Encryption/Decryption and compression are controlled using policy specifications located in downloaded or locally cached policies.

The Stream CODEC 400, as shown in FIG. 6, comprises several components, some of which may be omitted in specific implementations. Additionally, these components may operate in user space or kernel space, depending upon the implementation. Components of the Stream CODEC 400 include:

Dispatcher 410
Compressor 420
Decompressor 430
Encryptor 440
Decryptor 450
Modeler 460
Request Coder 470

The Dispatcher 410 provides the interface between reception and transmission of file system blocks or directory data and the communication with the file system core. The file system core provides an interface that requires obtaining a handle to kernel memory, filling in that memory, and then releasing that memory after it's use is completed. The Dispatcher 410 obtains the file handles, marshals the data, and releases the data and file handles on behalf of the Network Transport Agent 500.

The Dispatcher 410 operates as follows:
1. A request is received from the file system.
2. The request is picked up by the Dispatcher and handed off either to the Request Coder or directly to the Network Transport Agent 500.
3. The Dispatcher 410 queues requests and waits for them to be serviced by other components. The Request Coder receives data and mount requests. The Dispatcher 410 sends only startup and shutdown commands directly.

The Stream CODEC 400 supports compression and decompression of transferred data on a per datagram basis. The compression format preferred is a block format without a static dictionary. The use of block format compression algorithms is not required but is preferred as it greatly simplifies the implementation of the coder. Stream CODEC 400 can support a plurality of compression and decompression algorithms. For example, the Stream CODEC 400 may implement a plurality of algorithms such as LZO, PPMD, BZIP2, and ZLIB as complementary instances of Compressor 420 and Decompressor 430 components. Each of these coder pairs is preferably a stream coder, but they may also be used on a per block basis. The determination as to which compression/decompression algorithm to use is defined by the policy that establishes the communications stream.

Each incoming block to a decompressor 430 is tagged to indicate if it needs inflating. If so, its wrapper may indicate its final size so that the right size buffer can be allocated. If the buffer is to be the direct memory buffer of the File System Core 300, in the preferred Windows embodiment, it may be 256 k in the PREFEMBOD, so to be of adequate size. It should otherwise be 4 k, 16 k, or 64 k as the session description indicates. Request payloads can be optionally compressed and decompressed as well.

The Stream CODEC 400 also supports encryption and decryption of transferred data on a per datagram basis. The encryption format is preferably a block encryption format, without inter-block chaining. The use of block encryption is not required, but simplifies the implementation of the decryption and reduces the amount of information that must be sent to support the decryption of a single block. For example, Stream CODEC 400 may implement a plurality of algorithms such as IDEA, DES, 3DES as complementary instances of Encryptor 440 and Decryptor 450. Again, the selection of algorithm is performed based upon the specification contained with the applicable policy. It is also possible to use algorithms such as the bijective compression system that includes compression and encryption in a single stage. In this case, the compressor/decompressors may handle both compression/decompression, and encryption/decryption as required.

The system can also ignore compression and encryption flags and allow the data to flow through to disk in an encoded form. In this case, the codec is then used by the file system during its operational phases to translate encoded blocks to usable data.

Additional Stream CODEC 400 components comprise the Request Coder 470 and the Modeler 460. The Dispatcher 410 is responsible for maintaining the state of a stream and translating that state into session requests. The responses of the network from the stream and from session responses are funneled back into the File System Core 300. In an embodiment that uses a File System Interface, the session responses may be routed through the File System Interface.

On session startup, the Dispatcher 410 communicates with the File System Core 300 and the desired server (via the Network Transport Agent 500 and the appropriate Direct Streaming Transport 550) to compare the base properties of the stream for differences. If the directory container has not changed on the server, the Dispatcher 410 advances the stream beyond directory information. Optionally, if the container has changed, the entire directory contents will be downloaded and compared locally.

The Dispatcher 410 then interacts with the Request Coder 470 to determine how to fulfill individual file system requests. The action to be taken, in the case of using RTSP/RTP, can be one of:
- Request an out of sequence packet,
- Advance the file stream to another region of the stream,
- Do nothing and wait for the request to be filled by the network.

The Request Coder 470 uses the Modeler 460 to determine the correct course of action and format a request packet if needed. In any case, the Dispatcher 410 queues the file system request for asynchronous completion.

The Dispatcher 410 watches its queue of requests to ensure that operations are either escalated or retransmitted in cooperation with the Network Transport Agent 500 to guarantee fulfillment. When requests are fulfilled, or other data is received, the Dispatcher 410 updates the Modeler 460 as needed. The Modeler 460 also drives the Request Coder 470 to make additional out of sequence requests, or changes in the file stream to fulfill look ahead needs.

The Stream CODEC 400 makes requests for a packet out of sequence as needed to fulfill specific file system requests or Modeler 470 pre-fetch requests. In one embodiment, a basic timing model is used, although other embodiments may use alternative request models. In the described embodiment, the Network Transport Agent 500 maintains an available TRT, round trip time, and a TD, single link delay. The file system indicates how long it will wait for a request to be fulfilled, TF. Channel bandwidth is preferably known or estimated.

If a packet is expected to be received within one round trip time, no out of sequence request is generated. In practice, the request coder does not generate a request unless one round trip time plus an additional factor to account for the request being queued at the server has elapsed. The queuing factor is in proportion to other requests expected to be queued as well as the time for the packet to be transmitted if the channel bandwidth is proportionally low enough to be significant.

The Modeler 470 maintains a timing interval in addition to those above, the TG or group request time. The length of the group request is in proportion to the number of requests the modeler is configured to look forward. Outside of supporting out of sequence decisions, the Modeler 470 generates requests as needed to fulfill anticipated look-ahead requirements. The Modeler 470 preferably implements a multi-order context model and uses the algorithm prediction by partial match (PPM) to decide what to request in looking ahead.

The purpose of look ahead is to minimize the number of out of sequence requests and stream changes. The greatest benefit of look ahead is predicting file stream pointer changes as early as possible to minimize extraneous out of sequence packets.

The Modeler 470 keeps track of each file system it models, based in part upon the, BRIQ package, but optionally considering such factors as the user requesting the information, the location of the virtual volume components, or meta-data about the user, environment, or BRIQ package. Its internal model is discarded if the server encoding has changed. To prevent the model from exploding in size, the order of the model is controllable and in proportion to the size of the application. Also, the PPM system includes a model pruner to eliminate rarely used or unused contexts in the model. During runtime, the PPM system may bring only part of the model into memory at any one time.

There is no meaningful way to encode the access patterns of data within the file system to guarantee linear access to a constant stream. The file encoding process thus encapsulates the most common file access patterns. In general, it is expected that most data transfers through the streaming process are implicit. A piece of data is transferred automatically inside the linear stream, without guidance from the client requesting a specific piece of data.

If the client needs a file or portion of a file that has not been received or is expected to be received within a certain window, the application may override the current transfer process, either by accessing the file system in a different location, or by making a direct request to the Network Transport Agent 500. For direct requests, the application is able to make a single request for a specific block to be transferred inside the current stream, without interrupting the flow of the stream. Alternately, the stream pointer can be advanced or repositioned to gain access to the needed data.

To enable the highest performance for the file system and avoid continual communication of block requests or stream repositioning requests, the file system and server preferably each build and utilize a model of the access patterns for a particular application software title. It is not necessary that both the server and file system model the access patterns, the modeling may be performed by either the file system or the server and the results communicated to the other, or there may be no modeling performed. The performance model is used to facilitate look ahead on the client, and outline the need for re-encoding on the server.

Figure 9:
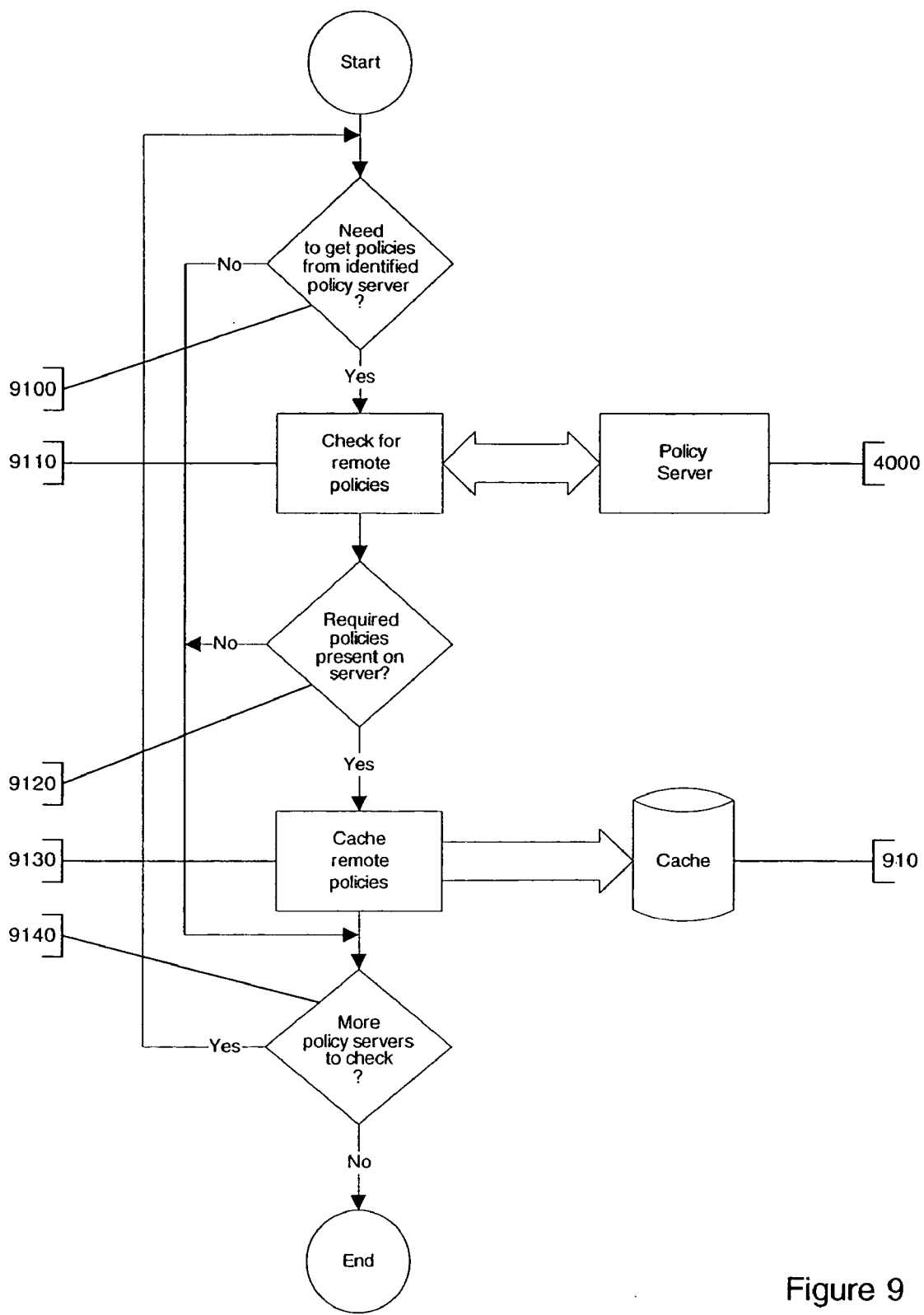
FIG. 9 is a flowchart of the remote policy management process of described embodiment.

The use of using modeling and reporting is controlled by policy, and may be selectively enabled or disabled on individual streams or downloads. The Network Transport Agent 500 preferably builds and maintains a file system access model based on principles such as Huffman coding trees, although the access model mechanism is designed to be both flexible and extensible, and the mechanism used in each circumstance is, in part, determined from the policy that defines the communication. Other models may be desirable or applicable based upon the type of content in the file system, and it is desirable to be able to select the access model to be used on a file system, user application, or connection basis. Each time a file or portion of a file within the file system is accessed, a file system event is recorded. Additionally, the event that follows is recorded in context, as well as separately. An example is illustrated in FIG. 9. At each node, a count is kept for the number of times this sequence has been observed. Thus, if one starts at the root and traces forward to the available nodes that follow the sequence observed, a weighted probability can be observed.

One embodiment uses Network Transport Agent 500's model to predicatively change the stream pointer, so as to maximize the use of the available bandwidth and minimize the latency to serve an expected request. Network Transport Agent 500 also uses this information to request out of band data when necessary to avoid file stream pointer changes. Second, the present invention may combine the application 700's pre-computed knowledge of application access by having the application call an API to communicate this information to the Network Transport Agent, Optionally, this information may be provided within the BRIQ package in a policy specification. Network Transport Agent 500's model, and the contents of the file system cache to aid in look ahead. Finally, the system evolves Network Transport Agent 500's model based on a minimal threshold so as to quickly adapt to a specific user's habits without significant training.

The described embodiment is able to further use its model to assist in the cache hoarding process. Each application software title has a model for how a user accesses a file system. If the model contains sufficient information, the file system core is able to cache the data that is represented in the significant branches of the model. This builds an operational relationship between the application and the stream.

Network Transport Agent 500—The Network Transport Agent 500 is responsible for establishing and maintaining the network connection between the servers 2000, 3000, and 4000 and Stream CODEC 400 (and the file system components) associated with application 700. After opening a network connection, application code is streamed from the server using one of a plurality of transport protocols such as the Real-time Transport Protocol (RTP) as described below. Incoming datagrams are reassembled and passed to the Stream CODEC 400 for delivery to the File System Core 300. User Datagram Protocol (UDP) and Transmission Control Protocol (TCP), as well as other low-level network protocols are supported. The Network Transport Agent 500 may optionally support session-level encryption using session-encryption mechanisms such as TLS/SSL, and may further provide mechanisms such as firewall/proxy tunneling. The Network Transport Agent mechanisms simplify and enhance traditional approaches for host PC's that require access to network-hosted file systems and applications where the access must traverse variable speed communications links or firewalls.

Port proxying encapsulates a first network protocol/packets using a second network protocol/port, and then strips the encapsulation at a later time. In an illustrative example, the Network Transport Agent 500 and its components implement port proxying by translating requests and using alterative protocols and ports under policy guidance and control.

Minimally, most firewalls do not route anything from port 139, and communications that normally use this port are blocked by the firewall. As a result, if the transmissions are sent through port 80, they can pass through this type of firewall. Even in more secure firewalls, port 80 is typically open. In the most secure type, the firewall blocks port 80, but proxies communications on this port. To handle this last configuration, the SMB communication is preferably encapsulated within an HTTP packet, HTTP (SMB packet). As a result, an HTTP header is added, which comprises a request line followed by a post form-data tag. These types of headers are used when data from a form is typically sent to a script process. For the HTTP post to be performed correctly, the content length, content type, and MIME type are also set.

At the other end of the network, a web server of the server system (e.g. on server 2000) listens on the corresponding port for the communications. It receives the HTTP packet with the POST data commands. It strips off the packet's header and then sends the POST data to the application server as SMB packets. Thus, this example SMB proxy allows a file system to operate as if it were mounting a standard Window NT server using the SMB protocol. Communications, however, are actually occurring over port(s) other than those traditionally associated with the SMB protocol. The above example is illustrative only, and a reader skilled in the art will appreciate that the port proxying mechanism described herein may be used to encapsulate any protocol over any other protocol or port based in part upon policy definitions.

Figure 7:
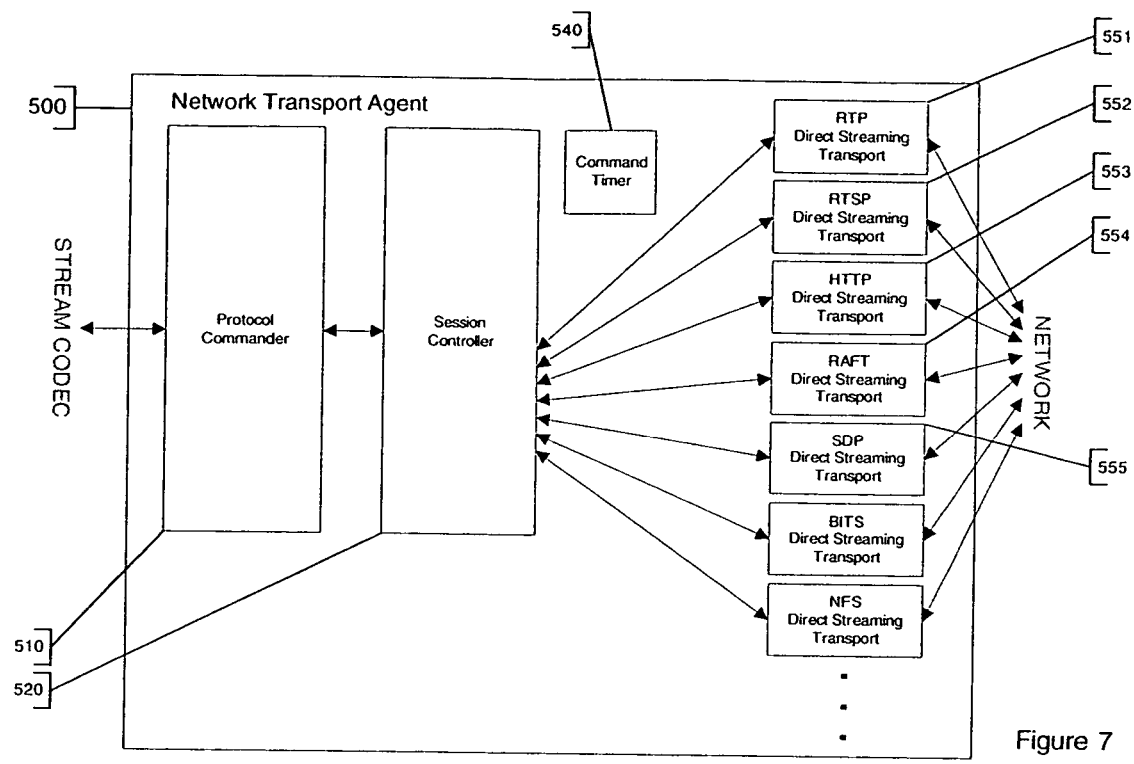
FIG. 7 is a schematic diagram of the Network Transport Agent component of the described embodiment.

FIG. 7 illustrates the Network Transport Agent 500's major functional blocks. The Network Transport Agent 500 comprises the following subcomponents:

Protocol Commander 510
Session Controller 520
Command Timer 540
Direct Streaming Transport 550, and specific instances RTP 551, RSTP 552, HTTP 553, RAFT 554, and SDP 555.

Protocol Commander 510—The Network Transport Agent 500 is responsible for managing the use of multiple protocols with a plurality of sessions to a plurality of servers. The Protocol Commander 510 is responsible for providing an entry point for individual protocol requests into the Network Transport Agent 500. Protocol Commander 510 also orchestrates the coupling of sessions with request/response parsing appropriate for the protocol selected, port proxying, and socket connections required for communication.

Session Controller 520—The Session Controller 520 manages groups of Direct Streaming Transport instances. Individual direct streaming transport instances maintain needed client state and provide an information interface for socket and other operations. Additionally, a single client session often binds more than one socket to it for a complete RTSP, RTP, and RTCP session.

Command Timer 540—This component is used to tag datagrams to be requested for retransmission. In addition, it may be used by other protocols to implement a variety of timeouts.

Direct Streaming Transport 550—The present invention supports various forms of network transport used in communication between host PC 100 and server 2000. Several protocols, overlapping in some respects, may be used for session initiation, authentication, data transfer, and other session control functions. In a preferred embodiment, the system delivers software applications using the Real Time Streaming Protocol (RSTP), the Real Time Protocol (RTP), the Hyper Text Transfer Protocol (HTTP) and extensions to each of these IETF standard protocols. Each of these protocols, RTSP, RTP and HTTP, have clearly defined extension semantics. A description of how these protocols are utilized, as well as extended are described below. A RAFT direct streaming transport 554 is described in the prior description.

The Direct Streaming Transport architecture is extensible and may be extended to use other protocols without loss of functionality or usability. Additional direct streaming transport instances for BITS, NFS, and other products are contemplated as shown in FIG. 7.

Direct Streaming Transport instances 551-555—A simple request/response pipeline, as implemented by Direct Streaming Transport (DST) components, handles basic session communications for protocols such as HTTP or RTSP. Within each DST component, request and response communication objects share responsibility for the protocol implementation with format and parsing objects specific to each protocol. This communication pipeline is suited for connection-based protocols. Protocol specific instances of direct streaming transports include RTP Direct Streaming Transport 551, RTSP Direct Streaming Transport 552, HTTP Direct Streaming Transport 553, RAFT Direct Streaming Transport 554, and SDP Direct Streaming Transport 555, as well as more traditional file system based protocols such as NFS, BITS, and SMB/CFIS.

RTP Direct Streaming Transport 551—The RTP Direct Streaming Transport 551 implements the RTP and SDCP protocols as described below. The present invention uses the Real Time Protocol (RTP) as the basic streaming protocol for delivering application software titles. RTP is predominantly a protocol for delivering unicast or multicast media from servers to Direct Streaming Transport 551s in a scalable and reliable fashion. Extensions to the protocol are part of the present invention and a new packet profile, Software Distribution and Control Protocol (SDCP), are described in detail below.

RTP/SDCP (Software Distribution and Control Protocol)—When using RTP for file system streaming, a profile appropriate for streaming software should be utilized. The profile should guarantee fidelity of transmission, by use of any means available such as error correction, checksum validation, or retransmission. Software cannot be transmitted via a lossy transmission system, so the RTP protocol should be optimized for guaranteed transport.

The RTP protocol consists of two channels: data transfer (RTP) and control (RTCP). These channels cooperate to transmit data and can both be bi-directional. Most often, the RTP channel is a simplex channel, while RTCP is a duplex channel. The definition of the SDCP profile is for both UDP and TCP.

The RTP data transfer protocol is responsible for implementing the two basic network file system operations. For this purpose there are three preferred payload formats. These formats will carry data for general stream delivery and for servicing out of band requests. For general stream delivery, there are two packet types, the first to carry standard stream data, the second to carry the same data along with forward error correction (FEC) codes.

Using the FEC packet type, data can be more reliably streamed with minimal overhead. Appended to the end of a standard payload packet is code information from which a lost packet can be re-assembled. The FEC methodology can be used to correct multiple packets lost, but this imposes significant communications overhead. Restricting the FEC code to being able to restore only a single lost packet, the overhead should preferably be kept to between 5% to 10% additional data per packet.

An RTP packet is preferably transmitted with a fixed header. This header contains the basic frame information to identify the sender of the RTP packet, and allow it to be decoded effectively by a receiver. In a preferred embodiment, a fixed header might be encoded as shown below:

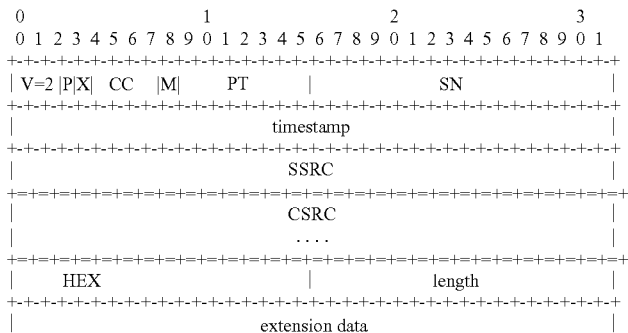

Version (V)=2. The value is encoded as 0b10.

Padding (P)=Padding bit, set if the number of bytes to be transferred is not even, or does not fit a block boundary for compression or encryption.

Extension (X)=0/1. This will signify that a profile specific header extension is to be used, as shown.

CSRC Count (CC)=0. This value will most often be zero, though does not have to be, if the RTP has been proxied, cached or otherwise mixed by an intermediary. If it is nonzero, then one or more CSRC values will immediately follow the header packet.

Marker bit (M)=0/1. The marker bit is to be used by the RTP transmitter to signal frame boundaries. A complete data packet may consist of more than one RTP. In this case, the RTP transmitter can use the marker bit to signal if an RTP is the end of a new packet. If an RTP is one single packet, then the marker bit will be set.

Payload Type (PT)=RTP_SDCP. This is a 7 bit code signaling the use of a specific RTP profile.

Sequence Number (SN)=This is a 16 bit value used to identify each RTP as it is sent, so that a receiver can determine if a packet is lost.

Timestamp=This is a timestamp indicating the time of transmission of the packet from the sender to the receiver. This value will be used by the receiver to determine jitter, and to synchronize its clock with that of the sender.

SSRC=A random source identifier created to guarantee session identification.

Header Extension Type (HEX)=Profile specific extension defined by each individual RTP type. For the SDCP formats, there are no header extensions.

General Data Packet Format—An RTP data packet is assembled from an RTP header and a basic SDCP data packet. The RTP header preferably has the following values set. PT, the payload type, is set to RTP_SDCP. The marker bit indicates the last packet in a full SDCP block.

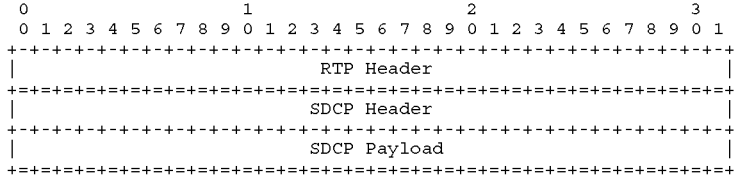

In a one embodiment, each SDCP block begins with a specific SDCP Header, as shown below.

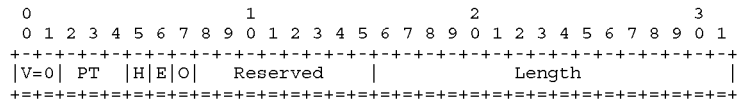

Version (V)=SDCP Version.

Payload Type (PT)=SDCP specific payload type, can be one of the following values: SDCP_DIR for directory information, SDCP_DATA, SDCP_FECD.

Header (H)=Header bit, determines if there is additional header information following, or if this RTP is a continuation of a macro SDCP block.

Encoding (E)=The Encoding bit determines whether this SDCP packet is encoded according to the encoding type appropriate for this particular file and its associated MIME type.

Out of Sequence (O)=This bit determines if this packet was transmitted normally, or as a response to an out of sequence packet request.

After each header there is either an SDCP specific header, or simply data as a continuation from an earlier SDCP block. In the preferred embodiment, the SDCP specific header contains encoding information, such as code or dictionary tables, or further session encryption keys and will follows the format below:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| HTYPE |     Reserved          |            Length             |
+-+-+-+-+-+-+-+-+-+-+-+-+-+-+-+-+-+-+-+-+-+-+-+-+-+-+-+-+-+-+-+-+
|                         header data                           |
```

An SDCP_DIR block contains directory information for the software file system. If the encoding bit is set, then all following data in the block can be considered opaque, and the receiver must decode the block before further processing the directory information. If the encoding bit is not set, then the packet follows this basic format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Entry Version                                           |
+-+-+-+-+-+-+-+-+-+-+-+-+-+-+-+-+-+-+-+-+-+-+-+-+-+-+-+-+-+-+-+-+
|       File GUID                                               |
|                                                               |
|                                                               |
|                                                               |
+-+-+-+-+-+-+-+-+-+-+-+-+-+-+-+-+-+-+-+-+-+-+-+-+-+-+-+-+-+-+-+-+
|       Parent GUID                                             |
|                                                               |
|                                                               |
|                                                               |
+-+-+-+-+-+-+-+-+-+-+-+-+-+-+-+-+-+-+-+-+-+-+-+-+-+-+-+-+-+-+-+-+
|       File Name Length                                        |
+-+-+-+-+-+-+-+-+-+-+-+-+-+-+-+-+-+-+-+-+-+-+-+-+-+-+-+-+-+-+-+-+
|       File Name                                               |
|                     ....                                      |
+-+-+-+-+-+-+-+-+-+-+-+-+-+-+-+-+-+-+-+-+-+-+-+-+-+-+-+-+-+-+-+-+
|       Short File Name Length                                  |
+-+-+-+-+-+-+-+-+-+-+-+-+-+-+-+-+-+-+-+-+-+-+-+-+-+-+-+-+-+-+-+-+
|       Short File Name                                         |
|                     ....                                      |
+-+-+-+-+-+-+-+-+-+-+-+-+-+-+-+-+-+-+-+-+-+-+-+-+-+-+-+-+-+-+-+-+
|       File Attributes Length                                  |
+-+-+-+-+-+-+-+-+-+-+-+-+-+-+-+-+-+-+-+-+-+-+-+-+-+-+-+-+-+-+-+-+
|       File Attributes                                         |
|                     ....                                      |
+=+=+=+=+=+=+=+=+=+=+=+=+=+=+=+=+=+=+=+=+=+=+=+=+=+=+=+=+=+=+=+=+
```

An SDCP_DATA block follows a format based on absolute file offsets, where the SDCP File Pointer is equivalent to the first 32 bits of the file's GUID.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                      SDCP File Pointer                        |
```

FEC Packet Format—To transmit an application software title efficiently in real time, it is preferable that delays be avoided. Though a packet retransmission request can ensure delivery, a full round trip time preferably should be avoided over slow links if the application is to retain good response time. Forward error correction is a way to ensure that the loss of packets can be handled resiliently without retransmission.

The forward error correction packet follows the specification outlined in the Internet RFC 2733, and is shown below. The FEC payload data is computed as the basic FEC protection operation computed on a general data packet and then appended to the FEC header.

RTCP—The RTCP control protocol is used by the Direct Streaming Transport 551 for two primary purposes: informing the server of the quality of the stream, and controlling the contents of the stream. Each Direct Streaming Transport 551 and server implements standard sender and receiver reports which show the network quality as well as positively acknowledging the packets being sent. In addition, the Direct Streaming Transport 551 implements a retransmission request for negatively acknowledging packets that are lost and need to be resent. Finally, the Direct Streaming Transport 551 implements an out of sequence packet request for deliv-

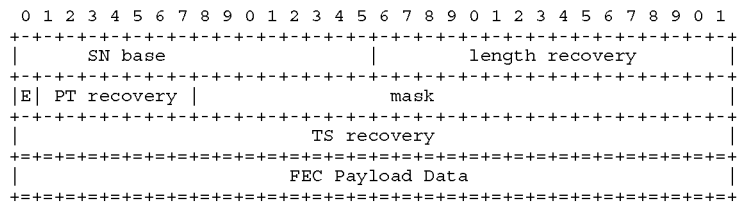

Out of Sequence Packet—An out of sequence packet sets the SDCP header bit O. The SDCP header has an extension header appended as follows. The Encoded file offset reflects the actual byte position in the encoded package file that the data packet was retrieved from, so that an intermediate mixer can appropriately recreate the actual encoded file if it determines the need.

ering data that would not normally be part of the current stream.

Senders and receivers use RTCP data to assist in the efficient use of the RTP channel. For the SDCP protocol this also includes extra packets for controlling the data within the RTP stream. To be compliant with RTP specifications though, the

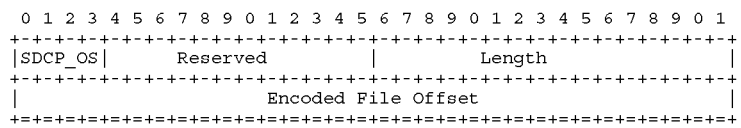

Transparent File System Response—In the case of a transparent file system response packet, all RTP payload data is considered opaque. Only the sender and receiver should interpret this data. If it is desirable for a proxy or cache to understand the request, then a header extension should be used which declares the file system type being used so that the packet can then be parsed according to the format of that particular network file system.

RTCP channel can consume no more than 5% of the overall bandwidth utilized by the entire RTP session. To follow this guideline, it is important that any RTCP sent be controlled or queued to the appropriate time, plus or minus some statistical deviation.

For SDCP, important uses of RTCP are for out of sequence packet and packet retransmission requests. It is preferable that the RTP medium be lossless.

Performance Data-Sender/Receiver Report (SR/RR)—Periodically, RTP senders and receivers should provide feedback on the quality of the data transmission. As defined in RFC 1889, reports should be sent on intervals of a minimum of five seconds. Also, each interval should be varied to +/−50% of the overall interval to avoid synchronized floods of RTCP packets. In general, an interval should grow from 5 seconds out during the time-span of a full SDCP session, as reports become less needed if the line is stable. However, if the Direct Streaming Transport 551 notices unexpected delay, the Direct Streaming Transport 551 should back down the interval to five seconds and begin backing off again. The use of sender and receiver reports, SR and RR, duplicate that description in RFC 1889.

Source Description Packet (SDES)—Most RTCP packets are expected to be delivered in compound form. Attached to each SR, RR, or other, will be an SDES, or source description packet. In addition, when an SDCP session is started SDES packets are used by the server and receiver to identify one to each other. In a preferred embodiment, these packets should be periodically sent to ensure that if an SSRC has changed, its CNAME can be changed along with it. Also, if a receiver drops and re-establishes a network connection, the receiver should re-exchange SDES information.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|  SC=1   |  PT=SDES=202  |            length             |
+=+=+=+=+=+=+=+=+=+=+=+=+=+=+=+=+=+=+=+=+=+=+=+=+=+=+=+=+=+=+=+=+
|                         SSRC/CSRC_1                           |
+-+-+-+-+-+-+-+-+-+-+-+-+-+-+-+-+-+-+-+-+-+-+-+-+-+-+-+-+-+-+-+-+
|   CNAME=1     |    length     | user and domain name       ...
+-+-+-+-+-+-+-+-+-+-+-+-+-+-+-+-+-+-+-+-+-+-+-+-+-+-+-+-+-+-+-+-+
|                        Other SDES Items                       |
+=+=+=+=+=+=+=+=+=+=+=+=+=+=+=+=+=+=+=+=+=+=+=+=+=+=+=+=+=+=+=+=+
```

The SDES packet for SDCP has a value of 1 for the Source Count (SC) packet, identifying only one source for the session. This is indicative of the unicast only use of RTP for this protocol. Also, the description of individual SDES items is described in RFC 1889, but only the CNAME is generally used in SDCP.

Out of Sequence Data Request (OOS)—On occasion a session receiver requires bytes from a file out of the order of the standard stream. When this occurs, a Direct Streaming Transport 551 can either advance the stream using RTSP, or if it is expected to be a single or small number of packets, the Direct Streaming Transport 551 may specifically request only those packets as out of sequence data.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |  PT=RTCP_OOS  |            length             |
+-+-+-+-+-+-+-+-+-+-+-+-+-+-+-+-+-+-+-+-+-+-+-+-+-+-+-+-+-+-+-+-+
|                         SSRC of server                        |
+=+=+=+=+=+=+=+=+=+=+=+=+=+=+=+=+=+=+=+=+=+=+=+=+=+=+=+=+=+=+=+=+
|       File Offset                                             |
+-+-+-+-+-+-+-+-+-+-+-+-+-+-+-+-+-+-+-+-+-+-+-+-+-+-+-+-+-+-+-+-+
|       File Offset 2 ...                                       |
+=+=+=+=+=+=+=+=+=+=+=+=+=+=+=+=+=+=+=+=+=+=+=+=+=+=+=+=+=+=+=+=+
```

The format of the elements of this packet follows the definitions shown in other packets above. The Request Count (RC) packet is used to define how many out of sequence requests will follow the basic header, as a hint to the RTP receiver.

General Stream Advance (SADV)—A session receiver may determine that the proscribed stream position is incorrect, and that the use of OOS packets will overload the network. To accommodate this change, in addition to the option of using RTSP, the SDCP protocol allows the request to be inlined within RTCP. The format of the packet follows, but basically encompasses, an absolute file pointer to a computed offset within the package file.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |  PT=RTCP_SADV |           length              |
+-+-+-+-+-+-+-+-+-+-+-+-+-+-+-+-+-+-+-+-+-+-+-+-+-+-+-+-+-+-+-+-+
|                        SSRC of server                         |
+=+=+=+=+=+=+=+=+=+=+=+=+=+=+=+=+=+=+=+=+=+=+=+=+=+=+=+=+=+=+=+=+
|       File Offset                                             |
+=+=+=+=+=+=+=+=+=+=+=+=+=+=+=+=+=+=+=+=+=+=+=+=+=+=+=+=+=+=+=+=+
```

Transparent Write Through (TWT)—An SDCP server may support the ability to accept writes. The TWT packet defines a write to the server. No locking protocol is specified. Any synchronization issues should be handled on the server. The negotiation of the support for write through should be done using one of the other session protocols, like RTSP or SDP.

The file system type (FST) should preferably be one of NFS, CIFS, or other file system protocol.

Packet Retransmission (NACK)—If a packet of RTP payload data is lost, it must be retransmitted, or the Direct Streaming Transport 551 must be made aware of the packet loss. To achieve the retransmission, the RTCP_NACK packet is used.

All RTP payload packets are tagged with a sequence number. Using this sequence number, it is understood by those skilled in the art to reassemble data from packets and account for out of order receipt. In order to detect packet loss, as opposed to out of order receipt, the Direct Streaming Transport 551 must have a timing interval during which to judge loss. The Direct Streaming Transport 551 should be able to

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |  PT=TRCP_TWT  |           length              |
+-+-+-+-+-+-+-+-+-+-+-+-+-+-+-+-+-+-+-+-+-+-+-+-+-+-+-+-+-+-+-+-+
|                        SSRC of server                         |
+=+=+=+=+=+=+=+=+=+=+=+=+=+=+=+=+=+=+=+=+=+=+=+=+=+=+=+=+=+=+=+=+
|       SDCP File Pointer                                       |
+-+-+-+-+-+-+-+-+-+-+-+-+-+-+-+-+-+-+-+-+-+-+-+-+-+-+-+-+-+-+-+-+
|       File Offset                                             |
+-+-+-+-+-+-+-+-+-+-+-+-+-+-+-+-+-+-+-+-+-+-+-+-+-+-+-+-+-+-+-+-+
|         Range                 |        Data Length            |
+-+-+-+-+-+-+-+-+-+-+-+-+-+-+-+-+-+-+-+-+-+-+-+-+-+-+-+-+-+-+-+-+
|       File Data                                               |
|                     ....                                      |
+=+=+=+=+=+=+=+=+=+=+=+=+=+=+=+=+=+=+=+=+=+=+=+=+=+=+=+=+=+=+=+=+
```

Transparent File System Request (TFSR)—Though an RTP session is presumed to be carrying SDCP specific data, it is possible for the session to proxy other file system data. This is useful to support data drives for Direct Streaming Transport 551s of SDCP servers. By supporting this type of access, an SDCP server does not have to implement the full scope of file server operations, but can instead proxy them to other systems. The use of this packet uses the transparent file system response packet.

utilize the timing information contained in the RTP headers to ascertain an estimated link delay time (TD) and also round trip time (TRT). If a packet is not received within one link delay time from the detection of out of order receipt, it is accounted as lost.

Preferably, a retransmission packet should not be sent the instant a loss has been detected. To reduce retransmission requests and provide for the probability of bulk packet loss, the loss should be queued. An additional link delay time from

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   FST   |  PT=RTCP_TFSR |           length              |
+-+-+-+-+-+-+-+-+-+-+-+-+-+-+-+-+-+-+-+-+-+-+-+-+-+-+-+-+-+-+-+-+
|                        SSRC of server                         |
+=+=+=+=+=+=+=+=+=+=+=+=+=+=+=+=+=+=+=+=+=+=+=+=+=+=+=+=+=+=+=+=+
|       Opaque File System Request                              |
|                     ....                                      |
+=+=+=+=+=+=+=+=+=+=+=+=+=+=+=+=+=+=+=+=+=+=+=+=+=+=+=+=+=+=+=+=+
``` the packet at the head of the queue should be implemented before requesting retransmission. In this way, no more than one full round trip time will occur before requesting retransmission of any lost packet.

Next, in one embodiment, a Direct Streaming Transport 551 requests the options that a server supports and engages an RTSP communications session with the server. This is shown in the following example session trace:

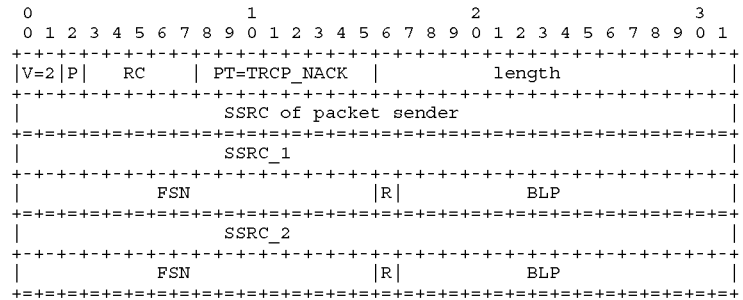

In this packet format, the FSN, first sequence number, represents the first sequence number known to be lost. The retransmit bit (R) should be set, but may be zero to notify the server of loss but not request retransmission. The BLP, bitmask of following lost packets, represents a bitmask of the 16 packets following the FSN. If any of the mask bits are set, retransmission is also requested for each specified packet.

It is important to note that in implementing retransmission, a Direct Streaming Transport 551 must be aware of duplications. If a packet is thought lost and a retransmission request generated, and then both the original and retransmitted packet arrive, one is discarded by the receiver.

Prototype Session—In the example of a preferred embodiment, a Direct Streaming Transport 551 (C) connects to either an HTTP Server (W) or optionally a server supporting parts of the HTTP protocol to begin the session:

```
C->W    GET /land3d.osd HTTP/1.1
        User-Agent: Mozilla 4.0 en/us
        Accept: */*
        ...
W->C    HTTP/1.1 200 OK
        Content-Type: application/softricity
        Content-Length: XXXXXX
        <OSD file follows inline>
```

The server response of an alternative embodiment is shown below:

```
W->C    HTTP/1.1 200 OK
        Content-Type: application/softricity
        rtsp://www.enduser.com/land3d.osd
```

In a second example embodiment, the Direct Streaming Transport 551 then accepts the redirection and connects to the enduser.com server in order to retrieve the necessary package file as part of its session initiated with that server.

```
C->S    OPTIONS * RTSP/1.0
        CSeq: 1
        Require: Inline-Secure
        User-Agent: Softricity Client v2.0 [Win32; Windows NT]
        Client-GUID: 12345678-1234-1234-123456789012
S->C    RTSP/1.0 200 OK
        CSeq: 1
        Server: Softricity Server v2.0 [Win32; Windows 2000]
        Unsupported: Inline-Secure
        Public: OPTIONS, DESCRIBE, SETUP,
        TEARDOWN, PLAY, PAUSE
```

After obtaining the options that the server supports, the Direct Streaming Transport 551 will attempt to retrieve the parameters describing the commencing stream. First, it will execute a DESCRIBE transaction, passing in a bandwidth specification if the Direct Streaming Transport 551 has been configured with this preference, or if the Direct Streaming Transport 551 has observed an approximate requirement. The preferred media type supported for package files is application/sdp.

```
C->S    DESCRIBE rtsp://softricity/land3d.jgs RTSP/1.0
        CSeq: 2
        Bandwidth: 57600
        Accept: application/sdp
        User-Agent: Softricity Client v2.0 [Win32; Windows NT]
        Client-GUID: 12345678-1234-1234-123456789012
S->C    RTSP/1.0 401 Unauthorized
        CSeq: 2
        Server: Softricity Server v2.0 [Win32; Windows 2000]
        WWW-Authenticate: Basic realm="Softricity"
```

In this example trace, the server refused the connection, and requested authentication from the Direct Streaming Transport 551. In general, a server protects all requests for specific RTSP URL's that are protected by authentication requirements. The server challenged, requesting HTTP Basic authentication to be used. The Direct Streaming Transport 551 then retransmited the request, inserting the needed authentication parameters. If known a priori, the Direct Streaming Transport 551 can presend the authentication parameters and avoid the challenge/response shown here (for certain authentication schemes), as shown below.

```
C->S  DESCRIBE rtsp://softricity/land3d.jgs RTSP/1.0
      CSeq: 3
      Bandwidth: 57600
      Blocksize: 4096
      Accept: application/sdp
      User-Agent: Softricity Client v2.0 [Win32; Windows NT]
      Client-GUID: 00000000-0000-0000-000000000000
      Authorization: Basic QWxhZGRpbjpvcGVuIHNlc2FtZQ==
S->C  RTSP/1.0 200 OK
      CSeq: 3
      Server: Softricity Server v2.0 [Win32; Windows 2000]
      Last-Modified: Tue, 1 Apr 2001 12:45:26 GMT
      Content-Type: application/sdp
      Content-Length: 3459
      v=0
      o=- 2890844526 2890842807 IN IP4 192.168.1.100
      s=Some Company Name, Microsoft Word, 04/01/2001
      i=Microsoft Word, 10.0.0, Microsoft
      c=IN IP4 0.0.0.0
      b=AS:57600
      m=application 4000/2 RTP/SDCP 125
      a=rtpmap:125 X-Softricity/1
      a=fmtp:CODEC 200
      a=length:abslen=23456;blocklen=15
      a=SoftricityFile Version:16843009
      a=SoftricityDirectoryVersion:9
      a=SoftricityBlockMapVersion:9
      a=SoftricityLaunchSize:23456
```

At this point in the example session, the Direct Streaming Transport 551 checks the versions announced for each of the SDP version parameters. If any internal data structures do not match these versions, the Direct Streaming Transport 551 requests each set in succession; otherwise the Direct Streaming Transport 551 proceeds to the SETUP transaction.

```
C->S  SETUP rtsp://softricity/land3d.jgs RTSP/1.0
      CSeq: 4
      User-Agent: Softricity Client v2.0 [Win32; Windows NT]
      Client-GUID: 00000000-0000-0000-000000000000
      Transport: RTP/SDCP/UDP;unicast;client_port=4000-4001
S->C  RTSP/1.0 200 OK
      CSeq: 4
      Session: 12345678
      Server: Softricity Server v2.0 [Win32; Windows 2000]
      Transport: RTP/SDCP/UDP;unicast;
      client_port=4000-4001;server_port=5000-5001
C->S  PLAY rtsp://Softricity/land3d.jgs RTSP/1.0
      CSeq: 5
      User-Agent: Softricity Client v2.0 [Win32; Windows NT]
      Client-GUID: 00000000-0000-0000-000000000000
      Session: 12345678
S->C  RTSP/1.0 200 OK
      CSeq: 5
      Session: 12345678
      Server: Softricity Server v2.0 [Win32; Windows 2000]
      RTP-Info: url=rtsp://softricity/land3d.jgs;seq=9999
C->S  TEARDOWN rtsp://Softricity/land3d.jgs RTSP/1.0
      CSeq: 6
      User-Agent: Softricity Client v2.0 [Win32; Windows NT]
      Client-GUID: 00000000-0000-0000-000000000000
      Session: 12345678
S->C  RTSP/1.0 200 OK
      CSeq: 6
      Session: 12345678
      Server: Softricity Server v2.0 [Win32; Windows 2000]
```

RTSP DST 532—The Real Time Streaming Protocol provides an implementation framework for the basic session initiation and control semantics. It also provides a framework for encapsulating raw data transfer traffic inline. The RTSP is described in [RFC 2326], with enhancements of the present invention described below.

The Direct Streaming Transport 552 establishes a session with a server using the RTSP protocol. The RTSP protocol is designed to establish and control synchronized streams of continuous media. RTSP is a connectionless, stateful session protocol, mimicking a great deal of the HTTP/1.1 syntax, though it can be implemented on a connectionless or connection-based transport. The preferred implementation is based on TCP. Once a connection is established to a server, a session identifier is used throughout the life of the RTSP session.

The implementation of RTSP by the server accommodates the headers needed for traditional audio and video, in addition to extensions that are part of the present invention. An example embodiment defines a prototypical session enacted by a Direct Streaming Transport 552 and server, including all optional and extended requests. The server preferably implements the following RTSP Methods for software: OPTIONS, DESCRIBE, GET_PARAMETER, SET_PARAMETER, PLAY, REDIRECT, SETUP, TEARDOWN Message Headers—The Direct Streaming Transport 552 and server implements a complete set of RTSP message headers in addition to a number of implementation specific headers. A list of options preferably supported by a server in the present invention is described below, with additional description of each command's syntax.

User-Agent (Request Only)—The Direct Streaming Transport 552 connects to any server and broadcast its type as:
Softricity Client/<Major>.<Minor>.<Revision>.<Build> [<OS Family>; <Client OS>],
where Major and Minor describe Direct Streaming Transport 552 software version numbers. The OS Family describes the Direct Streaming Transport 552 platform as either Win16, Win32, UNIX, Mac, or other. The Client OS describes the actual flavor of the operating system running on host PC 100. For example, a Windows NT machine running version 2.0 of the Direct Streaming Transport 552 would address:
User-Agent: Softricity SoftGrid Client/2.0.0.0 [Win32; Windows NT]

Server (Response Only)—The server transmits an identifier to the Direct Streaming Transport 552 with each request, identifying its type similarly to the User-Agent property. It sends its type as:
Softricity Server/<Major>.<Minor>.<Revision>.<Build> [<OS Family>; <Server OS>]

Client-GUID (Request Only)—Every Direct Streaming Transport 552 registers a GUID at the time of installation. This GUID is not transmitted to a server at time of install, but is continually sent to a server to identify the Direct Streaming Transport 552 uniquely. The format of the header is as follows:
Client-GUID: 00000000-0000-0000-0000-000000000000

Bandwidth (Request Only)—At the time of installation, or during its operation, the Direct Streaming Transport 552 obtains an estimated available bandwidth, or bandwidth to be used for its operation. This parameter is transmitted to a server as a hint for network operations as shown by the example Bandwidth directive shown below. It sends in bits per second. It is most typically sent during the DESCRIBE operation so that the server can forward the Direct Streaming Transport 552 to an address appropriate for the network speed.
Bandwidth: 57600

Inline-Secure—By default, a server transmits all packets contained in the media file to a Direct Streaming Transport 552. When the Inline-Secure option is specified, the Direct Streaming Transport 552 is notified that the server is enforcing ACL checking. For any BRIQ or part of a BRIQ which is requested, or to be transmitted, there is no notification to the Direct Streaming Transport 552 that the server has refused to transmit the data, it silently fails.

A Direct Streaming Transport 552 should preferably transmit the following header during a SETUP transaction:
Require: Inline-Secure
And a server responds with:
Unsupported: Inline-Secure
or:
Inline-Secure: UNIX Depending on its support for the feature. If the feature is supported, the server can respond that it will be checking UNIX permissions, NT ACLs, or discretionary ACLs depending on its configuration for that application. The values can be: UNIX, ACL, discretionary.

Blocksize—This header is transmitted from the Direct Streaming Transport 552 to the server as part of a DESCRIBE, SETUP or PLAY request indicating a desired RTP packet size. This does not imply any IP, UDP, or TCP packet size, only the size of the media packet contained within the RTP. The server may actually transmit smaller packets, but will not exceed the blocksize requested.

Cache-Control—The Cache-Control directive controls intermediate proxies and caches that exist between a Direct Streaming Transport 552 and server. The directives used by the present invention only apply to the RTSP connection and follow those specified in HTTP/1.1. For example, the directive "Cache-Control: no-cache" instructs an intervening cache not to cache the contents of the message that follows. In general, this directive is most often used with the DESCRIBE transaction, controlling how the SDP response may or may not be cached. It is important to note that this option can be sent as part of a request or a response.

ETag (Response Only)—This header is an entity tag used to mark specific content with a value that can be used later in other transactions with headers such as If-Match.

Expires (Response Only)—The Expires header is used to indicate a date and time after which a response message is no longer valid. Again, this header could be used with the DESCRIBE transaction to indicate a valid window of use for the SDP data.

If-Match (Request Only)—The If-Match header can be used in combination with entities tags to declare conditional retrieval for an object. If an entity tag was previously set "ETag: foo", then an "If-Match: foo" would allow the request to be completed.

If-Modified-Since (Request Only)—The If-Modified since header can be used with any request to make it conditional against the date of modification of a request object. If the object has not been changed, a 304 Not Modified response will be returned by the server.

Last-Modified (Response Only)—For responses containing data from the server, such as the SDP sent by a DESCRIBE response, the server sets a date of last modification using this header.

Range—This header is used to indicate a range of information to be sent from a server to a Direct Streaming Transport 552 as part of a PLAY request. A server should be able to understand ranges indicated in several fashions. A Direct Streaming Transport 552 can request a specific block range, time range, or feature range. In any case, values specified with the header can be closed or left as open intervals, where open intervals represent from a range to the end of the stream or time period.

The header can be expressed, in part, using any of the example constructs shown below:
Range: blocks=0-15
Range: blocks=
Range: feature=1
Range: npt=0-60

The first example requests a specific block range, and the second implies all blocks should be transmitted. The third example requests all blocks corresponding to the first feature. The final example requests 60 seconds of time for the PLAY to be valid.

RTP-Info (Response Only)

The RTP-Info header is used in a server response to indicate the sequence number of the first packet that will be transmitted via the RTP channel for the particular play request. An example is shown below.
RTP-Info: url=rtsp://softricity/land3d.jgs;seq=9999

Session—The Session header is used in both requests and responses to indicate that the values contained therein correspond to an acknowledged session between the Direct Streaming Transport 552 and server. The server will generate the session identifier and can give it an optional timeout field in seconds as shown in the following example:
Session: 12345678; timeout=120

For a Direct Streaming Transport 552 using the same application more than one time, a new session identifier must be generated for that session. If the same Direct Streaming Transport 552 is using different applications on the same server, it is not required to negotiate a new session and is recommended to piggyback its requests on the same session.

Timestamp—The Direct Streaming Transport 552 sending a request to the server uses the timestamp header. The value of the timestamp is of significance only to the Direct Streaming Transport 552 and may use any timescale. The server will echo the exact same value and MAY, if it has accurate information about this, add a floating point number indicating the number of seconds that have elapsed since it received the request. The timestamp is used by the Direct Streaming Transport 552 to compute the round-trip time to the server so that it can adjust the timeout value for retransmissions. The Direct Streaming Transport 552 should send this value periodically to ensure an accurate value is known for the round-trip time.

Transport—The Direct Streaming Transport 552 and server use the RTSP Transport header to negotiate the parameters of the ensuing session. A transport protocol is chosen and parameters for the session are agreed upon. For the session, a Direct Streaming Transport 552 will preferably announce the use of the RTP/SDCP profile. This protocol can be specified as S)RTP/SDCP, (S)RTP/SDCP/UDP, or (S)RTP/SDCP/TCP, where the S implies a secure tunnel.

A Direct Streaming Transport 552 initiates the transport negotiation in the SETUP request using a request like the one shown below. The unicast parameter is generally present, neither the Direct Streaming Transport 552 nor server is required to support multicast. The Direct Streaming Transport 552 also indicates its preferred local ports to the server using a header like the one shown in the example below:
Transport: rtp/sdcp/udp;unicast;client_port=4001-4002

A server responds with the same header, adding a server_port entry corresponding to the source ports for the RTP session on the server. It is possible that the server rejects the suggested Direct Streaming Transport 552 ports, in which case the Direct Streaming Transport 552 must reattempt the SETUP request. If the server is not configured to support the request transport, it returns a 461 Unsupported transport response.

Other Options—The server and Direct Streaming Transport 552 preferably implement all other appropriate headers according to the RTSP RFC 2326. These headers include: Connection, Content-Language, Content-Encoding, Content-Length, Content-Type, CSeq, Location, and Public.

OPTIONS—When a Direct Streaming Transport 552 connects to an RTSP server, it should determine whether or not that server supports needed protocols. The server transmits a response with an additional "Public" header that defines the RTSP command subset it implements. A Direct Streaming Transport 552 can use the OPTIONS request to determine a server's settings before waiting for an option to fail. In the example below, the Direct Streaming Transport 552 sends a "Require" field along with the OPTIONS request. In this case, the server responds by appending the appropriate response headers to the message. An example interchange is shown below:

```
C->S      OPTIONS * RTSP/1.0
          CSeq: 2
          Require: Inline-Secure
S->C      RTSP/1.0 200 OK
          CSeq: 2
          Unsupported: Inline-Secure
          Public: OPTIONS, DESCRIBE, SETUP,
          TEARDOWN, PLAY, PAUSE
```

DESCRIBE—A Direct Streaming Transport 552 uses the DESCRIBE request to request the parameters of a session from a media server. The URL indicated in the request is parsed by the server and an appropriate SDP response is sent, describing the options of the session to be setup with the server. The full syntax of the SDP response is documented below.

GET_PARAMETER—In the following example of the preferred embodiment of the Direct Streaming Transport 552, the Direct Streaming Transport 552 is requesting a value for some parameter. The format of the response is dependent on the value of the parameter. In addition, a null parameter request can be used to create an echo or heartbeat between the Direct Streaming Transport 552 and server.

In the Direct Streaming Transport 552, each session may or may not need to acquire a specific license for the session. The server may transmit this license data as part of the reply to the initial PLAY request, or can do so as a response to GET_PARAMETER, using the license_key value. The format of the response can either be registry keys to be set by the Direct Streaming Transport 552, or simply an acknowledgement value that the Direct Streaming Transport 552 should use when it checks a license back in. The following sample exchange provides an example of the GET_PARAMETER request.

```
C->S      GET_PARAMETER
          rtsp://Softricity/land3d.jgs RTSP/1.0
          CSeq: 8
          Session: 123456
          Content-Length: 11
          <license_key>
S->C      RTSP/1.0 200 OK
          CSeq: 8
          Session: 123456
          Content-type: text/xml
          Content-Length: 1234
          <LICENSE_KEY>
          ...
          </LICENSE_KEY>
```

A Direct Streaming Transport 552 that is running a session which is being metered according to a time-based usage scenario, should be able to request a value indicating the time outstanding in the current session. This value is license_timeout, and the data returned is in simple plaintext.

```
C->S      GET_PARAMETER
          rtsp://Softricity/land3d.jgs RTSP/1.0
          CSeq: 8
          Session: 123456
          Content-Length: 11
          license_timeout
S->C      RTSP/1.0 200 OK
          CSeq: 8
          Session: 123456
          Content-type: text/plain
          Content-Length: 1234
          license_timeout: 180
```

SET_PARAMETER—In this example of a preferred embodiment, the Direct Streaming Transport 552 is attempting to set a parameter. One use of SET_PARAMETER echos the examples used above for time-based licensing. If a Direct Streaming Transport 552 is running out of time for a session, it may request more through the license_timeout value. Any attempt to set this value is taken as a request for this many more seconds of time. The server responds with the total number of seconds available to the Direct Streaming Transport 552, including those just requested. If no more time is available, the server returns an error reflecting inability to set the timeout requested.

```
C->S      SET_PARAMETER
          rtsp://Softricity/land3d.jgs RTSP/1.0
          CSeq: 9
          Session: 123456
          Content-Type: text/plain
          Content-Length: 11
          license_timeout: 180
S->C      RTSP/1.0 200 OK
          CSeq: 9
          Session: 123456
          Content-type: text/plain
          Content-Length: 1234
          license_timeout: 355
```

As a different value, the Direct Streaming Transport 552 can use the log_data value to transmit a series of log entries to a server.

```
C->S      SET_PARAMETER
          rtsp://Softricity/land3d.jgs RTSP/1.0
          CSeq: 10
          Session: 123456
          Content-Type: text/xml
          Content-Length: 11
          <LOG_DATA>
          ...
          </LOG_DATA>
S->C      RTSP/1.0 200 OK
          CSeq: 10
          Session: 23456
```

SETUP—The SETUP request is used by the Direct Streaming Transport 552 to initiate creation of transport resources by the Direct Streaming Transport 552 and server. The Direct Streaming Transport 552 will advertise to the server the protocol and endpoints it will be using for the session. The protocol and suggested endpoints should have been obtained from the SDP session description. Upon return from the server, the Direct Streaming Transport 552 can assume that the server has allocated the resources described and is ready to begin the stream. If a Direct Streaming Transport 552 reissues this request during a session, the server will disconnect allocated resources and connect new resources for the session.

The example below displays the use of the SETUP request. It is important to note that the options contained in the "Transport" header as well as other optional headers are dependent upon the transport and protocol being used.

PLAY—When the Direct Streaming Transport 552 is ready t begin running an application, resume a paused session, or alter the position in the stream, the PLAY request is used to begin that process. The PLAY request needs only convey the URL requested, current sequence number for the request, and any session specific information to be carried. The "Range" header is typically only to be used to indicate change of access, resume from pause, or to show time synchronization for events. All initial PLAY requests will typically leave out the "Range" header, which indicates play from the beginning. Subsequent PLAY requests, where data already exists in cache will often specify the Range to the server, to avoid streaming unnecessary data.

PAUSE—The PAUSE request is used as an aid to delay or stop the stream when no further data is needed. When the Stream CODEC has determined that a threshold has been met, the stream can be paused to free network bandwidth. In addition, if an outstanding PLAY request is to be overridden by a new request, a PAUSE must be issued first.

TEARDOWN—The TEARDOWN request stops the stream and frees all network resources associated with a given URL. To restart a stream, the Direct Streaming Transport 552 must reissue a SETUP, then new PLAY command. As a rule, this new SETUP/PLAY should create a new session for tracking.

REDIRECT—The REDIRECT response is only implemented by a server and can be in response to any of the above requests. It is normally used to indicate that an application or URL is located on a different server. The new URL will be indicated in a "Location" header. A "Range" header can be used to delay the timing of the redirection, such as in the example below requesting a delay of ten seconds.

```
S->C     REDIRECT rtsp://softricity/land3d.jgs RTSP/1.0
         CSeq: 8
         Location: rtsp://softwarewow/land3d.jgs
         Range: npt=10
```

Hyper Text Transfer Protocol Direct Streaming Transport 553—The Hyper Text Transfer Protocol contains several key relationships with the software streaming process. It is desirable to reuse established infrastructure related to HTTP, such as session initiation, authentication, and as a general communication transport for information presentation. As a fall back protocol, HTTPS as well as HTTP/TLS tunneling provide a guaranteed method of traversing most modern firewalls.

Each application software title is accompanied by a description of its contents, dependencies, and location information in the example BRIQ package file format. In an example embodiment, this file, or a plain wow redirection file, may be commonly delivered via HTTP. For example, a user may interact with a web page to obtain access to an application software title, and the selected URL may define the BRIQ package to be executed. The BRIQ package file need not be stored on a server, unless it is required to deliver this file using its internal HTTP delivery transport. For security and locality, it is preferable to use an RTSP connection to retrieve the package file, as it can be read out of the encoded file.

A server optionally implements an HTTP/1.1 daemon. However, even if a server does not implement HTTP, the Direct Streaming Transport 553 may use HTTP as a vehicle to communicate many types of information. First, a Direct Streaming Transport 553 may obtain its package file from an HTTP server, but optionally from an RTSP server. Second, a Direct Streaming Transport 553 commonly authenticates through HTTP. Finally, a Direct Streaming Transport 553 provides an HTTP channel for optional communication with network servers. Also, as a fallback, the HTTP daemon can be used as a proxy for tunneling other requests through firewalls.

GET—The Direct Streaming Transport 553 uses the basic HTTP GET method to obtain information stored at a particular URL. In general, most uses of HTTP by the Direct Streaming Transport 553 use the GET method.

POST—The Direct Streaming Transport 553 uses the HTTP POST method to interact with application functionality at an HTTP server. This simulates the posting of form data from a application to a Web Application server.

In order to facilitate secure communications, and communications which traverse firewalls, the server 2000 and Direct Streaming Transport 553 1000 may implement TLS 1.0 (which is the latest version of SSL), to provide a secure tunnel between Direct Streaming Transport 553 and server. It is important to note that TLS only supports TCP communication on well-known ports.

RAFT Direct Streaming Transport 554—The RAFT Direct Streaming Transport 554 provides connection services to RAFT servers as described in the present invention.

SDP Direct Streaming Transport 555—The session description protocol (SDP) is described in detail in RFC 2327. The basis of the protocol is to define a simple text message format for advertising information about connection to a particular media session that a server is prepared to serve. It contains information on the session name and purpose, time the session is valid, the media types for the session, and how to receive the media.

An SDP description contains a series of lines of text of the basic format <type>=<value>. Type is always a single character, and value is always structured UTF8 text whose format depends on the type. The types used by the present invention are shown below, the basic values are described in further detail in RFC 2327.

v=protocol version (mandatory)
o=owner and session identifier (mandatory)
s=session name (mandatory)
i=media title
c=connection information
b=bandwidth information
z=time zone adjustment
k=encryption key
a=session attributes (can be more than one line of attributes)
t=time the session is active
m=media name and transport address Protocol Version—Currently the only protocol version supported by SDP is 0. This field is required, and should be the first element transmitted, i.e., v=0.

Owner and Session Identifier—This field is used to identify the originator of the available session and its basic connection parameters. It follows the basic syntax:

o=<username><session id><version><network type> <address type>

<address>—The username parameter may be "−" for a session. This indicates that a server does not support the concept of username associated with a session. The session id and version parameters may be NTP timestamps to ensure that the SDP information is not proxied. Currently the network type will always be IN indicating the use of Internet protocols and address type will be IP4 indicating the use of IPv4 not IPv6. The address parameter indicates the IPv4 address of the server that generated the SDP file. This can be either an FQDN or a dotted decimal address. An example field is shown below:

o=−2890844526 2890842807 IN IP4 192.168.1.100

Session Name—The SDP session name is used to indicate a general description of the session. A server fills the session name with an indication of the customer the application is being delivered on behalf of, the name of the software, and the current date or time.

s=Some Company Name, Microsoft Word, Apr. 1, 2001

Media Title—The media title is a comprehensive description of the software title. It should include, when available: title name, version, publisher.

i=Microsoft Word, 10.0.0, Microsoft

Connection Information—The connection field is used to indicate the address that the client will connect to for the session being described. It follows the basic syntax:

c=<network type><address type><connection address>

The network type will always be IN indicating Internet protocols. Currently the address type will be IP4 indicating IPv4. The connection address will be the FQDN or dotted decimal IP address of the server to connect to for the session. However, streams can be considered dynamic, unicast streams. In this regard, according to RFC 2326, the IP address should always be zero. If a server will always be configured for some duration of time to serve some package file, a static IP address can be used.

c=IN IP4 0.0.0.0

Bandwidth—The bandwidth field is used by the server to indicate the amount of bandwidth the server will consume at a maximum for the proposed session. The server will always use the AS syntax indicating that the value is to be interpreted by a client and server in a proprietary fashion.

b=AS:57600

Session Times—Optionally a server can send an indicator of when the session will become active. This is not currently recommended.

Media Announcements—The media announcement field is used to describe the actual media contents of the session.

m=<media><port>/<number of ports><transport><fmt list>

The media parameter can be one of "audio", "video", "application", "data", or "control". For a session it will always be "application". The port parameter will indicate the base server port for the session, and the number of ports will always be 2 for UDP, or will not be specified (implying one) for TCP. The transport parameter is RTP/SDCP in the present invention. The format list parameter is dependent on the transport. In the case of a session, the payload type is dynamic and is equal to 125. Since it is dynamic, the m=field will need to be followed by an rtpmap attributes field as specified in Section 5.3.10.

m=application 4000/2 RTP/SDCP 125
m=application 4000 RTP/SDCP 125

Encryption Keys—Optionally the SDP response can carry encryption keys if needed by key exchange algorithms.

Attributes—The session defines several attributes. Attributes are always considered application specific, but must follow a basic set of formatting rules.

rtpmap—As stated above, the media description will generally be followed by an rtpmap attribute. This attribute indicates extra parameters for the RTP session. The basic syntax is as follows:

a=rtpmap:<payload type><encoding name>/<clock rate> [/<encoding parameters>]

The server will indicate an rtpmap attribute with the payload type set to 125. The encoding name will follow the X—extension mechanism defined in the RFC, and will preferably be X-Softricity. The encoding parameter values are described in the previous section. For example:

a=rtpmap: 125x−Softricity/1 fmtp—The fmtp attribute should be set to indicate any compression method used for the general data stream, or to indicate internal encryption settings. The fmtp attribute follows the basic syntax:

a=fmtp:<format><format specific parameters>

Where format is "CODEC" for the compression settings, or "encdec" for encryption settings. The format specific parameter should indicate the integral value corresponding to the selected compression or encryption type.

a=fmtp:CODEC 200

SoftricityFileVersion—Every file contains a version parameter in SoftricityHeader.fileVersion. This parameter should be encoded here in the attributes field. The following version corresponds to version 1.1.1.1.

a=SoftricityFileVersion: 16843009

SoftricityDirectoryVersion—Every file contains a version parameter in IndexHeader.directoryVersion. This parameter should be encoded here in the attributes field. This version parameter is simply a monotonically increasing integral value.

a=SoftricityDirectoryVersion:9;

SoftricityBlockMapVersion—Every file contains a version parameter in BlockMapHeader.mapVersion. This parameter should be encoded here in the attributes field. This version parameter is simply a monotonically increasing integral value.

a=SoftricityBlockMapVersion:9

SoftricityLaunchSize—This is an optional parameter that the server can transmit to the client to indicate the size in bytes of all of the blocks encompassing feature 1 (the launch blocks).

a=SoftricityLaunchSize:23456 length(s)—These are optional parameters that the server can transmit to the client to indicate the absolute size in bytes and blocks of the data portions of the package file, e.g., a=SoftricityIndexLength:offset=0;abslen=23456; blocklen=15
a=SoftricityBlockLength:offset=23456;abslen=23456; blocklen=15
a=SoftricityDataLength:offset=46912;abslen=23456; blocklen=150 etag—This is an optional tag. If the server and SDP Direct Streaming Transport 555 wish to validate the staleness of an SDP, the server can set the etag attribute in the same manner as an HTTP entity tag, ETag. The client would then return this to the server on the SETUP request as part of an If-Match header request.

a=etag:aef890d3e2567

Other protocol support—The Network Transport Agent 500 supports other Direct Streaming Transport 550 instances, including those for file system oriented protocols such as NFS, BITS, and SMB, as well as other unconventional transport mechanisms such as HTTP and FTP. These last mechanisms are used as part of the port proxy mechanism of the present invention, an example of which is provided herein. The present invention provides a generalized port proxy mechanism as part of the Network Transport Agent 500 that may be controlled from downloadable policies.

File System Core 300 Operations

Figure 8:
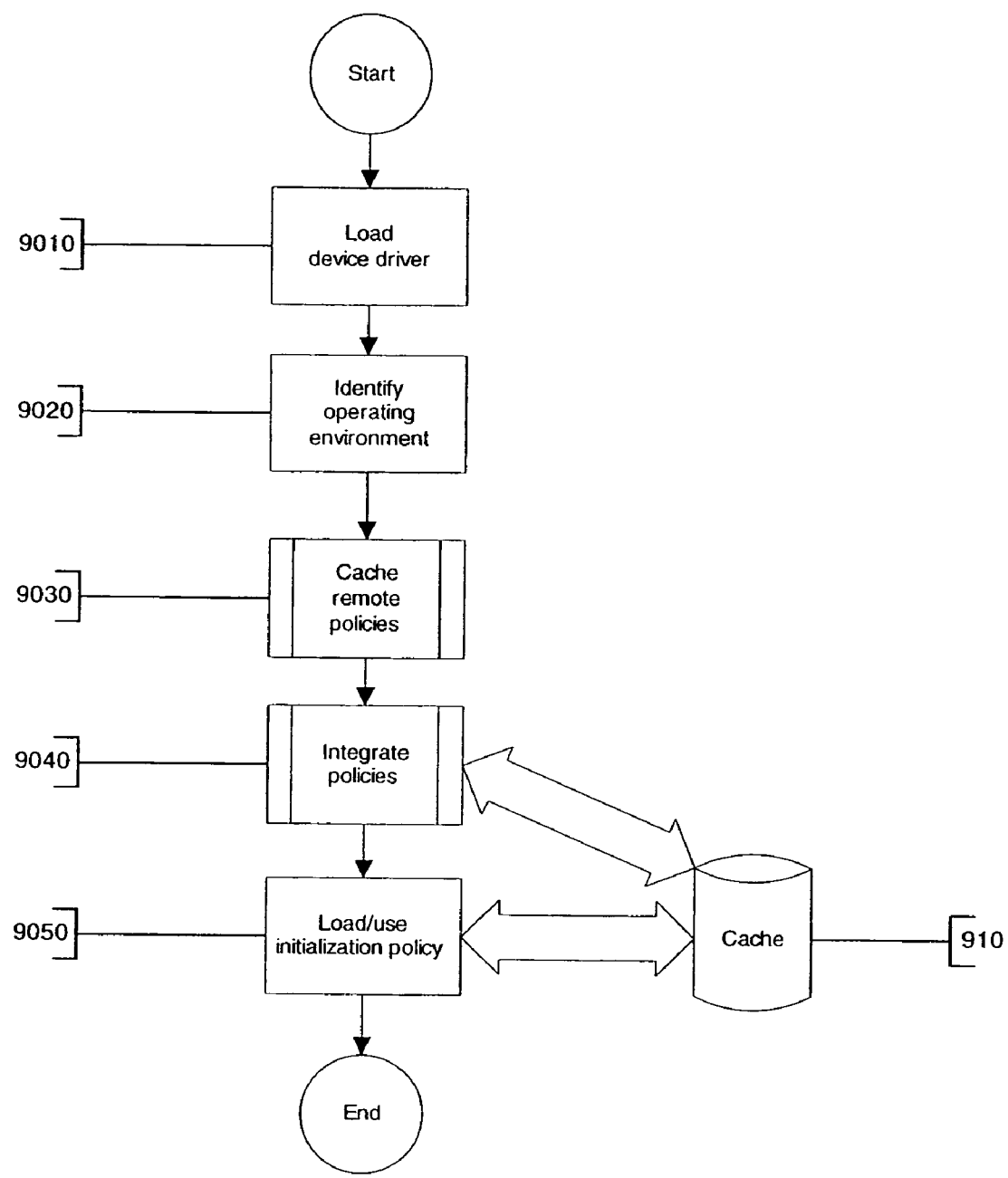
FIG. 8 is a flowchart of the initialization process of the described embodiment.

Initialize operation—The file system core 300 of the present invention uses policies during its initialization steps to configure its various components. FIG. 8 is a flow chart showing an example of the initialization steps that are performed during the initialization of the present invention on host PC 100. Policy processing steps may include, but are not limited to, steps shown in the example process. In the flowchart shown in FIG. 8, the initialization process loads the device driver for the target operating system as shown in process block 9010. If the operating system does not require a device driver, a daemon or other component may be loaded instead. If there are additional components for a specific operating system implementation that require loading or initialization, those components are loaded and initialized as part of this step.

The initialization process then identifies the operating environment as indicated in the drawing by process block 9020, in part by querying the host PC's operating system for operating environment specific attributes. These attributes may include the host PC's ID, for example, such as a Windows SID, or a Ethernet MAC address, configuration specifications for such information as the default policy to use, and the local cache for a list of those policies already present on the system. The host PC's operating environment may include operating system specific information as well, including Windows Registry entries, Group and Local policy settings, and contents of configuration option specifications stored in configuration data files and property lists. Commonly encountered attribute might include a default policy specification. A default policy specification may specify common information, such as identifying default server(s) to use, naming the default protocols by which the present invention should use to communicate with the servers, and options to use during file system operations, as well as possibly naming other policies that may be required.

After the operating environment has been identified, if remote servers are specified, or a default policy is specified that requires a policy that is not already present in cache, remote servers may be queried to determine if there are "remoted" policies that are required by the host PC 100, and if there are, these policies are copied to cache 910 of host PC 100. This is represented by process block 9030 in FIG. 8, and steps of this process block are detailed in FIG. 9. Continuing with FIG. 8, after "remoted" policies are identified and locally copied to the cache, if multiple policy components are required, they are optionally integrated as necessary to produce a "unified" policy that may be used by the file system of the present invention. The process of integrating disparate policy components to produce a unified policy is not required, but may provide some performance enhancement in some embodiments. The "integrate policies" subprocess is depicted as process block 9040 in FIG. 8, and is further expanded upon below.

Finally, the policy fragments or unified policy (collectively, the initialization policy) are used to configure the components of the present invention at startup time. This is shown as process block 9050 in FIG. 8. For example, in the example Windows embodiment described below, the initialization policy might be used to control the number of threads that are started by the described Windows embodiment. Alternatively, the initialization policy may be used to control the number and types of connections that the Stream CODEC 400 and Network Transport Agent 500 maintain open.

At the end of this initialization process, the file system of the present invention is loaded and configured for operation.

In FIG. 9, process blocks 9100 through 9140 detail process steps required for determining if "remoted" policies are present, and if so, downloading them to host PC 100's cache 910 for later use. Several other processes of embodiments described herein use the process described in FIG. 9. Process block 9100 indicates a first test to determine if a remote server should be checked for the existence of "remoted" policies. This test may be performed based upon the execution environment attributes that have been previously identified, or by policies already present at host PC 100 that identify possible locations of a "remoted" policy. The host PC 100 queries the remote server for "remoted" policies that are applicable to the current process (e.g. initialization, mount, open). The remote server to be queried may be an instance of any of the servers contemplated, e.g. a file server 2000, a RAFT server 3000, a policy server 4000, or other server as specified by the policy. A server specification may specify a single instance of the server, or may specify a specific service hosted on another general-purpose server. For clarity, we refer to the server and service options described as a server. Alternatively, the specification may specify a plurality of servers of various types that may be tried. If a plurality of servers is specified, the specification preferably should specify the search order and whether searching should stop after reaching the first server or after all required policies are identified and downloaded. Preferably, a server specification uses a fully qualified DNS name, but the server may be specified using a network protocol specific attribute such as an IP address. Alternatively, a server specification may be in the form of a fully or partially specified URI.

If it is determined that there are no policies to be searched for on a specific server, the process skips ahead to the next test depicted in process block 9140. If it is determined that an identified policy server should be checked for applicable policies, the process then checks the specified server for the existence of applicable policies.

In step 9120, the server is interrogated for the presence of required policies by establishing a connection to the server, preferably using a protocol specified in the server specification. The connection may be created using either a direct connection to the server, or preferably, using a connection created and maintained by the Network Transport Agent 500 component of the present invention. If "remoted" policies are located on the server, the test at process block 9120 succeeds (the "Y" branch) and the policies are downloaded to host PC 100 and stored into cache 910 on host PC 100 as shown in step 9130 of the flowchart.

After any required policies are downloaded from a server, the download remote policy process checks to see if there are other, alternative servers specified for use, as shown in process block 9140. If there are additional servers to query, control is passed back to process block 9100 to start the process over again with the next policy server and the remaining required policies. Processing may continue in this way until all required policies have been identified and downloaded/cached, or all potential policy servers have been checked.

The tests of process block 9100 and 9140 may be performed with equal success at the top and bottom of the described loop, and that the splitting of these tests and description of the tests being performed independently is for illustrative purposes only.

Figure 10:
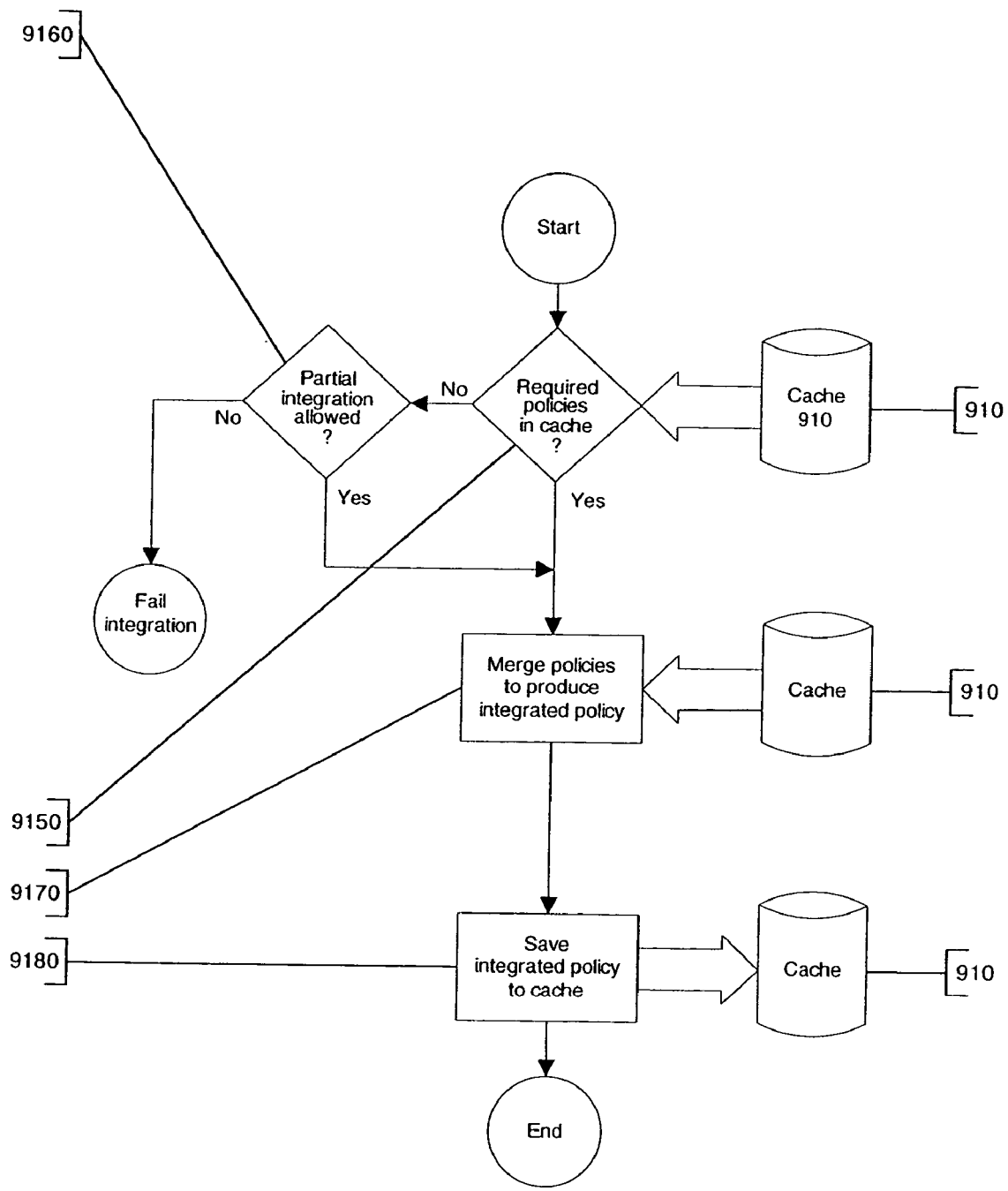
FIG. 10 is a flowchart of the policy integration process of the described embodiment.

Policy Integration—FIG. 10 depicts the process flow of the "integrate policy" sub-process blocks depicted in various process flows of the present invention. This process is generally invoked after all required policies have been identified and made present in cache 910 of host PC 100.

Policies may require integration when they come from different sources, or when they are provided using different policy specification mechanisms. For example, if a first policy is defined at the user interface of host PC 100, a second policy is specified as part of a Windows group policy specification, and a third policy is defined a set of file system ACLs that control read/write access to portions of a file system, these policies must be integrated for them to be used efficiently by the present invention. Policy integration is also the process step where conflicting policies may be resolved.

The "integrate policy" sub-process, as shown in process step 9150 of FIG. 10, checks the cache and operating environment to determine if all required policies are present, and if they are not, performs additional checks as depicted in step 9160 to determine if partial integration of polices is permitted. If all policies are not present or can not be integrated and partial integration is not permitted (the "N" branch from step 9160), the integration sub-process fails and does not integrate the policies. If integration is permitted to proceed, the process continues with merging policies into an integrated policy as depicted in step 9170. Some policy elements may be digitally signed, and if they are digitally signed, the merge process should preferably check the digital signatures on the policies to ensure policies have not been tampered with, or optionally to determine if they should be accepted. Merging policies may involve physically merging the policy elements, transforming them, or alternatively, producing an integrated policy specification that may be later used to efficiently location the necessary policy components. Using the example above in which three policies are defined, each from different sources, the Windows group policy and file system ACL policies may be transformed from their native Windows representations to a common representation, or may be simply referenced by ID, name, or other identifier within the integrated policy.

It is preferable that policies be integrated prior to use, but is not required. It will be appreciated by one skilled in the art that integrating policies permits more efficient use and caching of policy information when the policy is used during file I/O operations, and that efficient use of policies is often desirable because it reduces the amount of time spend processing policies each time a file I/O request is made.

The integrated policy may be assigned a unique ID or name to enable later use by other components of the file system, and it may be digitally signed so that the integrity of the policy may be determined. The structure of policies is described below. After the (partially) integrated policy is constructed, the policy is stored in the cache 910 of the host PC 100.

Mount operation—A second opportunity to identify and associate policies within the file system of the present invention is afforded when a BRIQ 1200 is "mounted". A mount operation is performed when an application requests the operating system mount a BRIQ 1200 at a specific the mount point for BRIQ 1200.

During the mount process, required policies, including any policies stored within the instance of BRIQ 1200, and any policies integrated as part of the initialization step, should be identified and copies of these policies made available to the file system core 300 executing on host PC 100. In the example flowchart shown in FIG. 11, the mount process identifies the instance of BRIQ 1200 to mount as shown by process block 9210. This instance may be present on host PC 100, may be partially cached within cache 910, or may be solely present on a remote server such as server 2000. After BRIQ 1200 is identified, the operating environment is determined as indicated by process block 9220. The mechanism for determining the operating environment is similar to the one described above for block 9020 of FIG. 8.

Figure 11:
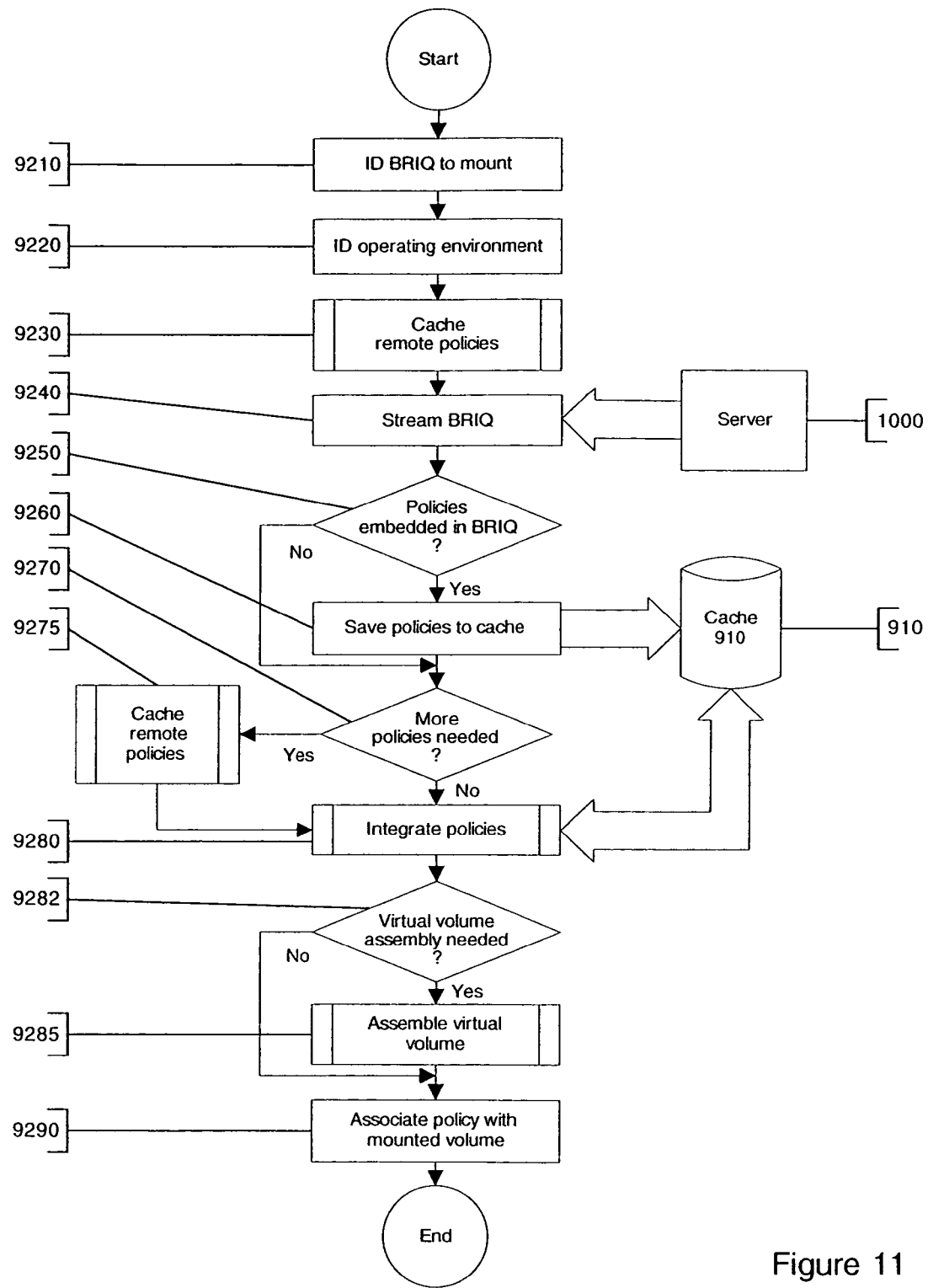
FIG. 11 is a flowchart of the mount operation of the described embodiment.

Continuing with FIG. 11, after the operating environment has been identified, if remote servers are specified, they may be queried to determine if there are policies that are required by the host PC. This is represented by sub-process block 9230 of FIG. 11, which in turn references a sub-process like the one depicted in FIG. 9. For each policy identified during the search, the policy is transparently downloaded to the cache 910 of host PC 100 and saved for later use.

The mount process then continues by streaming an instance of BRIQ 1200 (or reading it from cache if it is already present) to determine if BRIQ 1200 specifies or contains additional policies that should be considered. It is preferable that the Stream CODEC 400 and Network Transport Agent 500 components of the present invention be used to stream BRIQ 1200, however, BRIQ 1200 may be streamed using other methods available to host PC 100, including operating system I/O requests. The streaming of an instance of BRIQ 1200 may come from multiple servers, and does not have to have been completed prior to the mount process proceeding.

As the instance of BRIQ 1200 is streamed, it is checked for the existence of applicable policies embedded within the instance of BRIQ 1200 (step 9250). If there are policies stored within BRIQ 1200, they are optionally copied into the cache 910 as depicted by process step 9260, and thus made available to the present invention. If policy requirements are specified in BRIQ 910 and they are not already present in cache 910, the mount process searches for and caches any required copies of policies as shown by process block 9270 and 9275. Note that the step of copying to cache is not required if the policy, BRIQ, volume part, or file is present on alternative local storage.

After all required policies are present in cache 910, the mount process then integrates those policies as shown in process step 9280. Process step 9280 is similar to the policy integration step detailed above in FIG. 10. After all relevant policies have been considered and copies stored to the cache 910, the mount process uses the integrated policy or partial policy that defines the conditions under which the contents of BRIQ 1200 may be used. If a virtual file system volume is not present or available, the mount process proceeds with step 9285 and optionally creates a virtual file system volume as specified by the applicable policy. The virtual file system volume may contain information that has been downloaded, is present on a local disk, or on a network store, and may comprise a plurality of application files, application data, user data, user configuration information stored in one or more volume parts. Finally, the mount operation associates the policy with the virtual file system information referenced by the file system core 300 of the present invention. This step is depicted as process block 9290 of FIG. 11. The integrated policy and parts of the virtual file system may be stored in cache 910 for later use, stored in a local memory of host PC 100, or may be re-integrated at a later time. It is preferable that an integrated policy be used, for the same reasons as described above.

Figure 12:
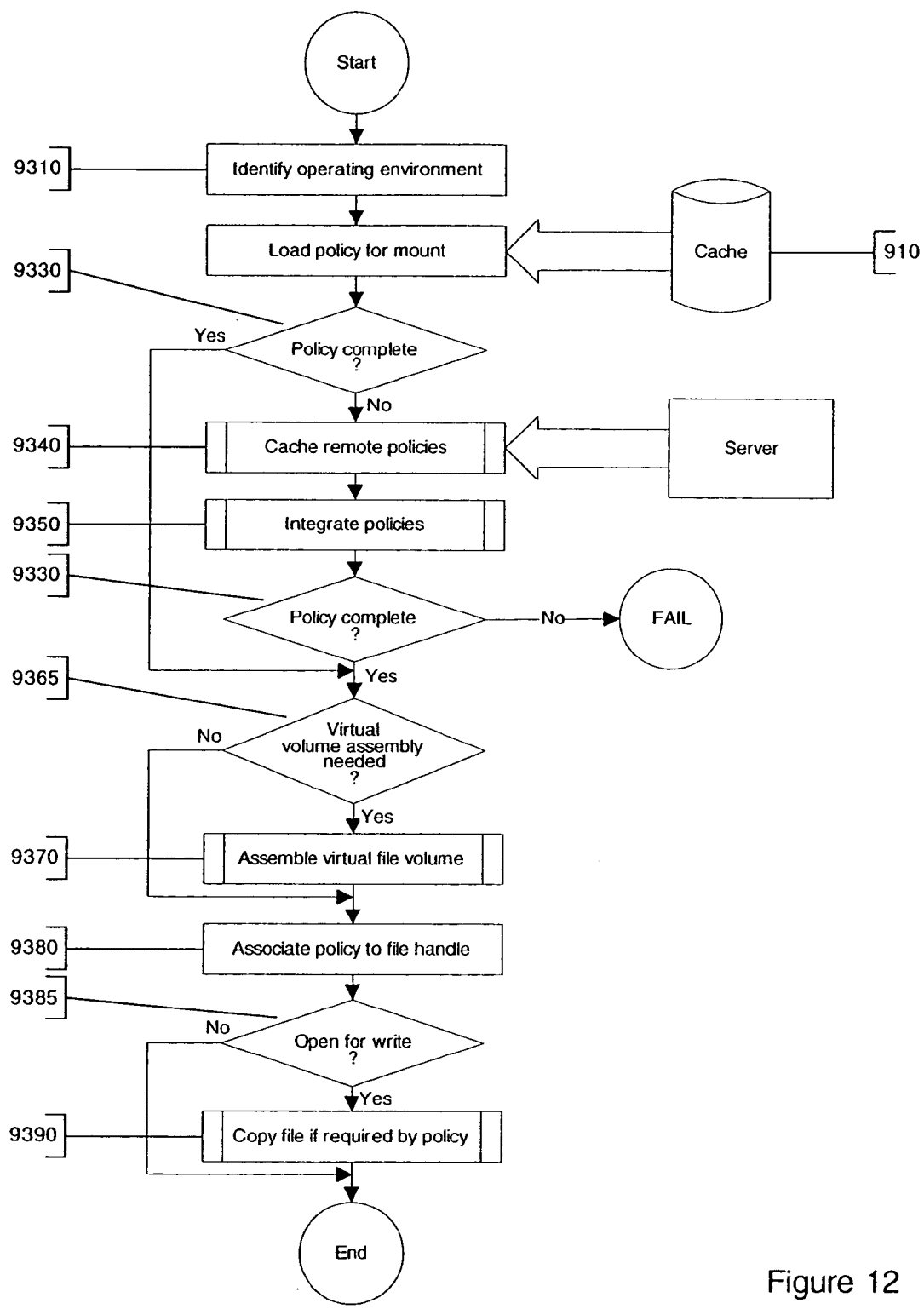
FIG. 12 is a flowchart of the open operation of the described embodiment.

Open/create operation—FIG. 12 details the process used by the file system of the present invention during the handling of an open file system request. Open file system requests are generally mapped from the operating system in response to opening a file, and may be optionally provided for read and write. The create operation of the host PC 100 virtual file system is mapped to features of the open operation described below. Some operating systems may use open and other file I/O operations when executing or operating against a file's meta-data stored within the file system representation. When a file open request is received, the file system of the present invention determines the operating environment as depicted by process block 9310 of FIG. 12. This operation is similar to the process of determining the operating environment as described for the initialization and mount operations, described above, and may include assembling temporary virtual volumes, resolving references to "symlinks", or resolving other references to previously created instances of "dirty" files. Directory lookup and management operations normally associated with open (and create) operation are not described herein, as they are managed outside the file system core of the present invention. The open request is then, as depicted by process block 9320, associated with a completed or partially completed policy previously associated with a mount. The "mount policy" is generally stored in cache 910, or associated with a specification for which a policy is dynamically integrated on the fly. If a completed policy is present, it is loaded and enforced as described below.

If a completed policy is not available, the open file process integrates required policies by querying remote servers and by integrating policies with the operating system components (steps 9340 and 9350) as described above, and constructs a completed policy. If a completed policy cannot be constructed (as tested by block 9360), the open operation fails. The integrated policy is generally stored in cache 910, but may also be stored in memory of the host PC 100. Note that the integrated policy may contain, or may reference, one or more host PC operating system native policies or objects, such as operating system user IDs, ACL lists, and security groups IDs. This integration between distributed policies and the host PC's own access control structure provides advantages to the present invention that will be appreciated by those skilled in the art.

If a complete policy cannot be constructed, the file open request fails as shown by the test in block 9360. If a complete policy is available, the open operation then uses the policy to, in part, determine the virtual file system to use, and selects that virtual file structure from the list maintained by the file system core 300. If a virtual file system is not present and is required by policy, the open operation creates a new temporary virtual file system (as described below) as shown in Step 9370.

The completed policy is then associated with the internal memory representation of the file structure created by the open as depicted in process block 9380. Alternatively, if a pre-existing dirty file was identified in the operating environment, a file structure is created that references the dirty file instead.

After the appropriate policy has been determined and associated with the internal file structure as described above, the nature of the open request is tested to see if the file is being opened for write, as depicted in process step 9385. A create operation is treated as a write. If the file is not being opened for write, the open operation completes. If a file is being opened for write, the above-mentioned policy is checked to determine how write-back to the file should be handled, and if write-backs should be handled specially, the internal memory representation of the file structure is adjusted, and optionally some memory blocks are copied. This process is depicted as process step 9390 of FIG. 12, and is more fully described below.

The open operation processing then returns to the operating system of the PC.

Write-back handling—It will be appreciated by those skilled in the art that the handling of write-back information to a possibly read-only instance of BRIQ 1200 entails special processing during the open, read, write, seek, and close operations within the file system of the present invention. Alternatively, some of this special processing may be handled within the mount and un-mount operation handling for the file system of the present invention.

When a file is opened for writing using the present invention, the file system core 300 determines, upon the basis of specified policy, the current user, and attributes of the user, file, and operating system, how writes should be handled. In some cases, writes are not permitted and no additional processing is required. Attempts to write to the file are detected by the write operation and failed. In other cases, it is desirable for the operating system to share all writes between multiple users. In a simple case, this means that data is written back over the initial file contents, and is made available to other users. The governing policy determines when this information is made available to other users, generally selecting from choices that include immediately, upon close, or upon un-mount. Other choices may be defined by policies as necessary.

It is often desirable to isolate the file writing activities of users from each other. This is especially advantageous when adapting software designed for use on a single user host PC 100 to run on a multi-user host PC 100, or within a multi-user network. In a simple example, if User 1 writes a configuration setting on their software, and User 2 tries to use the same software, User 2 should be isolated, e.g. not receive, the changes the User 1 wrote to a configuration file, but should receive instead, the configuration settings distributed as part of the initial software distribution. We refer to files written back to by a user as "dirty" files.

When opening a file for write, the file system of the present invention considers the governing policy, the source of the file, and the current user to determine how writes to the file should be handled. In the simplest cases described above, no additional actions need be taken and a single instance of a dirty file is maintained. This instance may be stored within the download BRIQ 1200, or may be stored in an alterative location specified by the governing policy. Similarly, if each user's instances of "dirty" files should be isolated as specified by the governing policy, the file system of the present invention may transparently make and manage copies of the "dirty" files on a user-by-user basis. User 1's file I/O to the file is made against User 1's copy of the file, User 2's file I/O is performed against User 2's copy of the file. The file system of the present invention mediates how these copies are made, and manages them transparently to the user(s). A diagram of how this scheme works is shown in FIG. 13.

Figure 13:
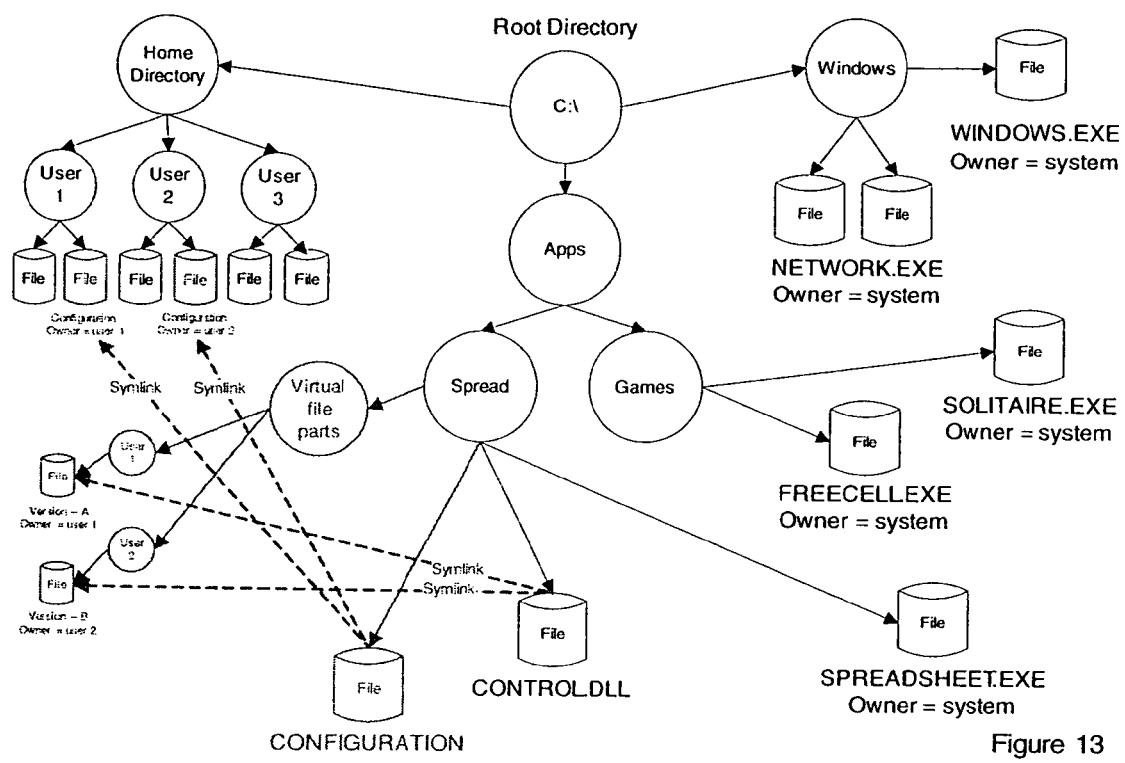
FIG. 13 is a representation of the file system presented to users by the described embodiment.

In FIG. 13, the Configuration File (labeled "Configuration") has been written to by Users 1 and 2. Policy dictates that these changes should be isolated from each other, and further specifies the location of where each user's instance of the file should be stored. In this example, the governing policy specifies that each user's individual instance of the file should be stored within the user's home directory, as depicted by the individual files in the home directories of the individual users, and associated with the "Configuration" file by the dashed lines labeled "Symlink". In a preferred embodiment, each user's individual instance of the file is assembled as part of a temporary virtual file system (e.g. an independent volume part) and the temporary virtual file system is managed by the file system of the present invention. The symlinks integrate the name spaces of the temporary and master volume parts to produce an integrated name space.

The file system of the present invention maintains associations and copies of individual files associated with file systems within the file system. The specification of where and how "dirty" files are written, and whether dirty files are retained after a file is closed, a file system is un-mounted, and whether dirty files are consolidated within a user file system (BRIQ), moved to a network store, or shared is also specified within a governing policy. Similarly, a governing policy may dictate that specific content may be obtained from alternate locations, either within a BRIQ 1200, or optionally, as volume parts or files obtained from other servers. Policy may thus control the specific version of files made available from within BRIQ 1200, and which version of the content is presented to a specific user. In this way, user A may be presented version 1 of a spreadsheet application, and user B may be presented version 2. This is also depicted in FIG. 13 using the CONTROL.DLL application component as an example. It will be appreciated by those skilled in the art that this technique provides an effective solution to "DLL Hell" and further simplifies the provision of software as a service.

Returning to the handling of user isolation of dirty files, there are several techniques that may be used to accomplish the user isolation. Many of these techniques are well understood to those skilled in the art. Each of the techniques described below are examples of traditional file system I/O techniques, and are intended as examples without limitation. A first approach is to make a complete copy of the file that has been opened for write when the file is first opened. This approach is appropriate for some uses, but may result in additional I/O before the file is available. Some programmers open files requesting write capabilities, but never use the write capability, resulting in the complete waste of the additional I/O.

An alternative technique is to use "lazy writes," in which the copy I/O operations are deferred and performed when the first file data block is changed. This approach optimizes the copy file I/O by deferring it until it is actually needed. A third technique uses lazy writes, and does not copy the entire file, writing only changed data blocks to the alternate disk copy. Alternatively, the user may request a mode of write in which there is no previously existing content in the file (or where the file did not previously exist), and the file system must then create a file and reference it, assigning the new file its own unique memory structure.

When a file is accessed, the file system of the present invention selects the appropriate technique as specified in the governing policy, then selects the user-specific memory file structure, and finally completes the I/O request using the specified technique. In each case, the file system of the present invention manages the I/O on behalf of the user, and provides user isolation by maintaining copies of the file information headers on a user-by-user basis as opposed to the platform specific approaches used by current file systems.

Figure 14:
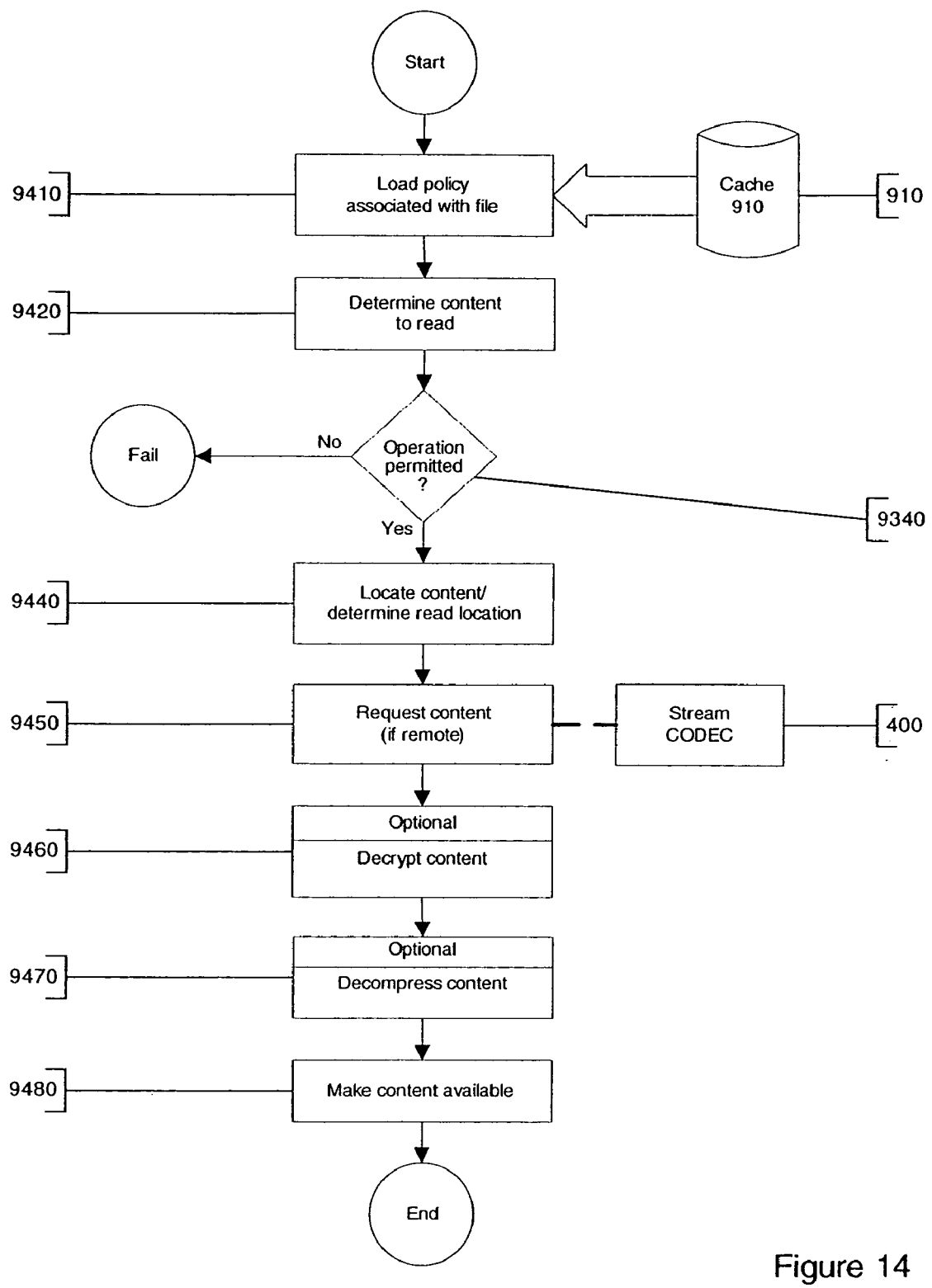
FIG. 14 is a flowchart of the read operation of the described embodiment.

Read operation—In FIG. 14, the read operation processing of the present invention is described. Read file system requests are generally mapped from the operating system in response to a read or execute request. When a file read request is received, as depicted by process block 9410, it is associated with an integrated policy associated with the internal file structure. The integrated policy is generally stored in cache 910, but may be stored in BRIQ 1200, or upon a remote server such as server 2000.

Based in part upon the content specifications contained within the integrated policy, the open process, as depicted in process step 9420, determines the specific instance of the content to use. In some cases, this content is stored within a BRIQ 1200. Optionally, the content may be stored on a server as an update to a BRIQ 1200, or may be stored in an alternate location such as file system 920, or may reference a locally instanced copy of "dirty" file previously created by the user. The locally instanced copy of a "dirty" file may be independently stored, or may be assembled as part of a locally instanced volume part. The selection of the precise storage location of the content is determined within file system core 300 upon the direction provided within the controlling policy and is transparent to the user.

After the governing policy and content to read is determined, a test is made to determine if the user is able to perform the requested operation. If the user is not able to perform the requested operation, either because of permissions, policy restrictions, or non-available content, the operation fails as depicted by the "N" branch from decision block 9430.

Once it has been determined that the operation may proceed, the read operation determines if the content is present and available for reading. Content may be available because it has been streamed and cached in cache 910, or it may be stored locally within the file system 920 of host PC 100. Alternatively, the content may be available on a traditionally network file system such as a network file system provided home directory.

If the content is not available in local storage, the read operation communicates with the Stream CODEC 400 to request the desired content as depicted by process block 9450. The read operation pauses until the desired content is made available, generally within cache 910. Alternatively, the desired content may be made available by mounting a network file system, loading a piece of removable media, or other undertaking an external action outside the operation of the file system core 300.

If the content is compressed or encrypted, it is then decrypted or decompressed as necessary to provide the original contents in plaintext for use by the file system as shown by process blocks 9460 and 9470. The file system core 300 may provide its own components for decryption and decompression, may share these components with other portions of the present invention (e.g. Decompressor 420 and Decryptor 450 of the Stream Codec 400), or may alternatively share these components with other parts of the operating system, such as the Microsoft Windows cryptographic services.

Once the content has been made available to the file system, the file system core 300 makes the information available to the operating system in process block 9480. The read request is then completed by the operating system.

Figure 15:
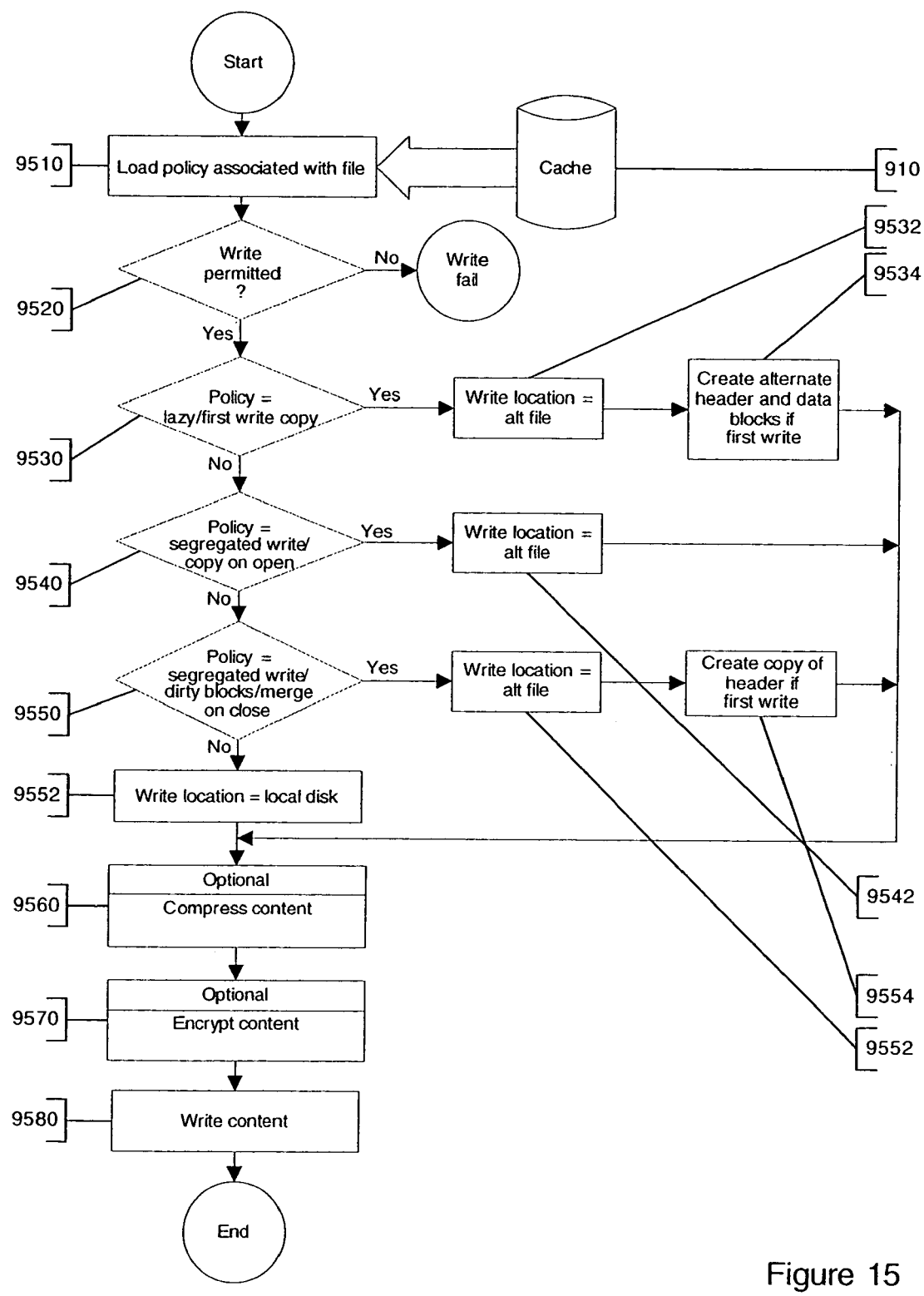
FIG. 15 is a flowchart of the write operation of the present invention.

Write request—FIG. 15 is a flowchart that details processing for a write operation of the present invention file system. Write file system requests are generally mapped from the operating system in response to a write or execute request. When a write request is received, as depicted by process block 9510, it is associated with an integrated policy associated with the internal file structure. The integrated policy is generally stored in cache 910, but may be stored in BRIQ 1200, or upon a remote server such as server 2000. A test is then performed (process block 9520) to determine if the write operation is permitted. If the operation is not permitted, the write operation fails.

Based upon the write policy associated with the internal file structure for this user, the write operation performs a series of tests to determine where the file I/O should be written and if there are additional steps that need to be performed. The example process shown in FIG. 16 includes the file I/O steps described above. It will be understood by those skilled in the art that this list of file I/O policies may be extended as needed to incorporate additional file I/O approaches that may be advantageous in a particular implementation.

Decision block 9530 and process blocks 9532 and 9534 describe the test for a policy requirement for lazy-copy first write file I/O approach as described above. If the test in decision block 9530 is satisfied, the file system selects an alternate write location as specified by the governing policy and locates the in-memory file header for this alternate write location (block 9532). If this is the first write to the file, process block 9534 creates a new file header in the memory of the file system core 300 and copies all the data in the original file to an additional location specified by the new file header. A symlink between the new file's location and the original file is also established to support the integration of the new file into the namespace of the original BRIQ. The alternate in memory file header is used by step 9560, as described below.

Decision block 9540 and process block 9542 describe the test for a policy requirement for a segregated write in which the file is copied at open. If this test succeeds, the process selects an already existing file header in memory (that was created by step 9390, as described above). The selected in memory file header is used by step 9560, as described below.

Decision block 9550 and process blocks 9542 and 9544 describe the test for a policy requirement for a merged write scheme, in which only copies of dirty file blocks are maintained by the alternate in memory file header. Process block 9552 selects an already existing file header in memory. If this is the first write to the file, process block 9554 creates a new file header in the memory of the file system core 300 and copies pointer to all original data blocks to the new in memory file header, and then selects the in memory file header. The selected in memory file header is used by step 9560, as described below.

If no other policy is selected, the write operation selects the in memory file handle for writing back to the local disk. The selected in memory file header is used by step 9560, as described below.

After an in memory file header is selected, the write operation then optionally compresses or encrypts the content. If the content is to be compressed or encrypted, it is then encrypted or compressed as necessary as shown by process blocks 9560 and 9570. The file system core 300 may provide its own components for encryption and compression, may share these components with other portions of the present invention (e.g., Compressor 430 and Encryptor 440 of the Stream Codec 400), or may alternatively share these components with other parts of the operating system, such as the Microsoft Windows cryptographic services.

Finally, the write operation performs a write to disk as depicted in process block 9580. If the policy selected is to manage dirty blocks, blocks are copied to the selected file header and the changed data written to these blocks. If any other policy is selected, the data is merged with existing blocks in accordance with traditional file system write schemes well understood in the art. Control is then returned to the operating system.

Figure 16:
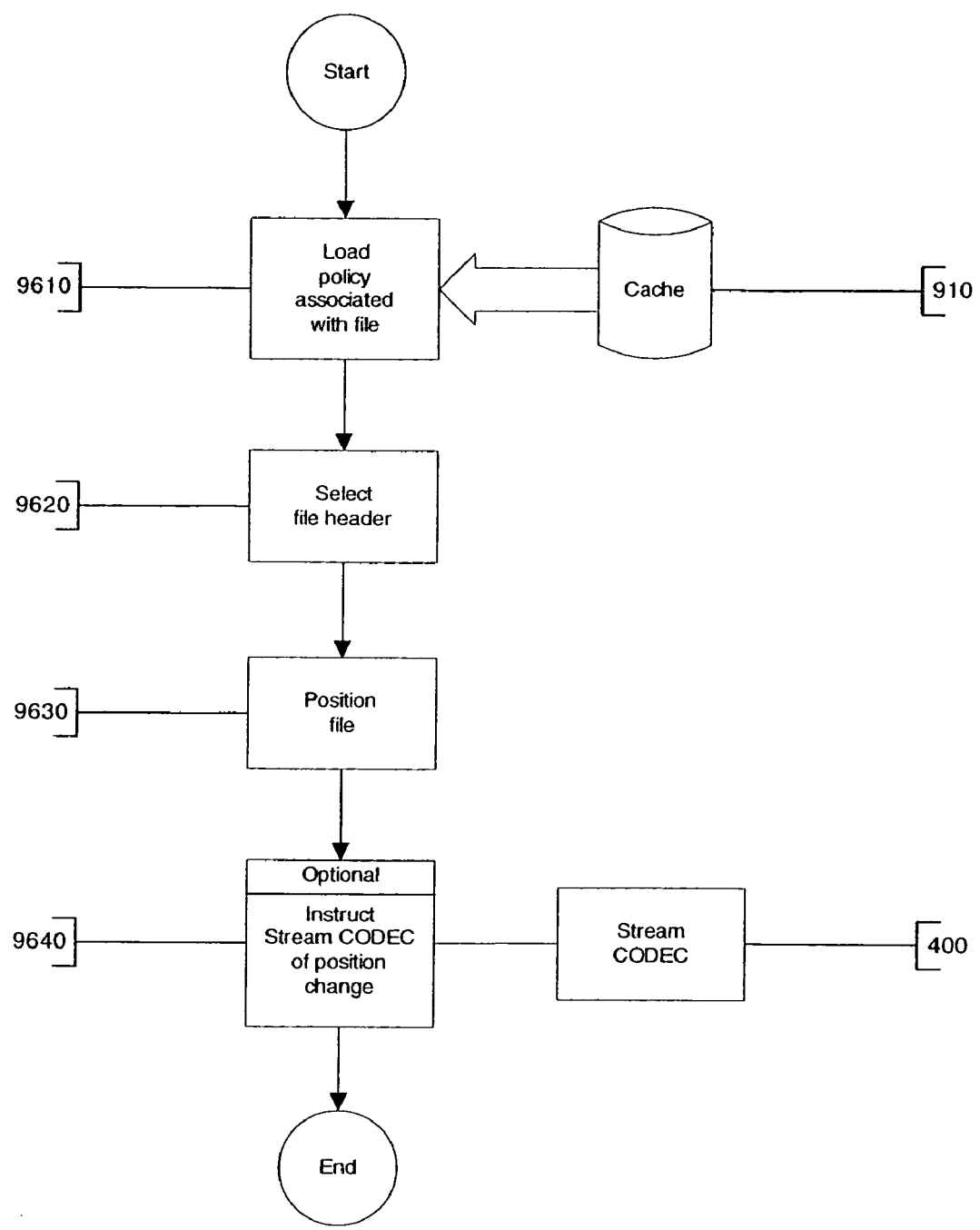
FIG. 16 is a flowchart of the seek operation of the present invention.

Seek operation—FIG. 16 depicts the process of adjusting the file position pointer within a file system of the present invention. Seek file system requests are generally mapped from the operating system seek requests. When a seek request is received, as depicted by process block 9610, it is associated with an integrated policy associated with the internal file structure. The integrated policy is generally stored in cache 910, but may be stored in BRIQ 1200, or upon a remote server such as server 2000.

The seek operation then selects an in-memory file header associated with the request, as depicted by process block 9620. The file location is adjusted within the file header, and optionally, the Stream CODEC 400 is instructed as to the file position change if the file is located in a location that is managed by the Stream CODEC 400. Control is then returned to the operating system by the file system core 300.

Figure 17:
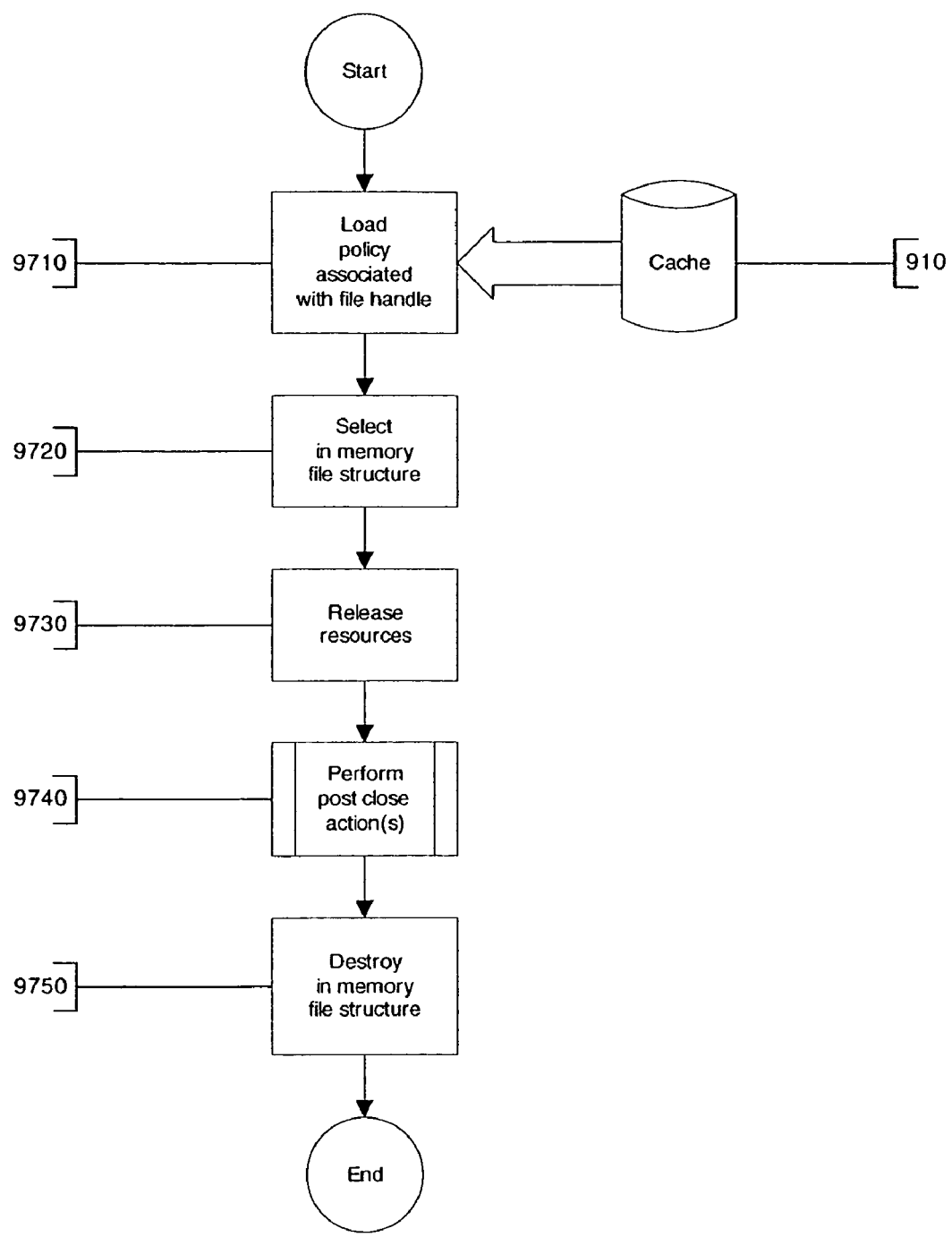
FIG. 17 is a flowchart of the close file operation of the present invention.

Close operation—FIG. 17 is a flowchart that depicts the process of closing an open file by the present invention's file system. A close operation is generally requested by the operating system. When a close request is received, as depicted by process block 9710, it is associated with an integrated policy associated with the internal file structure. The integrated policy is generally stored in cache 910, but may be stored in BRIQ 1200, or upon a remote server such as server 2000.

The close operation then selects an in-memory file header associated with the request, as depicted by process block 9720, and resources associated with that in memory file structure are released in process block 9730. The resources that are released include memory buffers, threads and other operating system objects, and associations with Stream CODEC 400 sessions streaming a copy of BRIQ 1200 from a remote server.

After the resources have been released, the file system core 300 of the present invention then performs any post-close actions specified by the governing policy. Post close actions may include discarding a "dirty" file, copying a "dirty" file to a network location, or making other changes in the environment. If the "dirty" file is retained, the reference to the "dirty" file is retained so it may be accessed again if the user desires to open the file again. The reference may be made by specific file location, by file system part ID, or other identifier that permits the file system of the present invention to identify, locate, and use the "dirty" file at a later date. These actions are depicted as process block 9740.

Finally, as shown in block 9750, the in-memory copy of the file structure is released and control returned to the operating system.

Figure 18:
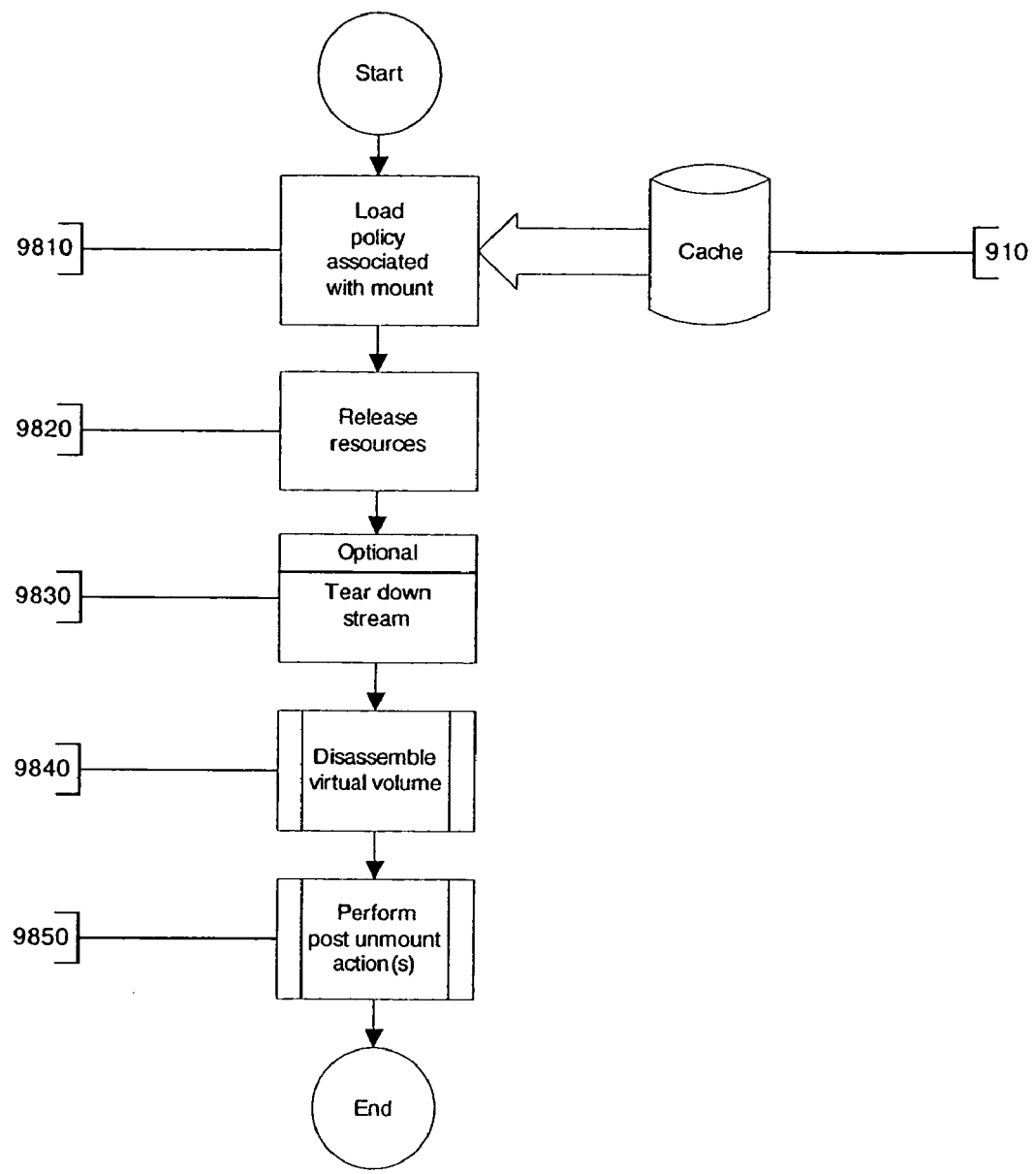
FIG. 18 is a flowchart of the un-mount operation of the present invention.

Un-mount operation—FIG. 18 is a flowchart that depicts the process of un-mounting a mounted BRIQ 1200 by the present invention's file system. An un-mount operation is generally requested by the operating system. When an un-mount request is received, as depicted by process block 9810, it is associated with an integrated policy associated with the mount point. The integrated policy is generally stored in cache 910, but may be stored in BRIQ 1200, or upon a remote server such as server 2000.

The un-mount operation releases resources associated with that mount point as depicted in process block 9820. Any currently open file structures associated with files within this instance of the file system are closed, and operating system resources are released. Resources that are released include memory buffers, threads and other operating system objects, and associations with Stream CODEC 400 sessions streaming a copy of BRIQ 1200 from a remote server (block 9830).

The un-mount operation then proceeds to decompose any associated virtual volumes and move information within the virtual volume to its policy defined location. The decomposition of the virtual volume is depicted as process block 9840, and is more fully explained in the "disassemble virtual volume" operation below.

After the resources have been released, the file system core 300 of the present invention then performs any post-un-mount actions specified by the governing policy as indicated by block 9850. Post-un-mount actions include implementation specific operations such as unloading drivers, deleting virtual volumes to release disk space, or other post-un-mount actions.

The file system core 300 defines two additional operations. These operates assemble and destroy a virtual volume as required by applications.

Assemble virtual volume—The "assemble virtual volume" operation is called from traditional file system operations when it is determined that a new virtual volume is required based upon the policies and operating environment defined at the time the file system operation is performed. The operation may also be called from an exposed API to support components external to the file system such as the optional launcher 220.

Figure 19:
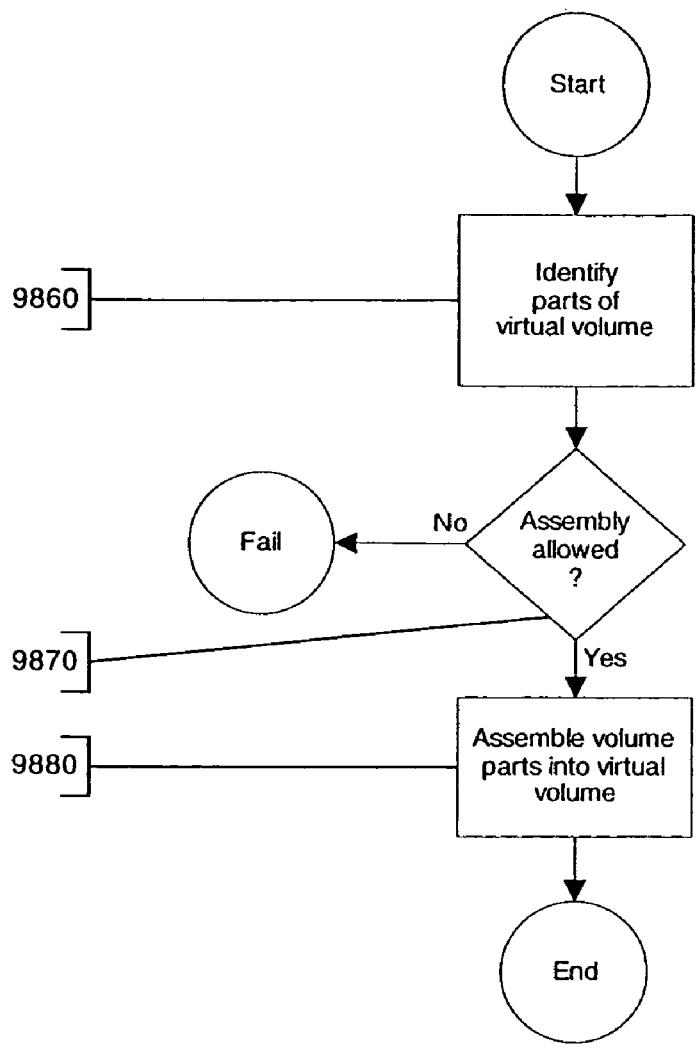
FIG. 19 is a flowchart of the assemble volume operation of the present invention.

FIG. 19 illustrates a process flow for the "assemble virtual volume" operation. The assemble virtual volume operation uses previously assembled policies, volume parts, and environment information to identify where parts of a specific virtual volume are stored, may follow symlinks stored within each virtual volume part, or may follow a symlink for which part of the reference information is defined within a policy. An example of this type of link is a symlink that references a volume part stored in the current user's home directory. Each volume parts may be stored on local disk of the host PC 100, on a network share, removable media, or within an alternate package or volume structure. This step is depicted in step 9860.

Figure 20:
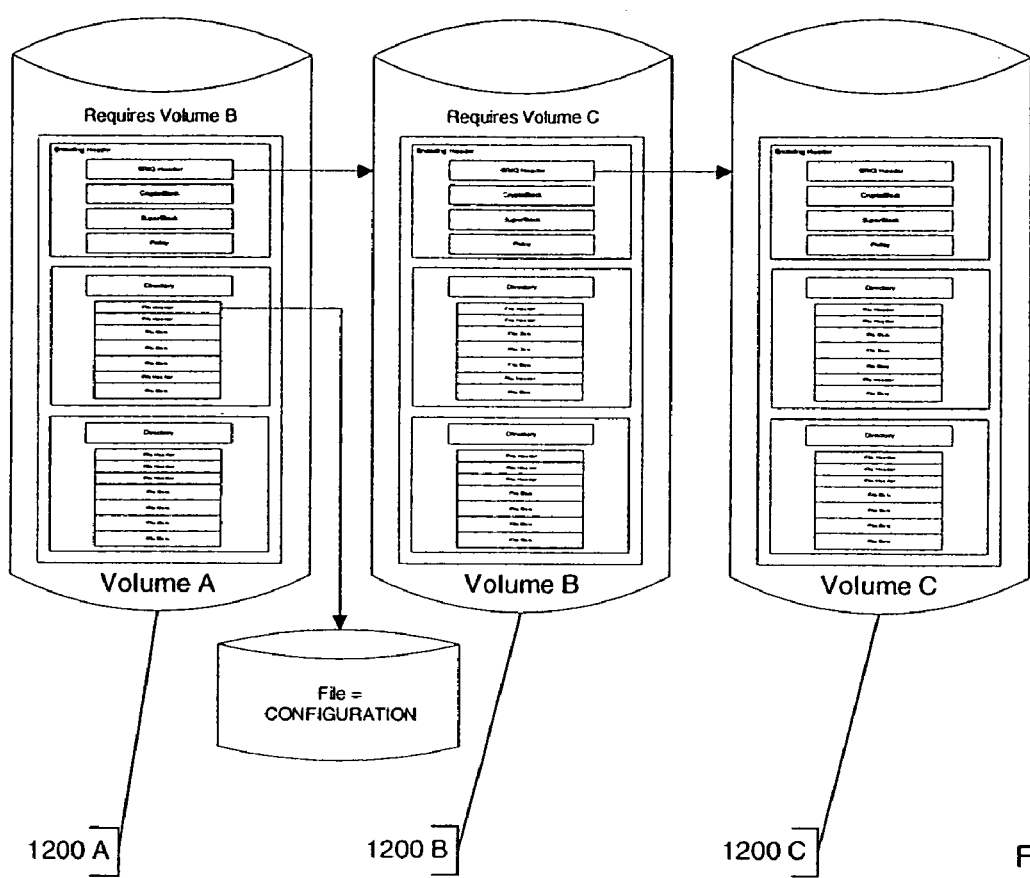
FIG. 20 is a representation of linked BRIQ packages of the present invention.

After the parts of the virtual volume are identified, a test is made to determine if assembly of these parts into a virtual volume is permitted. Virtual volume parts may be assembled based upon policy definitions defining the parts to be assembled, and may be based upon the availability of specified parts, operating environment, user attributes, such as user name, ID, and group membership, and other policy-defined attributes. For example, a virtual volume constructed using an OSD-based BRIQ 1200 may specify alternate required virtual volumes or virtual volume parts. This is illustrated in FIG. 20. In FIG. 20, three BRIQ 1200 are shown (BRIQ 1200*a*, 1200*b*, and 1200*c*), in which BRIQ 1200*a* references the second volume contained within BRIQ 1200*b*, which in turn references BRIQ 1200*c*). Alternatively, a BRIQ may reference non-BRIQ volume parts, other file systems, and individual files, as also depicted in FIG. 20, where BRIQ 1200*a* references an external file named "CONFIGURATION". As the virtual volume is assembled, any required name space mappings are also performed.

Returning to FIG. 19 at test block 9870, if the parts may be assembled into a virtual volume, the "Y" branch is taken and processing continues at process block 9880. If the parts may not be assembled, for example, there is a missing part, or if volume meta-data indicates that the version of the content within a virtual volume has changed, the "N" branch is taken and the creation of the virtual volume terminates.

The assemble virtual volume operation then collects the virtual volume components from their respective locations and assembles a virtual volume for use by the file system 300 as depicted by process block 9880. The virtual volume may be assembled, for example, from individual user's settings stored in a user's package volume part stored on a network share, combined with application data stored within a user's profile, further combined with the "master" package that is downloaded from a network server.

The assemble virtual volume operation does not require that all volume parts be available at the time of assembly, as some volume part content may be dynamically provided at run time (for example, when a virtual volume integrates a network share for part of its content). Similarly, some volume parts may come from read-only media, or may be logically marked as read-only by policy or data type, while other volume parts are expressly read-write Disassemble virtual volume—The "disassemble virtual volume" operation is called from traditional file system operations when it is determined that a virtual volume has been used and the virtual volume needs to be destroyed. The operation may also be called from an exposed API to support components external to the file system such as the optional launcher 220.

The disassemble virtual volume operation may include steps to discard "dirty" files, steps to copy a "dirty" file to an alternate volume or package, directory, or network location, merging dirty files with prior copies of the file, or making other changes in the environment. Policy specifies the nature of the actions taken in this operation.

Figure 21:
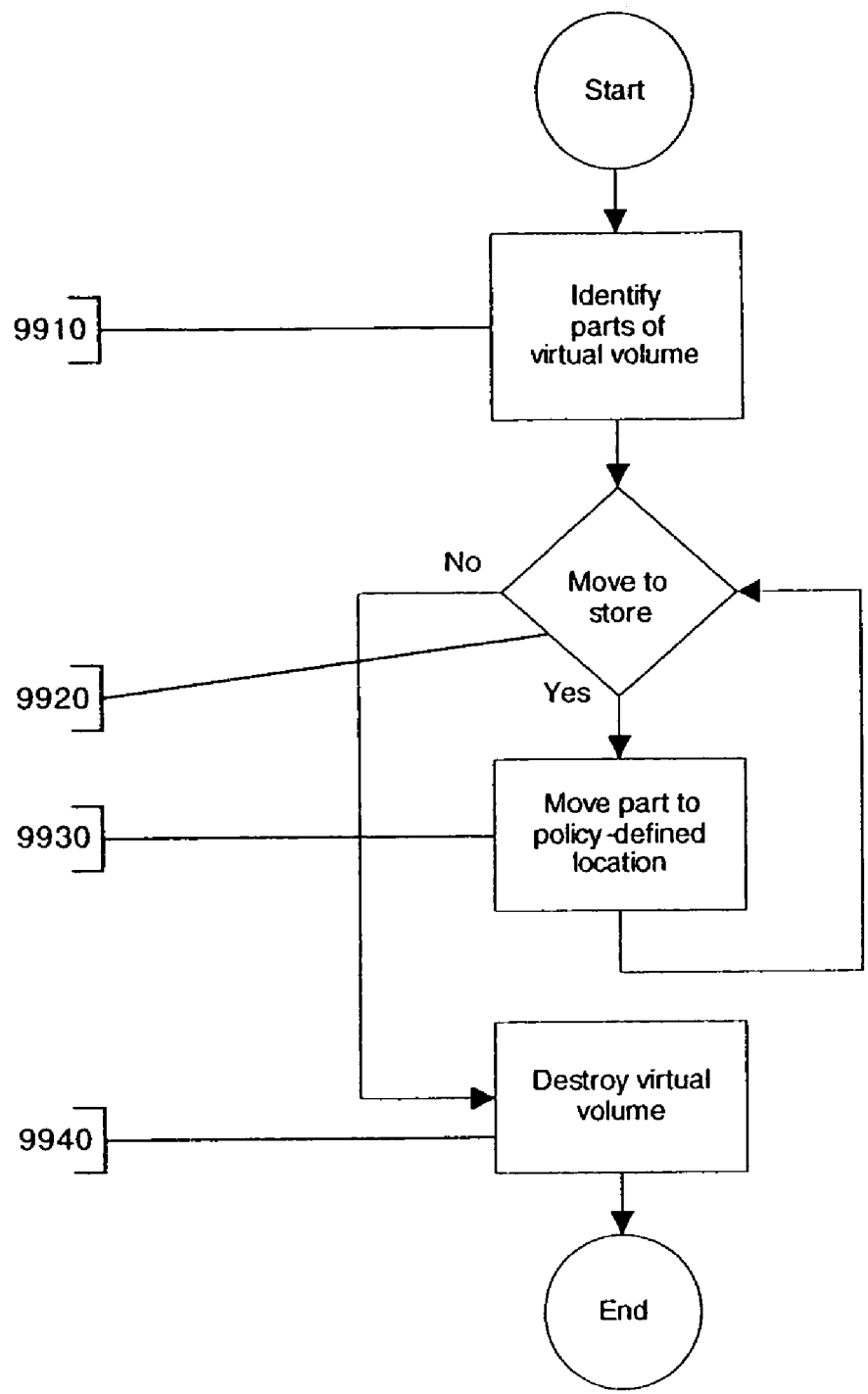
FIG. 21 is a flowchart of the disassemble volume operation of the present invention.

FIG. 21 illustrates a process flow for the "disassemble virtual volume" operation. The disassemble virtual volume operation uses previously assembled policies and environment information to identify where parts of a specific virtual volume are to be stored, and then disassembles a virtual volume and stores the respective parts in the policy-specified location. These parts may be stored on local disk of the host PC 100, on a network share, removable media, or within an alternate package or volume structure. This step is depicted in step 9910.

Processing then proceeds to a test depicted by process step 9920. The operation tests to see if there are any parts of the virtual volume that need to be disassembled and stored in an alternate location. If there are no additional parts that need to be disassembled, processing takes the "N" branch. This may occur if there are no more volume parts that require further processing, or if the volume was never written to.

Continuing with process block 9930, the volume part is moved to a policy-defined location, and may be either written to that location or merged with information already stored at that location. The policy, for example, may specify which volume parts, specified using user settings information, as indicated by the meta-data stored within a BRIQ 1200 such as the Application Data, Application Configuration, User Data, User Configuration, Permanent, and Override bits as described below, or alternatively specify volume parts that match specific environmental meta-data such as the user's name, group membership, the application title, file name, or other environment or volume attribute, or may alternatively specify a combination of environment and BRIQ 1200 meta-data, should be written to a specific directory location, added to a specific volume, or merged with existing information at a specified location. After a volume part is processed by the 9930 step, the volume part is associated with original volume so that the complete virtual volume may be restored if the volume is mounted or opened again.

After the volume part has been processed, the disassemble process continues by looping back to the test at process block 9920 to determine if additional volume parts are required.

Continuing with the "N" branch from the test at process 9920, the "disassemble virtual volume" operation destroys the virtual volume and releases any storage associated with virtual volume. The "disassemble virtual volume" operation then completes.

Figure 24:
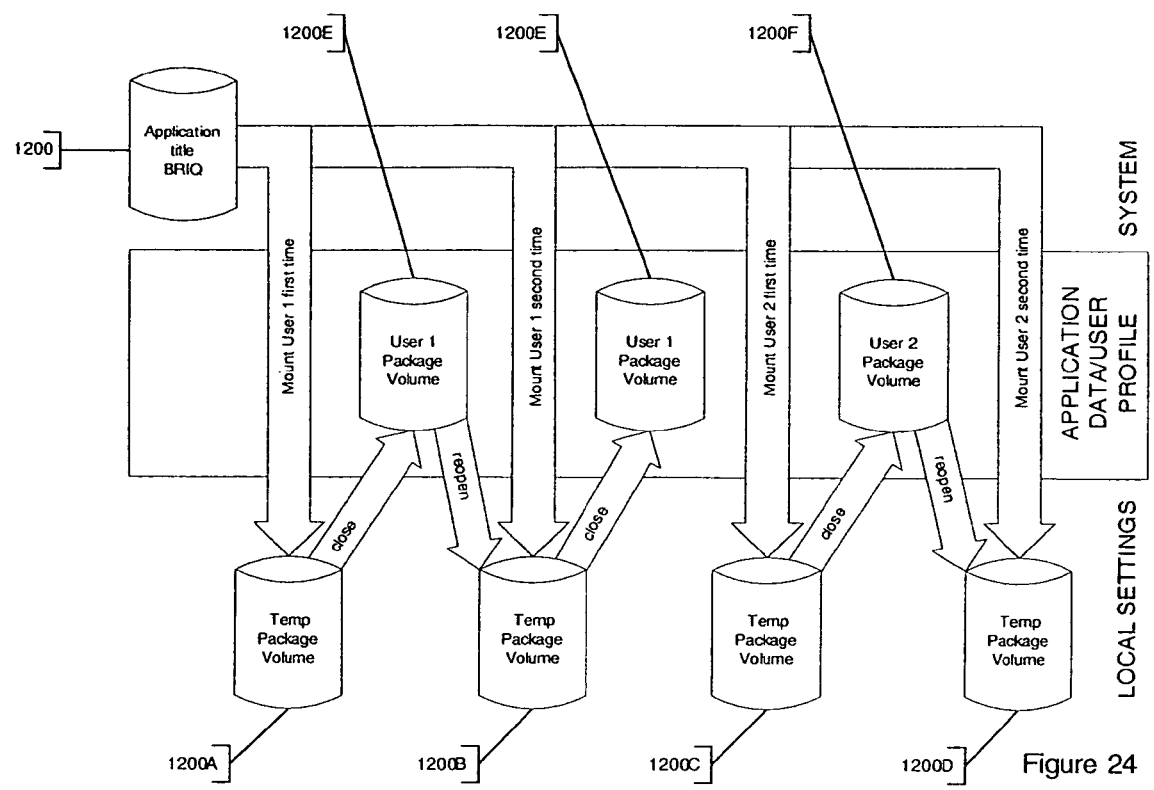
FIG. 24 is the lifecycle of a virtual volume

FIG. 24 depicts the lifecycle of a volume that has undergone several 'assemble virtual volume' and 'disassemble virtual volume' operations combined with a policy that creates virtual volumes for user specific information. In FIG. 24, an instance of an application title is stored and distributed as an application title in BRIQ format. For simplification of this example, it is assumed that this title and the policies has been previously downloaded and cached on the host PC 100.

When a User 1 first mounts the application title, as indicated by the arrow labeled "Mount user 1, first time", a temporary package volume (1200A) is created. This temporary package volume provides temporary working space for the User 1 during her first use of the application title. When the user closes the volume, her changes are written to user package volume 1 (1200E), often stored within her Windows profile on the preferred embodiment for a Windows system. When she reopens the application title, the file system of the described embodiment identifies the user package volume (1200E) that was persistently stored, and used it and the original volume (1200A) to create a new temporary package volume (1200B), which is used during the duration of the second usage. Upon second closure, the 1200B temporary package volume is disassembled to update user package volume 1 (1200E) with new or changed content.

A second user may simultaneously utilize this operation, so that the second user has his own versions of temporary package volumes (1200C and 1200D), and user package volume (1200F). This technique provides user isolation, persistence, and version control between users and application titles.

In an alternative embodiment, files may be stored outside of a virtual volume, but may have the virtual volume simulated by a directory. In this alternative embodiment, during the generation of a BRIQ by the author utilizing the creator program, files and directories can be tagged with a "write-through" attribute. BRIQs containing write-through files or directories may contain a container with the tag, LOCL. This container contains the full path of all write-through directories and the path of any directory, other than the root directory, which contains write-through files, specified with the tag LDIR. It may optionally contain a reference to a policy that defines these elements. The user is allowed to specify that the pathname of the root directory for locally stored files. Optionally, this pathname may be specified as part of a configuration policy. The new pathname may contain the Vendor field from the URN in order to ensure uniqueness. This information, if present, is stored in the ROOT tag in the title's LOCL container. Titles need a LOCL container only if they need to specify non-default values for the ROOT.

When a BRIQ containing write-through files or directories, i.e. containing a LOCL container in the header, is loaded, the launcher 220 may create a directory for local storage under the SCDP install directory, within the user profile, or in other places defined by policy, or it may leave this task to the file system core 300. The destination directory is derived from the URN unless a directory is specified by the ROOT tag in the title's LOCL container. The launcher 220 creates a sub-directory in the local storage directory for each directory specified with the LDIR tag in the header. The root pathname of the local storage path is passed as well as whether to report free disk space to ARFSD VxD when loading the BRIQ (e.g., prior to requesting the mount).

In the alternative embodiment, when a write-through file is started, the information is taken from the file in the local storage area having the same naming convention as directories mentioned above. If the file doesn't exist in local storage, it is first copied there from the BRIQ. The original file in the BRIQ may not be compressed or encrypted, aside from whole-BRIQ encryption. When a write-through file is opened, the copy on local disk is opened, and all requests on the internal file handle are performed on the real file handle.

Other operations—The file system core 300 provides information the host PC 100's operating system for use in responding to higher-level queries such as directory names and free space available. Most of these operations are transparent to the file system of the present invention.

An exception to this is free space calculations. Generally, the amount of free space for a virtual volume is constrained by the lesser of (i) the size of the underlying file system and (ii) the amount of free space specified within the BRIQ. The file system core 300, by default, for BRIQs containing no write-through files or directories will report zero bytes free. The presence of a tag in a title's LOCL container specifies that file system core 300 should report the amount of free space on the drive containing the local storage directories.

In one embodiment where user information is retained in separate virtual volume parts, the amount of free space reported is the amount of free space on the volume where the temporary package volume is stored.

Policies—The present invention is configured and managed using policies. Policies, in the preferred embodiment, are a structured representation of configuration and management information, options, and preferences that are used within the present invention to configure the operational behavior of the system. FIG. 19 shows a schematic representation of a policy.

Figure 22:
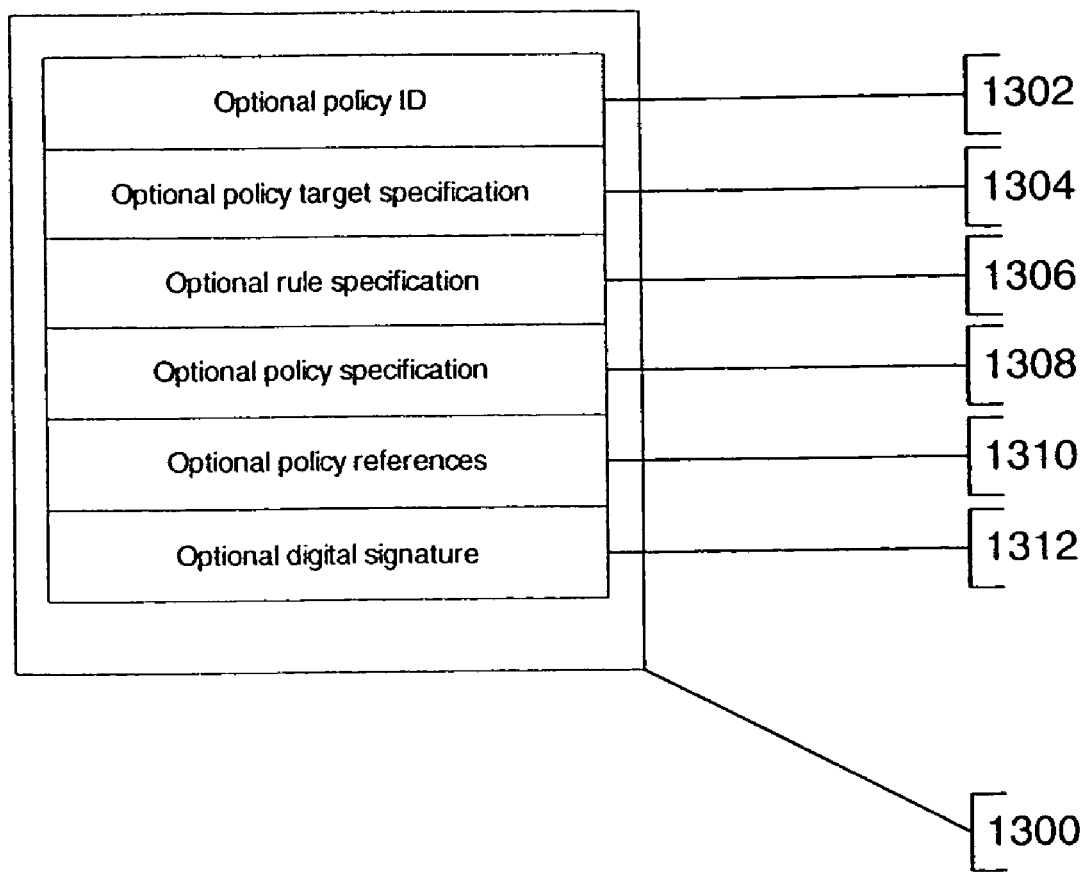
FIG. 22 is a schematic layout of a policy specification of the present invention.

In FIG. 22, a policy 1300 comprises an optional policy ID 1302, an optional policy target specification 1304, an optional rule specification 1306, an optional policy specification 1308, an optional set of references to policies 1310, and an optional digital signature 1312.

In a preferred embodiment, a policy may be written as a structured representation using XML and be evaluated by a separate policy evaluation component. Alternatively, in an illustrative example, to save memory, code size, and processing time, a policy may be encoded as a series of binary bits and the policy evaluation may be written as part of the software code that implements the present invention. It is preferable that a structured representation such as XML or a policy language be used for policy representations. It will be apparent to one skilled in the art that structured representations such as XML are more easily extensible to permit new policies to be added as the present invention is extended.

Policy ID 1302 is preferably a globally unique identifier, such as one created using Microsoft's GUID algorithm, or alternatively an open specification algorithm such as the X/Open algorithm. A policy ID may be used by the present invention to identify a specific policy. Alternatively, a policy ID 1302 may include location specification information in addition to the policy ID, such as embedding the policy ID within a URI. This alternative approach may be used when a GUID algorithm is not available, or if it is desired to specify a source where the policy may be obtained as part of the policy ID.

Policies, in a preferred embodiment, may include a specification of its target execution location. The target execution specification permits a policy to define its execution target location, and may include evaluation rules, defined actions, and action parameters. This structure may be implemented, in the preferred embodiment, as a XML schema.

Referring again to FIG. 22, the target specification 1304 of policy 1300 defines the location that the policy is applicable. For example, a policy that defines the configuration of a RSTP session might name the RSTP Direct Streaming Transport 552 component as its target. Alternatively, policy that controls the write-back actions of the file system core 300 component may name the file system core component as its target.

Again referring to FIG. 22, the rule specification 1306 of policy 1300 defines when the policy is active, and includes limitations by user, system ID, package, or other item which is known in the execution context where the policy is evaluated. A policy rule specification may also specify meta-data about the execution environment that must be present. Alternatively, the policy rule specification may specify meta-data or objects that must be absent from the environment for the policy to be enforced. Policy rules are generally evaluated at run time, and may be specified using a policy language. An example of a simple policy language might be XPath, and the policy rule specification in this illustrative example is an XPath query that would be evaluated against meta-data and system configuration information. In a preferred embodiment, the policy rule specification need not be predefined, but may be determined at run time by inspecting the value of the policy rule itself. The policy rule may include a policy rule type specification as part of its value, and the policy rule evaluation would consider the policy rule type specification when evaluating the policy rule specification. For example, a policy rule specification may include a MIME type specification as its first entry that specifies the type of the policy rule specification to be an XPath expression. A run time, the policy evaluation component may use the MIME time specification as a guide when evaluating the policy rule specification.

Alternatively, the policy rule 1306 section may be omitted and the component(s) using the policy may make determinations of whether a policy is applicable based upon other factors, such as the present or absence of the specific policy, or from the contents of policy specification 1308.

A policy rule specification, when evaluated, will generally evaluate to either a "true" or "false" value. If the policy rule specification evaluates to a true value, the policy actions should be enforced. If the policy rule specification evaluates to a false value, the policy does not apply in the current situation and the policy actions should not be enforced. Policies that should always be applied have a policy rule specification that evaluates to true.

The policy specification 1308 of policy 1300 defines one or more actions to be taken and parameters for these actions. Generally, the policy specification is applied if the rule specification 1306 evaluates to true, however, alternative embodiments of the file system of the present invention may simply inspect the policy specification and apply policy rules as necessary. The policy specification may specify a parameter, configuration option, or action to be taken to enforce the policy. For example, an action may name a module or routine to be executed. Specific examples of policies are described in examples below.

Policies are independently deliverable to the present invention, either through independent download from a server such a policy server 4000 or server 2000, by embedding them within a BRIQ package, or by alternatively manually configuring them on the host PC 100 using a graphical user interface. Policies present on the host PC 100 are generally stored within the local file system 900 or in another location such as the registry on a Windows-based host PC 100. Policies are loaded into the components of the present invention by various components as described above.

It is desirable to permit policies to be downloaded over a public network or using non-secure protocols. In one embodiment, a policy may be digitally signed by its creator. If the policy has been digitally signed, the optional digital signature 1312 will be present. A policy may not be processed by components of the present invention if the policy's digital signature has been corrupted, or if the policy was not signed by a known or trusted source.

Policies in the described embodiment provide an extensible mechanism for defining options that govern the operation of the file system core 300, stream CODEC 400, Network Transport Agent 500, cache 900, and various subcomponents of these subsystems. Each of these options may be specified to be applicable based upon file, stream, file-type, user-id, environmental meta-data, or other attribute as determined by the selection parameter defined above. A summary example of options supported by the present invention include, but are not limited by the illustrative lists provided below:

Data Location
  Specification of location, access protocol, and storage format for an application title's data
  Specification of location, access protocol, and storage format for an application title's configuration data
  Specification of location, access protocol, and storage format for a user's data set for a specific application title.
  Specification of location, access protocol, and storage format for a user's configuration data for a specific application title.
  Specification of location, access protocol, and storage format for policy-defined data for a specific application title.
  Specification of location, access protocol, and storage format for policies (default policy server locations),
  Specification of location, access protocol, and storage format for servers (default BRIQ/file system data server locations)

It should be noted that a specification of a location, protocol, and storage format is preferably provided using a list of fully qualified URIs, in which the protocol, location, and file format are specified. Optional specifications may be included within the URI format as permitted by RFC and as supported by the named server(s).

File system configuration policies—The following policies are examples of policies that may be specified for managing the file system portion of the present invention.
  Location, access protocol, and storage format of cache storage
  Cache size, expiration policy (e.g. LRU), purge policies, and maximum cache size
  Cache mode to be used on a default and specific application title basis
  Default mount locations, on an application by application basis
  Volume assembly instructions, including data location instructions and namespace integration instructions
  Access control instructions, including specific access control, and optional references to host operating system access control constructs such as Windows security groups and user ID/names.
  Time of use instructions, including specific time of use controls, with optional references to host operating system time of use control constructs such as windows account security specifications.

Data operations—Data operation policies define how operations are performed upon data. These policies define how a specific data types are handled during processing, including encryption/decryption and compression/decompression specifications. These specifications may include cryptographic keys.

Post-close operations—Post-close operation policies permit the specification of operations that are performed during the post-close operations step described above. These policies include specifications on whether to copy or move specific classes of information, the location to be used, the protocol to use while moving/copying the information, and the format to store it in. A generalized format for this specification might look like the example below:
  (action) (information type) to (location) using (protocol) and (operation) it in (format),
where:
  (action) is one of (move/copy/delete),
  (information type) is one of (user data, user configuration data, application configuration data, application data),
  (location) is a list of URI's,
  (protocol) is an optional protocol for port proxying (operation) is one of (store, merge, replace)
(format) is (files, virtual file system)

Transmission policies—Transmission polices define protocol options for transmission protocols, including those options described above for various components of the Network Transport Agent 500. They also define encryption and compression attributes of the communication, including cryptographic keys if needed.

Packages and BRIQs—Application packages (BRIQs) are preferably defined using a modified version of the Open Software Description (OSD) format described below. OSD packages may contain file systems as described further below, and may be assembled with other OSD packages, files, and volume parts as a virtual volume that is then mounted by the host PC 100 software as described above.

OSD is an XML Document Type Definition (DTD) for describing a portable management format for Java and Win32 applications. It is generalized to describe all forms of software, for installation, management, update, and distribution purposes, as well as real-time execution. The present invention, in a preferred embodiment, supports both an XML DTD, and an XML-Schema for OSD v2.0. The specification may alternatively utilize solely completely separate DTD or a namespace extension to the already existing v1.0 OSD DTD. Also, an XML-Schema is alternatively provided to support Microsoft IE5 compatibility and future releases of SOAP and the .NET platform, as well as the future draft of W3C approved XML Schemas.

The DTD or schema of the preferred package embodiment describes the vocabulary of software including dependencies on other software or inter-dependencies, and the content of a particular piece of software. An OSD XML package can be embedded in the file system as part of the application's descriptor as well as used by software authors and system managers for interaction with the system.

An OSD describes the contents and revisions of a particular software package stored in a software repository. The OSD can be used to assist in content management, edits for update of the software package, or regular maintenance of client desktop to track version dependency information. Furthermore, an OSD can be used to activate the download or streaming process. The OSD can be embedded in an HTML web page, or included directly as the streaming media file, or may be provided within an application to trigger the streaming process, or as a means of controlling update and distribution.

Within the OSD, the launch path and share name are implied by the CODEBASE element. However, the launch path can be explicitly defined by the FILENAME attribute of the CODEBASE. In this way, the same CODEBASE can service potentially more than one application. This is useful for application suites such as Microsoft Office or Lotus SmartSuite. The LAUNCH_SIZE_X elements is preferably calculated at run-time by the file system and used as metadata therein. The above meta-data information provides alternative sources of information for use by applications such as the optional Launcher 220.

The screen parameters are encoded by the RESOLUTION element. None of the attributes are required, and should only be used when needed.

Software requirements such as Quicktime or DirectX are encoded by the DEPENDENCY element, and should not be explicitly coded as elements at any time.

OS dependencies are encoded by hierarchical association of elements with OSVERSION attributes. Unless an OS is specifically stated in the IMPLEMENTATION element, it is not considered a valid operational candidate.

All file copying, registry entries, DLL installations, etc., are coded by the OSD file syntax as described above.

BRIQ File System—An application title is formatted into an electronic package that contains the title's files in a compressed and encrypted form, referred to hereafter as a BRIQ.

Figure 23:
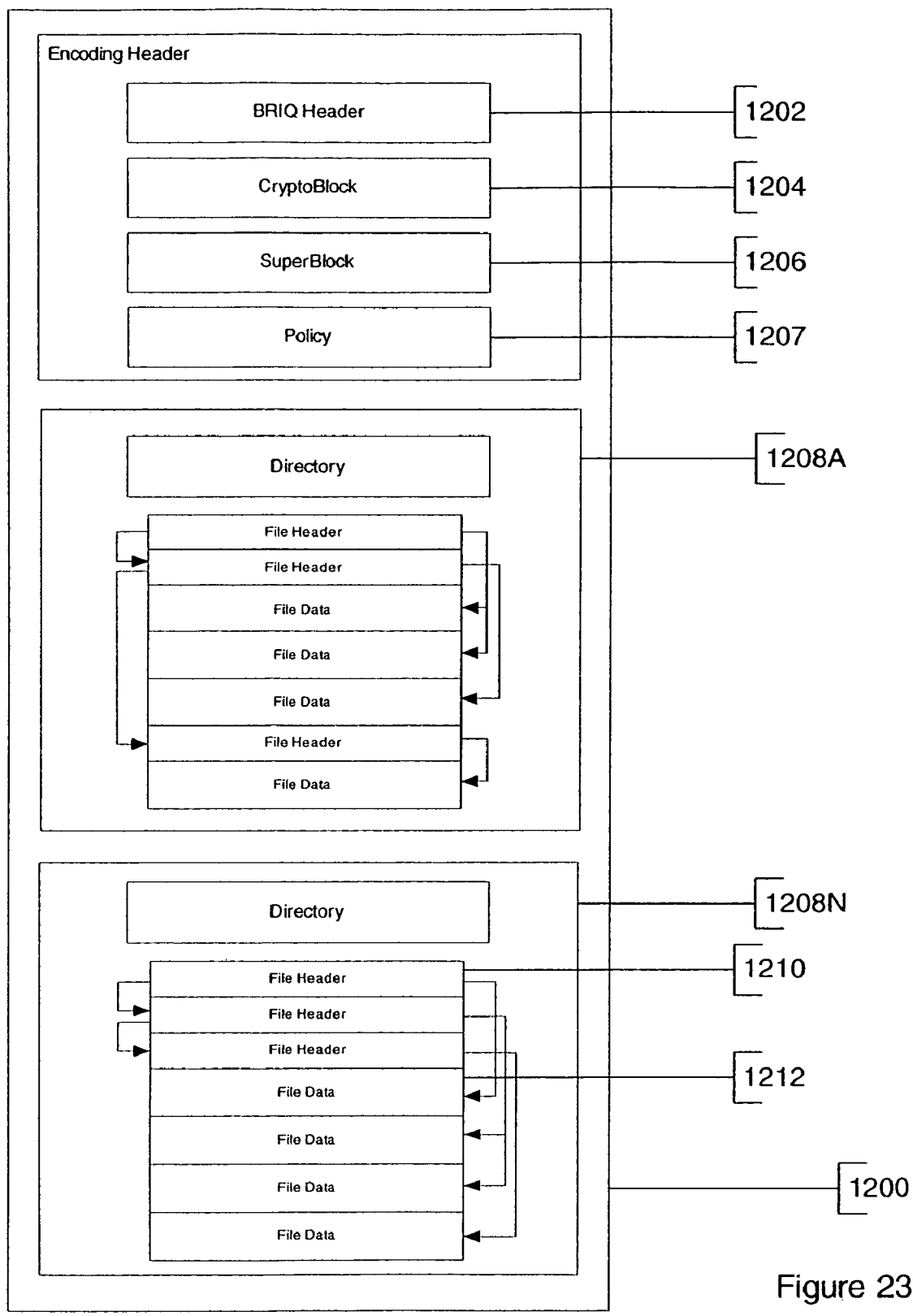
FIG. 23 is an example layout of a BRIQ package that contains an embedded file system.

Each BRIQ in accordance with the present invention, and as described with reference to FIG. 23, includes a file system for one or more specific titles. As described hereafter, a BRIQ author utilizes a creator utility program to extract selected files from an application and the application installation directory. The BRIQ author also extracts other information such as registry entries which may be necessary for the correct execution of the application. The creator program combines the selected files and other information and generates as an output a file system in the form of a BRIQ, as well as a set of database entries. The BRIQ may be stored on the RAFT server, on local media (e.g. local storage, network attached storage, CD-ROM).

The BRIQ is actually a portable, self-contained file system, containing all of the files necessary to run a particular title. BRIQs are stored on a network file server, referred to hereafter as a RAFT server, accessible across a broadband network. The file system of the present invention treats the BRIQ like a local file system on the user's PC. When running a title, the operating system, e.g. Windows, makes read requests to this local file system.

The BRIQ File Format—To enable software to be streamed through RTP or other technologies, it is necessary to encode an entire file system within a single file. It is also important for performance that access to this file system, which is ordinarily highly non-linear, be constrained to be linear. In reality, the file system hierarchy and data access patterns must be re-organized and encoded as a single linear access file. The RTP transport provides this single linear stream of data with macro level commands to change the stream. This is in stark contrast to typical file system access patterns that are predominantly transactional in nature, with the file system server responding to individual requests of the file system client.

The file format provides an encoding mechanism that creates a linear file from non-linear file system data. At its most basic, the file format must contain a header which describes its encoding: version information, stream encoding, compression, etc. . . . Next, it contains either a complete block map, describing file system information and location within the encoded file, or the head of a linked list of file system information intermixed with file system data. The block header includes a GUID, the file name, attributes, block range information, a pointer to the data within the file, and a pointer to the next block header. Finally, it contains all file system data. This basic format is shown in FIG. 23.

The primary purpose of the file is to encode optimally file system data for sequential access. The file will necessarily be encoded to ensure that data is aligned according to most common access patterns, and can thus also be re-encoded as these patterns change. Thus, if an application most commonly reads File X then File Y, the file is encoded such that the data for File X is stored before the data for File Y. Additionally, it is important to note that files can be split into many pieces for optimal access. If the file is internally encoded (compressed or encrypted), it requires additional header information.

Regardless of encoding, a BRIQ file and all its pieces are associated with its GUID. Using the GUID, the file can be treated as a unique object by caches or caching proxies. If a BRIQ file is re-encoded, the GUID will still be valid, and an intermediate cache can choose how to use the changed encoding information.

The BRIQ recreates the application's file system locally on the client's PC. What is a read-only file system on the server, can become read-write at the client if allowed. The client stores the BRIQ in either the local file system 920 or the cache 910 in the manner it was sent across the network. Changes to the file system can be made either in the file system itself or in an alternative volume part, and these changes transparently integrated with the first BRIQ using a symbolic link. The symbolic link can point to any valid external file, volume part, or file system in either a local or network file system. As a result, if any part of a file is changed, it should be moved in its entirety outside the local BRIQ system, but is not required to be.

File format/directories—The primary purpose of the BRIQ format is to provide a neutral encoding mechanism for creation of a linear encoded file for storage of hierarchical file system data. This file can then be used for transport of file system data as streaming or other packaged media. This allows third parties to alter encoding schemes, compression methods, etc., but still use a compatible server and/or client.

The BRIQ format does not require the use of any specific network transport. Only a system such as the file system of the present invention is capable of decoding the file format is necessary to turn the file into a usable file system. As a matter of usage, file system data is encoded without respect to a target system bit rate or underlying protocol. The server performs the configuration for each of these options, though there is an optional variable set aside in the file header for a suggested minimum bit rate.

The BRIQ File Format contains up to five major structural elements:
BRIQ Header
File Properties
Content Description
Directory Index
File System Data In following a basic tagged file format, like RIFF, each structure is represented by a chunk. Each chunk contains a 4-byte ASCII TID (chunk type identifier), a 32-bit size, and the data chunk itself. If the TID is not four characters, it will be left-aligned and right-padded with zeros. To promote faster, byte boundary aligned access, the data chunk will be padded with an additional zero if the chunk size is odd. Additionally, little-endian order is assumed, as the primary target platform is Intel-based Windows PCs.

```
typedef struct {
    FOURCC    TID;
    UINT      size;
    SVERSION  headerVersion;
} CommonHeader;
```

The following data structures use several data types as defined in Appendix A.

File Header—The File Header is present only a single time at the beginning of every BRIQ. The chunk identifier is "SMFF", which identifies the file as being encoded for Softricity. The file header is extensible and may change with future versions.

```
typedef struct {
    CommonHeader commonHeader;
    SVERSION     fileVersion;
```

```
    FILETIME   dateCreated;
    FILETIME   dateModified;
} SoftricityHeader;
```

File Properties—The basic properties of the RTP session created between the client and the server are defined in the properties header of the BRIQ. The basic properties include the minimum bit rate expected for the session or the default encoding of file elements. In addition, there is an opaque element, streamData, which encloses encryption keys, compression dictionaries, digital signatures, and other elements as needed by the session. The elements in the file properties header are expected to be transmitted to the client using SDP as described in that section. The blockSize element indicates the size of an uncompressed block, one of 4 K, 16 K, or 64 K, by default 4 K. The element will be stored in bytes.

```
typedef struct {
    CommonHeader commonHeader;
    UINT    bitRate;
    UINT    reservedFlags;
    UINT    streamID;
    UINT    encodingTypes;
    UINT    blockSize;
    UINT    streamDataLength;
    UTF16   streamData[streamDataLen];
} PropertiesHeader;
```

The streamData item will contain zero or more items.

Content Description—There is an extra, optional header that can be included with the BRIQ. It contains basic information about the application contained within the file. Most of this data is expected to be stored in an external OSD file, so this will either be redundant or go unused. In addition, there is the option of placing the actual OSD file within this section. The optional header facilitates a server generating an OSD on the fly, and enables having a client store packages as one entity and thus is able to gain needed information without external connections.

```
typedef struct {
    CommonHeader commonHeader;
    UINT    titleLength;
    UINT    authorLength;
    UINT    copyrightLength;
    UINT    commentsLength;
    UINT    osdLength;
    UTF16   title[titleLength];
    UTF16   author[authorLength];
    UTF16   copyright[copyrightLength];
    UTF16   comments[commentsLength];
    UTF16   osdContents[osdLength];
} ContentDescriptionHeader;
```

Directory Index—Following these headers, a BRIQ contains a directory listing of its contents. The listing begins with an index header describing the stream that is being identified. The overall directory listing contains a GUID identifying the container for the file system as well as a monotonically increasing version identifier. The version is used by the client file system to determine changes to the application file system. Finally, there are three pointers, one to the head of the actual directory listing, one to the head of the file data stream, and one to the head of the block map. Each of these offsets is expressed in bytes from the beginning of the file.

```
typedef struct {
    CommonHeader   commonHeader;
    UINT           streamID;
    GUID           directoryID;
    UINT           directoryVersion;
    ULONG          pRootIndex;
    ULONG          pRootFile;
    ULONG          pBlockMap;
    FILETIME       dateCreated;
    FILETIME       dateModified;
} IndexHeader;
```

The actual directory listing is stored as a virtual linked list in the BRIQ. Each entry is for one particular file or directory and points to the next entry in the list. This allows interspersing of file and directory data if desired. Each directory listing also contains a pointer to its file data, if the entry is a file, so that the file can be retrieved quickly. Every file and directory has an associated GUID and parent GUID. If the directory is the root of the application hierarchy, then its parent GUID is NULL.

```
typedef struct {
    CommonHeader   commonHeader;
    LONG           pNextIndex;
    LONG           pData;
    UINT           entryVersion;
    GUID           fileID;
    GUID           parentID;
    UINT           fileNameLength;
    UINT           shortNameLength;
    UINT           fileAttributesLength;
    UTF16          fileName[fileNameLength];
    UTF16          shortName[shortNameLength];
    FATTR          fileAttributes;
} IndexEntry;
```

The file attributes structure contains a few unusual elements. First, the softricityFileType identifier is used to identify the type of data that this file represents and if it is allowed to be persistent (or written to) by the client local file system. The securityDescriptor adds the ability to contain Windows NT/2000 ACL/ACE entries. If the ACL list is not empty, the data contained in the ACL follows the Windows ACL data structure definitions and is presumed to be opaque to all but the client local file system. Finally, if the fileType is a hard link, then the file data that it points to contains a symlink.

```
typedef struct {
    FTYPE    fileType;
    UINT     fileSize;
```

```
    UINT       fileAttributes;
    WORD       softricityFileType;
    UINT       ownerID;
    UINT       primaryGroupID;
    FILETIME   dateCreated;
    FILETIME   dateModified;
    FILETIME   dateLastAccessed;
    SECDES     securityDescriptor;
} FATTR;
```

A softricityFileType entry uses the following bitmask:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|D|C|d|c|P|O|                    Reserved                       |
+=+=+=+=+=+=+=+=+=+=+=+=+=+=+=+=+=+=+=+=+=+=+=+=+=+=+=+=+=+=+=+=+
```

Application Data (D)=Application Data bit identifying this content as a global data item, shared by all instances of the application, for all users.

Application Configuration (C)=Application Configuration bit identifying this file as part of global configuration for all users.

User Data (D)=User Data bit identifying this content as a user specific data item, modified private to each user's session(s), though may often contain some default data.

User Configuration (C)=User Configuration bit identifying this content as a user specific configuration item, modified private to each user's session(s), though may often contain some default configuration.

Permanent (P)=Permanent bit. This defines on the client/file system a marker to identify if a file has been modified and shouldn't be deleted.

Override (O)=Override bit identifying that this file should overwrite a permanent file regardless of its setting. Otherwise to update a permanent file, external scripting in the OSD file is necessary.

The Reserved bits may be defined to further classify portions of the data on a policy by policy basis. For example, one of the reserved bits may be used by a policy to define that materials of this class must always be stored in encrypted form. This bit would be used by the Stream Codec 400 and the File system core to implement the encryption policy.

The Directory Index Header can also point to a compressed index. This compressed index is comprised of an additional header with the linked index list contained within its indexData element. The index can then be decompressed by a client and walked as above.

```
typedef struct {
    CommonHeader   commonHeader;
    UINT           encodingTypes;
    UINT           streamDataLength;
    UINT           indexDataLength;
    BYTE           streamData[streamDataLength];
    BYTE           indexData[indexDataLength];
} CompressedIndexHeader;
```

If the pointer, pBlockMap, in the Directory Index Header is not NULL, it points to an additional data structure that is a Block Map. In one embodiment, this block map is provided to be sent to a Softricity client. The client uses this block map to assist in performing pre-fetching. The numTotalBlocks entry is given solely as a hint to identify the size of the blockentries variable. The numBlockBits element is used to identify the size, in bits, of each block map entry used in the Block Entry structure. To simplify implementation, it is recommended that one utilize increments of 8 bits only, though to compress the structure a minimum bit size can be used.

In the Block Entry structure, there are only three entries. A local file ID, is the first 32 bits of the File GUID stored as the fileID element in the Index Entry structure. This presumes that GUIDs are created according to specifications, not as random variables. The numBlocks member provides a hint to the size of the next element. Though this element could be derived from the directory Index Entries, this allows the two to be transmitted and used separately. Finally, the blockNumber array is a series of block numbers identifying relative location of the block in the stream and in the file.

To ensure minimum size for storage and transmission, the Block Map itself contains no RIFF header. It will simply follow the BlockMapHeader as indicated. Or it can be compressed. It is important that the block map be kept as small as possible. This compressed block map comprises an additional header with the block map array contained within its indexData element. The index can then be decompressed by a client and walked as above.

```
typedef struct {
    CommonHeader commonHeader;
    GUID      mapID;
    UINT      mapVersion;
    LONG      numTotalBlocks;
    BYTE      numBitsPerBlock;
    BYTE      isEncoded;
    if(isEncoded){
        UINT      streamDataLength;
        UINT      blockDataLength;
        BYTE      streamData[streamDataLength];
        BYTE      encodedBlockEntries[blockDataLength];
    } else {
        BlockEntry    blockEntries[numTotalBlocks];
    }
} BlockMapHeader;
typedef struct {
    DWORD     localFileID;
    LONG      numBlocks;
    UINT      blockNumber:numBitsPerBlock[numBlocks];
} BlockEntry;
```

File System Data—The last type of data stored within a BRIQ is the actual data that makes up individual files. Each element contains the block identifiers of offset and range for the source file. If the file data component is compressed the block length will be different and the range can be used as a hint to any decompressor or decoder for output block size. Each individual file component can be compressed separately, or taken en masse, according to the encoding definition given earlier. A particular file may be chosen not to be compressed as it is already compressed, such as a .GIF or .MP3 file.

The feature block element serves two purposes. First, during the encoding process, blocks can be associated with certain "features" of a product. For example, a block can be part of the code executed as a result of using a graphics filter in Adobe Photoshop, or invoking the thesaurus in Microsoft Word. The names of the features can be added to the stream data element in the properties header.

The feature block element can also be used during the streaming process as a hint for the client and server as how to control the stream. As an example, a client can request a server to send only what it needs. In this scenario, a server sends whole features, ie. all of the blocks with a specific feature tag. If any block is requested from a certain feature block, the whole set will be streamed. The client can also use the feature block as an indicator to the user as to what features are present in its cache.

```
typedef struct {
    CommonHeader commonHeader;
    GUID      fileID;
    BYTE      isEncoded;
    WORD      featureBlock;
    BYTE      reserved[1];
    LONG      pDataNext;
    UINT      dataOffset;
    WORD      dataRange;
    WORD      dataLength;
    BYTE      data[dataLength];
} DataEntry;
```

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A policy configurable system, comprising:
a processor;
a computer readable storage medium coupled to the processor, the computer readable storage medium including:
  instructions for effectuating a local file system associated with a first policy, wherein the local file system manages local files stored in the computer readable storage medium;
  instructions for downloading a second file system associated with a second policy including an application and a configuration file for the application;
  instructions for downloading the second policy, the second policy configured to identify a location remote from the second file system to store modifications to the configuration file;
  instructions for effectuating a virtual file system, the virtual file system configured to integrate the local files with files in the second file system into a common namespace;
  instructions for integrating the first policy with the second policy to form an integrated policy;
  instructions for executing the application;
  instructions for receiving a request to modify the configuration file; and
  instructions for copying the configuration file and modifying the copy of the configuration file in accordance with the request;
  instructions for storing the modified copy of the configuration file in the location remote from the second file system in accordance with the second policy.

2. The policy configurable system of claim 1, wherein each policy is formed from one or more separate policies.

3. The policy configurable system of claim 1, wherein the second policy is downloaded from a policy server via a public network.

4. The policy configurable system of claim 1, wherein the integrated policy is formed from the second policy, the second policy having been downloaded from the policy server and the first policy, the first policy having been stored in the computer readable storage medium.

5. The policy configurable system of claim 1, wherein the computer readable storage medium further comprises:
instructions for a file system interface configured to receive file system access calls and send them to the virtual file system.

6. The policy configurable system of claim 5, wherein the integrated policy defines how registry entries are stored.

7. The policy configurable system of claim 1, wherein the computer readable storage medium further comprises:
instructions for selecting the second policy in accordance with information that identifies a logged in user account.

8. The policy configurable system of claim 1, wherein the second file system comprises a BRIQ.

9. A computer implemented method, comprising:
executing a first file system on a computer system, wherein the first file system includes a first set of one or more files and is associated with a first policy;
downloading a second file system that includes a second set of one or more files for an application;
downloading a second policy, wherein the second policy indicates that modifications to configuration data for the application are stored within a file in the first file system;
integrating, by a virtual file system, the first set of one or more files and the second set of one or more files into a common namespace;
integrating the first policy and the second policy into an integrated policy;
receiving a request to modify configuration data for the application; and
storing the modifications to the configuration data for the application within the file in the first file system.

10. The composite file system method of claim 9, wherein files stored in the downloaded second file system include at least one read-only part and at least one read-write part.

11. The composite file system method of claim 9, wherein the integrated policy is formed from the second policy and the first policy, the first policy being locally resident on the computer system.

12. The composite file system method of claim 9, wherein the downloaded file system includes application configuration files.

13. The composite file system method of claim 9, wherein the first file system includes user configuration files including user preference information for the application.

14. The composite file system method of claim 9, wherein the integrated policy controls data read and write operations.

15. The composite file system method of claim 9, wherein the integrated policy defines how registry entries are stored.

16. The composite file system method of claim 9, wherein the second policy is selected in accordance with information that identifies a logged in user account.

17. The composite file system method of claim 16, wherein the second policy is downloaded from the one or more servers.

18. The composite file system method of claim 16, wherein the second policy is downloaded from a plurality of locations.

19. A computer readable storage medium including computer executable instructions that upon execution by a processor cause the processor to:
execute a first file system associated with a first policy;
download a second file system, wherein the second file system includes an application and a configuration file for the application;
download a second policy associated with the second file system;
determine that modifications to the configuration file for the application are stored in the first file system based on information in the second policy and information identifying a user account logged into the operating system;
execute a virtual file system that integrates the first file system and the second files system into a common namespace;
integrate the first policy with a second policy;
receive a request to modify the configuration file for the application;
store the modifications to the configuration file in the first file system in accordance with the second policy.

20. The computer readable storage medium of claim 19, further comprising instructions that upon execution by the processor cause the processor to:
store a copy of a modified configuration file in the first file system.

21. The computer readable storage medium of claim 19, further comprising instructions that upon execution by the processor cause the processor to:
store blocks of changed data that are indicative of the modifications in the first file system.

22. The computer readable storage medium of claim 21, wherein the second policy is downloaded from the one or more servers.

23. The computer readable storage medium of claim 19, further comprising instructions that upon execution by the processor cause the processor to:
integrate the first file system and the second file system into the common namespace in accordance with information in a symlink.

24. The computer readable storage medium of claim 19, further comprising instructions that upon execution by the processor cause the processor to:
integrate the first file system and the second file system into the common namespace, wherein the common namespace is common across a plurality of remote volumes.

25. The computer readable storage medium of claim 19, wherein each volume includes a downloadable file system.

26. The computer readable storage medium of claim 19, wherein the remote volume includes application configuration files.

\* \* \* \* \*